United States Patent
Tsurumi et al.

(10) Patent No.: US 9,759,146 B2
(45) Date of Patent: Sep. 12, 2017

(54) EXHAUST GAS PURIFICATION CONTROL DEVICE FOR CONSTRUCTION MACHINE

(71) Applicant: KOBELCO CRANES CO., LTD., Shinagawa-ku (JP)

(72) Inventors: Toshiki Tsurumi, Hyogo (JP); Shintaro Sasai, Hyogo (JP); Koichi Shimomura, Hyogo (JP); Takahiro Hanamoto, Hyogo (JP); Hitoshi Sakurai, Hyogo (JP)

(73) Assignee: KOBELCO CRANES CO., LTD., Shinagawa-ku (JP)

( * ) Notice: Subject to any disclaimer, the term of this patent is extended or adjusted under 35 U.S.C. 154(b) by 0 days.

(21) Appl. No.: 14/894,018

(22) PCT Filed: May 27, 2014

(86) PCT No.: PCT/JP2014/064023
§ 371 (c)(1),
(2) Date: Nov. 25, 2015

(87) PCT Pub. No.: WO2014/192770
PCT Pub. Date: Dec. 4, 2014

(65) Prior Publication Data
US 2016/0131059 A1    May 12, 2016

(30) Foreign Application Priority Data

May 31, 2013 (JP) .................................. 2013-116087
May 31, 2013 (JP) .................................. 2013-116088
(Continued)

(51) Int. Cl.
*F01N 3/00* (2006.01)
*F02D 41/02* (2006.01)
(Continued)

(52) U.S. Cl.
CPC ............ *F02D 41/029* (2013.01); *B60K 13/04* (2013.01); *B66C 13/00* (2013.01); *F01N 3/023* (2013.01);
(Continued)

(58) Field of Classification Search
CPC .... F02D 41/029; F02D 41/021; F02D 41/405; F02D 9/06; F02D 2041/026;
(Continued)

(56) References Cited

U.S. PATENT DOCUMENTS

2008/0264037 A1* 10/2008 Takahashi ............. F01N 11/002
60/277
2009/0082938 A1* 3/2009 Onodera ............ B01D 46/0061
701/103
(Continued)

FOREIGN PATENT DOCUMENTS

JP     2000-161044 A        6/2000
JP     2000161044 A    *    6/2000
(Continued)

OTHER PUBLICATIONS

International Search Report issued Aug. 26, 2014, in PCT/JP2014/064023 filed May 27, 2014.

*Primary Examiner* — Jason Shanske
*Assistant Examiner* — Kelsey Stanek
(74) *Attorney, Agent, or Firm* — Oblon, McClelland, Maier & Neustadt, L.L.P.

(57) ABSTRACT

An exhaust gas purification control device includes an engine, an actuator using the engine as a driving source, an operation unit used by an operator to operate the actuator or the engine, an operation detector detecting whether or not the operation unit is being operated, a purification device for capturing soot in exhaust gas of the engine, an accumulation amount detector detecting an accumulation amount of the (Continued)

soot captured by the purification device, a regeneration unit for performing an regenerating operation of regenerating the purification device by burning the soot captured by the purification device, and a controller controlling the regenerating operation. The controller switches a control from a control of prioritizing an operation by the operation unit to a control of prioritizing the regenerating operation in a stepwise manner as the accumulation amount of the soot detected by the accumulation amount detector increases.

30 Claims, 36 Drawing Sheets

(30) Foreign Application Priority Data

| | | |
|---|---|---|
| May 31, 2013 | (JP) | 2013-116089 |
| Feb. 28, 2014 | (JP) | 2014-039170 |
| Feb. 28, 2014 | (JP) | 2014-039172 |
| Feb. 28, 2014 | (JP) | 2014-039178 |

(51) Int. Cl.

| | |
|---|---|
| *F02D 9/06* | (2006.01) |
| *B60K 13/04* | (2006.01) |
| *B66C 13/00* | (2006.01) |
| *F01N 3/023* | (2006.01) |
| *F01N 3/025* | (2006.01) |
| *F01N 3/035* | (2006.01) |
| *F01N 9/00* | (2006.01) |
| *F02D 41/40* | (2006.01) |

(52) U.S. Cl.
CPC ......... *F01N 3/0235* (2013.01); *F01N 3/0253* (2013.01); *F01N 3/035* (2013.01); *F01N 9/002* (2013.01); *F02D 9/06* (2013.01); *F02D 41/021* (2013.01); *F02D 41/405* (2013.01); *F01N 2900/10* (2013.01); *F01N 2900/1606* (2013.01); *F02D 2041/026* (2013.01); *F02D 2200/604* (2013.01); *Y02T 10/47* (2013.01)

(58) Field of Classification Search
CPC ... F02D 2200/604; B60K 13/04; B66C 13/00; F01N 3/023; F01N 3/0235; F01N 3/0253; F01N 3/035; F01N 9/002; F01N 2900/10; F01N 2900/1606
USPC .................................................. 60/285, 295
See application file for complete search history.

(56) References Cited

U.S. PATENT DOCUMENTS

| | | | |
|---|---|---|---|
| 2010/0089035 A1* | 4/2010 | Kamiya | E02F 9/00 60/277 |
| 2011/0004559 A1* | 1/2011 | Shibamori | F01N 3/0253 705/307 |
| 2012/0180463 A1* | 7/2012 | Oohashi | B01D 46/0057 60/297 |
| 2012/0227388 A1 | 9/2012 | Asakage et al. | |
| 2013/0067895 A1* | 3/2013 | Noma | F01N 3/023 60/311 |

FOREIGN PATENT DOCUMENTS

| | | | |
|---|---|---|---|
| JP | 3073380 B2 | | 8/2000 |
| JP | 2005-344614 A | | 12/2005 |
| JP | 2005344614 A | * | 12/2005 |
| JP | 2007-23874 A | | 2/2007 |
| JP | 2008-202573 A | | 9/2008 |
| JP | 2008202573 A | * | 9/2008 |
| JP | 2008-274835 A | | 11/2008 |
| JP | 2009-79500 A | | 4/2009 |
| JP | 4369727 B2 | | 11/2009 |
| JP | 2010-156208 A | | 7/2010 |
| JP | 2010156208 A | * | 7/2010 |
| JP | 2011-14003 A | | 1/2011 |
| JP | 2011-89454 A | | 5/2011 |
| JP | 2011-236769 A | | 11/2011 |
| JP | 2012-97679 A | | 5/2012 |
| JP | 2012-188885 A | | 10/2012 |

* cited by examiner

EXHAUST GAS PURIFICATION CONTROL DEVICE FOR CONSTRUCTION MACHINE

TECHNICAL FIELD

The present invention relates to an exhaust gas purification control device for construction machine.

BACKGROUND ART

Conventionally, there is a purification device for capturing soot in exhaust gas of an engine (e.g. patent literature 1, 2). In this purification device, a regenerating operation is performed. The regenerating operation is an operation of regenerating the purification device by burning the soot captured by the purification device. The regenerating operation is performed such as by increasing a load applied to the engine (engine load) to increase an exhaust gas temperature of the engine.

Further, there is a construction machine with this purification device (patent literature 2). In this construction machine, the operability of a crane operation may be deteriorated if an operation of an actuator using an engine as a driving source (crane operation) and a regenerating operation of increasing an engine load are simultaneously performed. Further, the operability of an accelerator operation may be similarly deteriorated also when an operation of changing an engine speed (accelerator operation) and the regenerating operation are simultaneously performed.

In the technology described in patent literature 2, the regenerating operation is performed only when an operation lever (lever for crane operation) is in a neutral position. More specifically, it is described in claim 2 of patent literature 2 that "In a hydraulic operating machine . . . in which a hydraulic actuator is disposed via a control valve in a discharge pipe line of a variable displacement hydraulic pump, wherein . . . the control device is caused to exhibit the function (function of performing a regenerating operation) only when the control valve is in a neutral position".

In the technology described in patent literature 2, the regenerating operation is performed only when the operation lever is in the neutral position. Thus, a chance of regenerating the purification device is reduced as a time of the crane operation becomes longer. Thus, there is a possibility of clogging the purification device (soot clogging). On the other hand, if the crane operation is forcibly prohibited during the regenerating operation, the operability of the construction machine may be deteriorated (it may become difficult to perform a work by the crane operation.

CITATION LIST

Patent Literature

Patent literature 1: Publication of Japanese Patent No. 4369727
Patent literature 2: Publication of Japanese Patent No. 3073380

SUMMARY OF INVENTION

An object of the present invention is to provide an exhaust gas purification control device for construction machine easily ensuring the operability of a construction machine and a chance of regulating a purification device.

An exhaust gas purification control device for construction machine according to one aspect of the present invention includes an engine, an actuator using the engine as a driving source, an operation unit used by an operator to operate the actuator or the engine, an operation detection unit for detecting whether or not the operation unit is being operated, a purification device for capturing soot in exhaust gas of the engine, an accumulation amount detection unit for detecting an accumulation amount of the soot captured by the purification device, a regeneration unit for performing an regenerating operation, which is an operation of regenerating the purification device, by burning the soot captured by the purification device, and a regeneration control unit for controlling the regenerating operation. The regeneration control unit switches a control from a control of prioritizing an operation by the operation unit to a control of prioritizing the regenerating operation in a stepwise manner as the accumulation amount of the soot detected by the accumulation amount detection unit increases.

The operability of the construction machine and a chance of regenerating the purification device can be easily ensured.

DESCRIPTION OF EMBODIMENTS

First Embodiment

Figure 1:
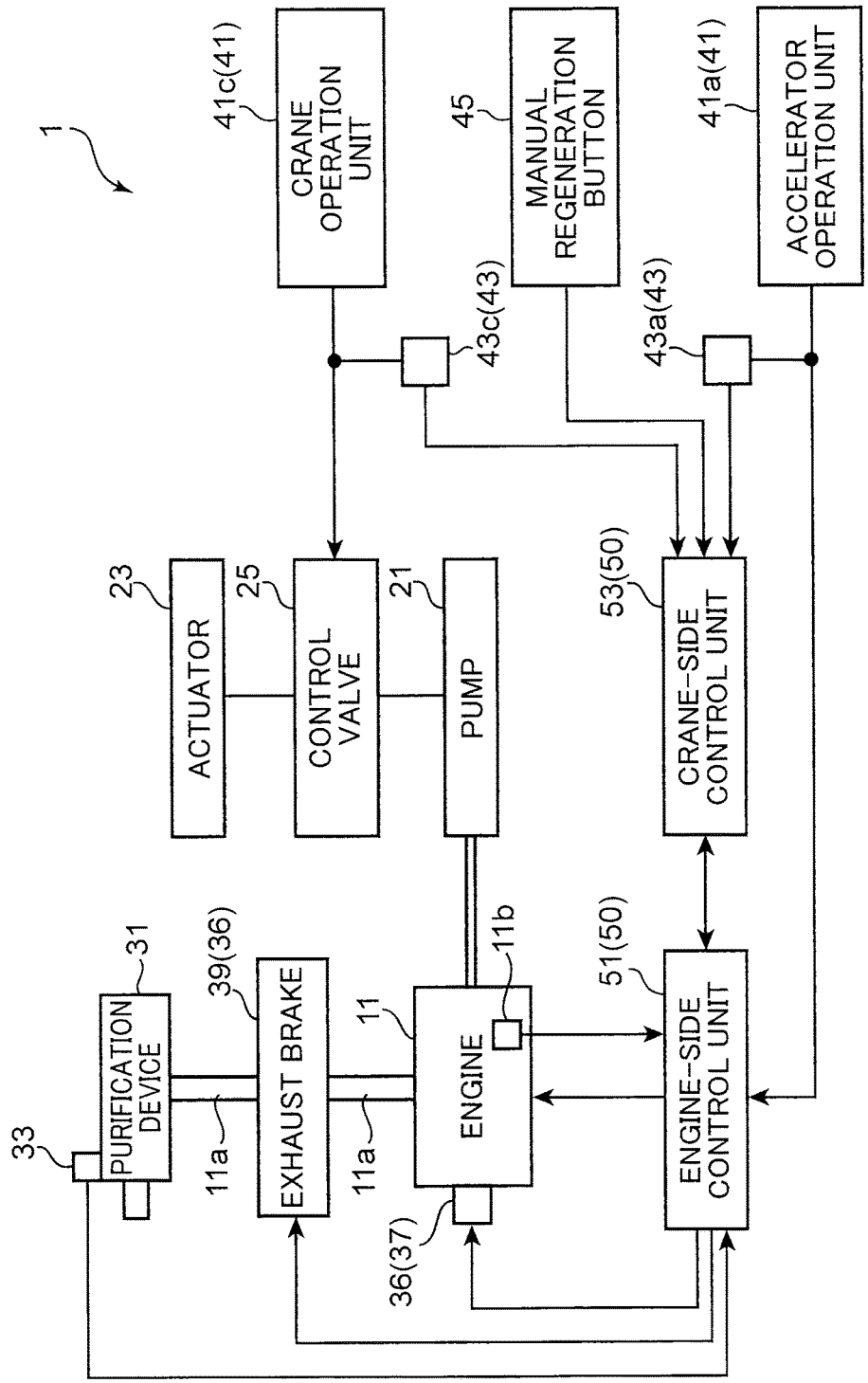
FIG. 1 is a block diagram of an exhaust gas purification control device for construction machine of a first embodiment.

An exhaust gas purification control device 1 (exhaust gas purification control device for construction machine) of a first embodiment is described with reference to FIGS. 1 to 11.

The exhaust gas purification control device 1 is a device for controlling a regenerating operation for regenerating a purification device 31 (described later) shown in FIG. 1. The exhaust gas purification control device 1 is provided in a construction machine (working machine), e.g. in a mobile crane such as a wheel crane. The exhaust gas purification control device 1 includes an engine 11, actuator circuit devices 21 to 25, engine peripheral devices 31, 33, a regeneration unit 36, operation-related devices 41 to 45 and a regeneration control unit 50.

The engine 11 is a driving source of the construction machine and a diesel engine. The engine 11 includes an exhaust pipe 11a (passing in which exhaust gas passes) and a load detection unit 11b. The load detection unit 11b detects a load applied to the engine 11 (engine load, engine power). The load detection unit 11b detects the load based on a fuel injection amount.

The actuator circuit devices 21 to 25 are devices for operating an actuator 23 and include a pump 21, the actuator 23 and a control valve 25.

The pump 21 is driven by the engine 11. The pump 21 is a hydraulic pump for discharging oil (hydraulic oil).

The actuator 23 operates the construction machine. The actuator 23 is used for the raising/lowering and extension/contraction of a boom (not shown) of the construction machine, the winding up and down of a hook (not shown), the rotation of an upper turning body (not shown), the travel of a lower traveling body (not shown) and the like. The actuator 23 is, for example, a hydraulic motor or a hydraulic cylinder. The actuator 23 uses the engine 11 as a driving source. More specifically, the engine 11 drives the pump 21 and the actuator 23 is driven by the oil discharged by the pump 21.

The control valve 25 is a valve for controlling the operation of the actuator 23. The control valve 25 is a selector valve for switching a flow rate and a direction of the oil supplied from the pump 21 to the actuator 23 (valve for switching a switching position). The control valve 25 is operated by a crane operation unit 41c (described later).

The engine peripheral devices 31, 33 include the purification device 31 and an accumulation amount detection unit 33.

The purification device 31 captures (collects) and purifies soot (particulates) in exhaust (exhaust gas) of the engine 11. The purification device 31 is a DPF (Diesel Particulate Filter) device. The purification device 31 is a device for burning soot. The purification device 31 is mounted in the exhaust pipe 11a of the engine 11. The purification device 31 includes a filter main body (not shown) and an oxidation catalyst (not shown, described later) arranged upstream of the filter.

The regeneration unit 36 is a part for performing a regenerating operation (DPF regeneration device). The regenerating operation is an operation of regenerating the purification device 31 (filter regeneration process) by burning (combusting) the soot captured by the purification device 31. The regeneration unit 36 increases an exhaust temperature of the engine 11 up to a temperature necessary to burn the soot (target temperature) (executes a temperature increasing control). The regeneration unit 36 includes a post injection unit 37 and an exhaust brake 39.

The post injection unit 37 is a part for performing post injection for the regenerating operation (post injection supply unit, unburned fuel injection supply unit). The post injection unit 37 performs the post injection according to a temperature of the purification device 31. The post injection is performed in the following steps [a] to [c]. [a] The post injection unit 37 injects the fuel into the engine 11 in an exhaust stroke of the engine 11. The exhaust stroke is a stroke after an expansion stroke (stroke in which main injection of fuel and fuel combustion are performed). [b] The fuel in an unburned state (unburned fuel) is supplied onto the oxidation catalyst of the purification device 31. [c] The unburned fuel generates oxidation reaction heat on the oxidation catalyst. As a result, the exhaust temperature of the engine 11 increases.

The exhaust brake 39 applies a load to the engine 11 to increase the exhaust temperature of the engine 11. The exhaust brake 39 additionally applies a load necessary for the regenerating operation to the engine 11. The exhaust brake 39 is a valve for throttling the exhaust pipe 11a. The exhaust brake 39 is switchable between "activation" and "deactivation". The exhaust brake 39 in an "activated" state throttles the exhaust pipe 11a. The exhaust brake 39 in a "deactivated" state is in an open state and does not throttle the exhaust pipe 11a. The regenerating operation by the regeneration unit 36 is performed by at least one of the post injection in the post injection unit 37 and the activation of the exhaust brake 39.

(Regenerating Operation Methods)

Regenerating operation methods include a method using the exhaust brake 39 (exhaust brake method) and a load application valve method (method using a load applying device 139 of a second embodiment to be described later). In the case of simultaneously performing the operation of the crane operation unit 41c (described later) (crane operation) and the regenerating operation, an influence (problem) given to the crane operation by the regenerating operation is larger when the method using the exhaust brake 39 is adopted. This is described in more detail below.

(Load Application Valve Method)

Figure 10:
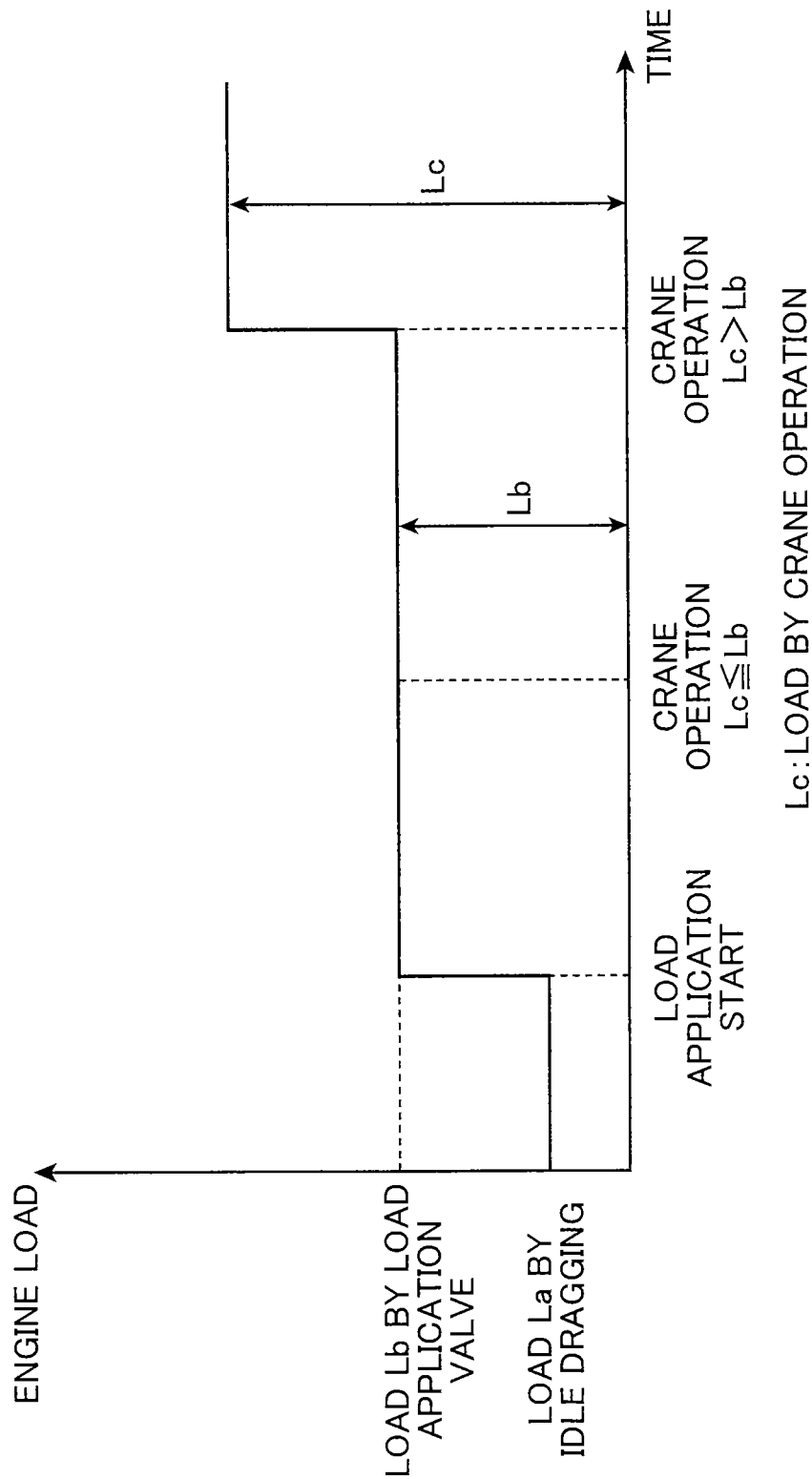
FIG. 10 is a graph showing a relationship between a load by a regenerating operation in a load application valve method and a load applied to an engine.

The load application valve method is a method for performing the regenerating operation by the load application device 139 (see FIG. 12) provided downstream of the pump 21 (discharge side). A load application valve is provided in series with the connection of the pump 21 and the actuator 23. In the load application valve method, the load applied to the engine 11 (engine load) is increased by the load application valve increasing a discharge pressure of the pump 21, whereby the exhaust temperature of the engine 11 is increased. Here, as shown in FIG. 10, a load generated by the load application valve is a load Lb and a load by the crane operation is a load Lc. In the load application valve method, the engine load in the case of simultaneously performing the regenerating operation and the crane operation differs depending on magnitudes of the loads Lb, Lc.

[1] When the load Lc≤the load Lb, the load Lb is applied to the engine 11.

[2] When the load Lc>the load Lb, the load applied to the engine 11 is only the load Lc necessary for the crane operation (load for activating the actuator 23) and the load Lb is not applied to the engine 11. Thus, the regenerating operation does not affect the crane operation. More specifically, under the condition [2], the load applied to the engine 11 is equal in the case of simultaneously performing the regenerating operation and the crane operation and in the case of performing the crane operation without performing the regenerating operation.

Thus, in the load application valve method, the regenerating operation and the crane operation can be simultaneously performed. Further, the crane operation may be limited (e.g. prohibited) during the regenerating operation to reliably complete the regenerating operation. Further, as in the second embodiment to be described later, the crane operation may be prioritized over the regenerating operation as long as a predetermined condition ("automatic regeneration automatic stop function ON" to be described later) is satisfied.

(Exhaust Brake Method)

Figure 11:
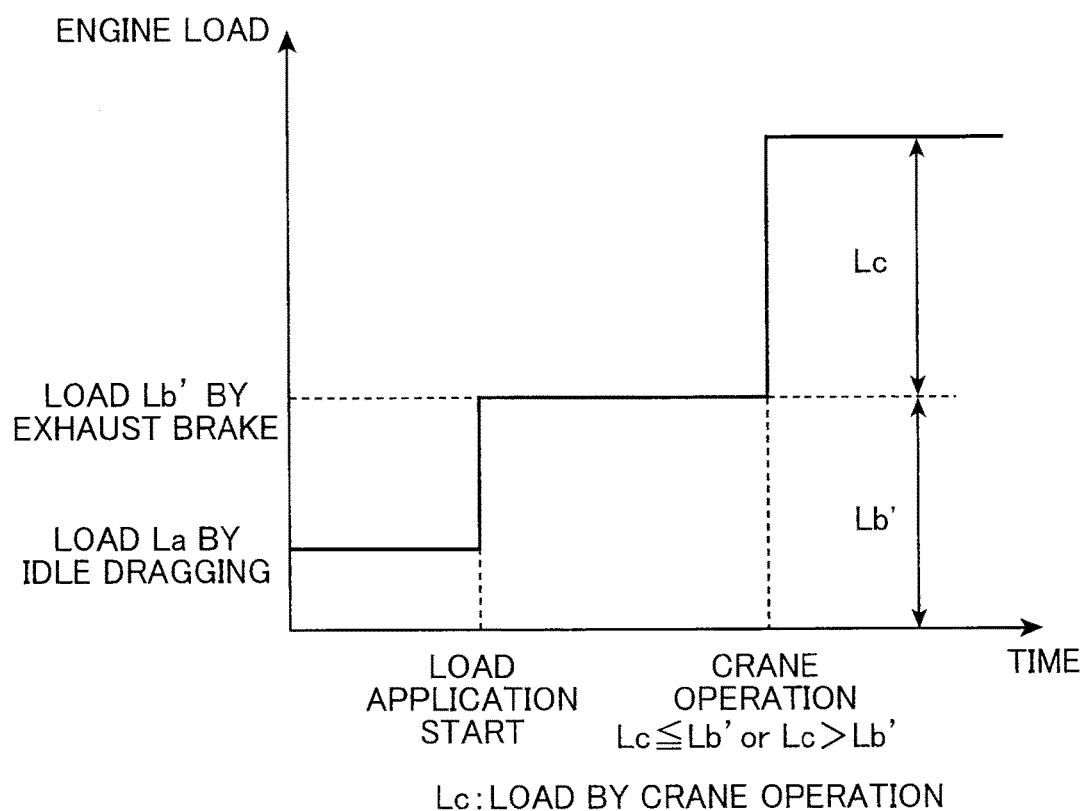
FIG. 11 is a graph, corresponding to FIG. 10, of a regenerating operation by an exhaust brake shown in FIG. 1 or the like,
FIG. 12 is a block diagram of an exhaust gas purification control device for construction machine of a second embodiment.

On the other hand, in the exhaust brake method, a load unnecessary for the crane operation is inevitably applied to the engine 11 in the case of simultaneously performing the regenerating operation and the crane operation as shown in FIG. 11. Here, a load generated by the exhaust brake 39 (see FIG. 1) is a load Lb'. In the exhaust brake method, a load applied to the engine 11 in the case of simultaneously performing the regenerating operation and the crane operation is the sum of the load Lb' and the load Lc (the load Lb' is added onto the load Lc). This is because the load Lb' by the exhaust brake 39 is constantly applied to (acts on) the engine 11 when the exhaust brake 39 is operated. Thus, in the exhaust brake method, the load applied to the engine 11 differs in the case of performing the crane operation without performing the regenerating operation and in the case of simultaneously performing the regenerating operation and the crane operation. Thus, a feeling of the crane operation differs. This leads to the deterioration of operability and a sense of incongruity given to an operator. Thus, in the load application valve method, it is important to perform only one of the crane operation and the regenerating operation as compared with the load application valve method.

Note that both the exhaust brake 39 shown in FIG. 1 and the load application device 139 (see FIG. 12) may be provided. In the case of providing only one of the exhaust brake 39 and the load application device 139, cost can be reduced as compared with the case where the both are provided.

The accumulation amount detection unit 33 detects (senses) an accumulation amount of the soot captured by the purification device 31 (may also be merely referred to as an "accumulation amount"). The accumulation amount detection unit 33 detects the accumulation amount of the soot by detecting a differential pressure between upstream and downstream sides of the filter of the purification device 31.

The operation-related devices 41 to 45 include an operation unit 41, an operator detection unit 43 and a manual regeneration button 45 (manual regeneration switching unit).

The operation unit 41 is a means used by the operator to operate the construction machine. The operation unit 41 is provided in a driving room (cabin) (not shown) of the construction machine. The manual regeneration button 45 is also provided in the driving room (cabin) (not shown). The operation unit 41 includes an accelerator operation unit 41a and the crane operation unit 41c.

The accelerator operation unit 41a is a means used by the operator to operate the rotational speed of the engine 11. The accelerator operation unit 41a is a means for operating an operating speed of the crane operation and a traveling speed of the construction machine by changing the rotational speed of the engine 11. The accelerator operation unit 41a is, for example, a pedal (accelerator pedal).

The crane operation unit 41c is a means used by the operator to operate the actuator 23 via the control valve 25. The crane operation unit 41c is a means used by the operator to perform the crane operation. Specifically, the crane operation unit 41c is a lever (crane operation lever). When the crane operation unit 41c is operated, a pilot pressure is output from the crane operation unit 41c to the control valve 25. As a result, the switching position of the control valve 25 is switched to change the activation of the actuator 23.

The operation detection unit 43 detects (senses) whether or not the operation unit 41 is being operated. The operation unit 43 includes an accelerator operation detection unit 43a and a crane operation detection unit 43c.

The accelerator operation detection unit 43a detects whether or not the accelerator operation (operation of the accelerator operation unit 41a) is being operated. The detection of the accelerator operation by the accelerator operation detection unit 43a is made based on a change of an output voltage of a potentiometer provided in the accelerator operation unit 41a which is, for example, a pedal. This detection may be made based on whether or not a switch provided in the accelerator operation unit 41a is on or off. This detection may be made by detecting a signal output from the accelerator operation unit 41a to an engine-side control unit 51 (described later). This detection may be made based on a command given by communication from the accelerator operation detection unit 43a to a crane-side control unit 53 (described later).

The crane operation detection unit 43c detects whether or not the crane operation (operation of the crane operation unit 41c) is being performed. The detection of the crane operation by the crane operation detection unit 43c is made, for example, by detecting a pilot pressure generated by the crane operation (pilot pressure output from the crane operation unit 41c to the control valve 25). This detection may be made based on whether or not a switch provided in the crane operation unit 41c is on or off.

The manual regeneration button 45 (manual regeneration switching unit) is a means used by the operator to select the regenerating operation (ON) or not (OFF). Examples of the manual regeneration button 45 include a switch on a touch panel and a push-button switch.

The regeneration control unit 50 is a part for inputting, computing and judging detection results from detection units, controlling the operation of each device and the like. The regeneration control unit 50 executes a plurality of types of controls for the regenerating operation. The regeneration control unit 50 includes the engine-side control unit 51 and the crane-side control unit 53.

The engine-side control unit 51 is an ECU (Engine Control Unit) for controlling the operation of the engine 11 and the like. A detection result on the accumulation amount from the accumulation amount detection unit 33 is input to the engine-side control unit 51. The engine-side control unit 51 controls the operations of the engine 11 and the regeneration unit 36. The engine-side control unit 51 instructs whether or not to perform the regenerating operation to the regeneration unit 36. The engine-side control unit 51 requests the regenerating operation (outputs a request signal) to the crane-side control unit 53.

The crane-side control unit 53 (machine-side control unit) determines whether or not to permit the regenerating operation in response to the request of the regenerating operation from the engine-side control unit 51. A detection result of the load detection unit 11b, a detection result of the operation detection unit 43 and a selection result of the manual regeneration button 45 are input to the crane-side control unit 53.

(Operation of Regeneration Control Unit 50)

The regeneration control unit 50 (crane-side control unit 53) switches the start and stop of the regenerating operation according to an "accumulation amount level". The above "accumulation amount level" is a level (region, stage, phase) (soot level, soot accumulation amount level) determined according to the accumulation amount of the soot. A plurality of accumulation amount levels are set in the regeneration control unit 50. The accumulation amount level is determined as in the following steps [a] and [b]. [a] The detection result on the accumulation amount is output from the accumulation amount detection unit 33 to the regeneration control unit 50 (engine-side control unit 51). [b] The engine-side control unit 51 determines under which accumulation amount level the input accumulation amount falls. A relationship between the input accumulation amount and the accumulation amount level is set in advance in the engine-side control unit 51. Specifically, the accumulation amount level increases every time the accumulation amount of the soot detected by the accumulation amount detection unit 33 exceeds a certain set value.

(Control of Display According to Accumulation Amount Level)

The regeneration control unit 50 controls a display (changes a display) of a monitor (not shown) in the driving room according to the accumulation amount level. Specifically, the regeneration control unit 50 operates as follows. A total of eleven accumulation amount levels of, e.g. 0 to 10 are set in the regeneration control unit 50. "0" is a minimum level of the accumulation amount and "10" is a maximum level of the accumulation amount. The regeneration control unit 50 causes a display on the accumulation amount level of 0 to 10 to be output to the motor. Note that the purification device 31 is judged to be broken when the accumulation amount level is 10.

(Control of Regenerating Operation according to Accumulation Amount Level)

The regeneration control unit 50 (crane-side control unit 53) switches a control of the regenerating operation by the regeneration unit 36 according to the accumulation amount level. Specifically, the regeneration control unit 50 operates as follows. A total of six accumulation amount levels of below A and A to E are set in the regeneration control unit 50 (engine-side control unit 51). As shown in Table 1, the regeneration control unit 50 changes conditions on the start (including restart) and end (including interruption) of the regenerating operation. The accumulation amount level is a level set in view of regeneration efficiency, safety and the like. The accumulation amount levels of A to E may or may not be related to the above accumulation amount levels of 0 to 10. This relation may be appropriately changed according to a state. Further, the number of the accumulation amount levels may be appropriately changed.

TABLE 1

| Accumulation Amount Level | Regulating Operation ○: Performed, X: Not Performed | Start of Regenerating Operation | Interruption of Regenerating Operation |
| --- | --- | --- | --- |
| E | ○ | Automatic (Forced) | X |
| D | ○ | Manual | X |
| C | ○ | Manual | ○ (Rotational Speed Limited) |
| B | ○ | Manual | ○ |
| A | ○ | Automatic | ○ |
| Below A | X | — | — |

The regeneration unit 50 switches a control from a control of prioritizing the operation by the operation unit 41 to a control of prioritizing the regenerating operation in a stepwise manner as the accumulation amount of the soot increases. Specifically, the regeneration control unit 50 switches the control as follows.

(Accumulation Amount Level of Below A: No Regenerating Operation)

At the accumulation amount level "below A", no regenerating operation is performed. At the accumulation amount level below A, the engine-side control unit 51 does not request the regenerating operation to the crane-side control unit 53.

(Accumulation Amount Level A or Higher)

At the accumulation amount level A or higher, the regenerating operation may be performed. Conditions on the start of the regenerating operation when the accumulation amount level is A or higher include that the operation unit 41 is not being operated. This is to prevent a sudden change in the operation of the actuator 23 and a sudden change in the rotational speed of the engine 11 caused by the start of the regenerating operation during the operation of the operation unit 41. By preventing the above sudden changes, the swing of a suspended load (load swing) and the like caused by these sudden changes are prevented and the operator's fatigue is reduced. The above sudden changes occur as follows. When the exhaust brake 39 is activated, a load of the engine 11 increases and the rotational speed of the engine 11 decreases. Thus, even if the accelerator operation is constant, the rotational speed of the engine 11 changes when the regenerating operation is started. Further, even if the crane operation is constant, the rotational speed of the engine 11 changes due to the start of the regenerating operation. Thus, the rotational speed of the pump 21 changes, whereby the activation of the actuator 23 changes.

(Accumulation Amount Level A: Automatic Regeneration Control)

At the accumulation amount level A (automatic regeneration region), the regenerating operation is automatically started. At the accumulation amount level A, the operation of the operation unit 41 is prioritized over the regenerating operation. Specifically, if the crane operation or the accelerator operation is performed during the regenerating operation, the regenerating operation is temporarily stopped. More specifically, the regeneration control unit 50 executes an automatic regeneration control at the accumulation amount level A. In the automatic regeneration control, the regeneration unit 36 is caused to perform the regenerating operation when it is detected by the operation detection unit 43 that the operation unit 41 is not being operated. Further, in the automatic regeneration control, the regeneration unit 36 is caused to stop the regenerating operation when it is detected by the operation detection unit 43 that the operation unit 41 is being operated.

(Accumulation Amount Levels B to D: Manual Regeneration Control)

At the accumulation amount levels B to D (manual regeneration region), the conditions on the start of the regenerating operation include the turning "ON" of the manual regeneration button 45. At the accumulation amount levels B to D, the regeneration control unit 50 executes a manual regeneration control.

In the manual regeneration control, the regeneration unit 36 is caused to perform the regenerating operation when it is detected by the operation detection unit 43 that the operation unit 41 is not being operated and the regenerating operation is selected by the manual regeneration button 45 (when "ON").

(Accumulation Amount Levels B and C: Manual Regeneration Interruption Control, Manual Regeneration Restart Control, Manual Regeneration Manual Stop Control))

At the accumulation amount levels B and C, the regenerating operation (manual regeneration) can be interrupted and restarted. The interruption (temporary stop) of the regenerating operation is to stop the regenerating operation before the "completion of the regenerating operation". The above "completion of the regenerating operation" means that the accumulation amount of the soot falls below a "predetermined value" because of the regenerating operation. The above "predetermined value" is set in advance in the regeneration control unit 50 (engine-side control unit 51). More specifically, at the accumulation amount levels B and C, the regeneration control unit 50 executes a manual regeneration interruption control, a manual regeneration restart control and a manual regeneration manual stop control.

In the manual regeneration interruption control, the regenerating operation is interrupted when the operation unit 41 is operated during the manual regeneration control. More specifically, in the manual regeneration interruption control, the regenerating operation of the regeneration unit 36 is stopped if it is detected by the operation detection unit 43 that the operation unit 41 is being operated when the regeneration unit 36 is performing the regenerating operation by the manual regeneration control.

In the manual regeneration restart control, the regenerating operation is restarted (returned) when the operation unit 41 is no longer operated while the regenerating operation is interrupted. More specifically, in the manual regeneration restart control, the regeneration unit 36 is caused to restart the regenerating operation if it is detected by the operation detection unit 43 that the operation unit 41 is not being operated when the regenerating operation is stopped by the manual regeneration interruption control and if the regenerating operation is selected by the manual regeneration button 45 (if "ON").

In the manual regeneration manual stop control, the regenerating operation is interrupted when the manual regeneration button 45 is turned "OFF". More specifically, the regenerating operation of the regeneration unit 36 is stopped when it is selected not to perform the regenerating operation by the manual regeneration button 45 (when "OFF").

(Accumulation Amount Level C: Accelerator Invalidation Control)

At the accumulation amount level C, the accelerator operation during the interruption of the regenerating operation is invalidated unlike at the accumulation amount level B. Further, at this time, the rotational speed of the engine 11 is regulated (limited) to a value set in advance (e.g. Low idle rotational speed). More specifically, the regeneration control unit 50 executes an accelerator invalidation control at the accumulation amount level C.

In the accelerator invalidation control, the operation by the accelerator operation unit 41a is invalidated and the rotational speed of the engine 11 is regulated when the regenerating operation of the regeneration unit 36 is stopped by the manual regeneration interruption control.

(Accumulation Amount Level D: Operation Invalidation Control, Manual Regeneration Switch Invalidation Control)

At the accumulation amount level D, the interruption of the regenerating operation is prohibited (regenerating operation is prioritized over the operation of the operation unit 41). More specifically, the regeneration control unit 50 executes an operation invalidation control and a manual regeneration switch invalidation control at the accumulation amount level D.

In the operation invalidation control, the operation by the operation unit 41 is invalidated and the regeneration unit 36 is caused to perform the regenerating operation regardless of whether or not the operation unit 41 is being operated when the regeneration unit 36 performs the regenerating operation by the manual regeneration control.

In the manual regeneration switch invalidation control, the regeneration unit 36 is caused to perform the regenerating operation regardless of a selection state of the manual regeneration button 45 ("ON" or "OFF") when the regeneration unit 36 performs the regenerating operation by the manual regeneration control.

(Accumulation Amount Level E: Forced Regeneration Control)

At the accumulation amount level E (forced regeneration region), the regenerating operation is automatically started even if the manual regeneration button 45 is "OFF" when the operation unit 41 is not being operated. Further, at this time, the interruption of the regenerating operation is prohibited. More specifically, the regeneration control unit 50 executes a forced regeneration control at the accumulation amount level E.

In the forced regeneration control, the regeneration unit 36 is caused to perform the regenerating operation regardless of a detection state of the operation detection unit 43 and regardless of the selection state of the manual regeneration button 45.

(Flow Charts)

The operation (Steps S201 to S931) of the exhaust gas purification control device 1 is described in more detail with reference to flow charts of FIGS. 2 to 9 (see FIG. 1 concerning each constituent element of the exhaust gas purification control device 1 below).

(Determination of Accumulation Amount Level: S201 to S206)

In Steps S201 to S206, the accumulation amount level is determined. A flow X (FIG. 3) follows when the accumulation amount level is below A (YES in S201), a flow A (FIG. 4) follows when the accumulation amount level is A (YES in S202), a flow B (FIG. 5) follows when the accumulation amount level is B (YES in S204), a flow C (FIG. 7) follows when the accumulation amount level is C (YES in S205), a flow D (FIG. 8) follows when the accumulation amount level is D (YES in S206) and a flow E (FIG. 9) follows when the accumulation amount level is E (NO in S206). When the accumulation amount of the soot exceeds the accumulation amount level A (NO in Step S202), the regenerating operation is prohibited in Step S203 (described later). Note that it is assumed that the accumulation amount does not fall to the lower accumulation amount level until the regenerating operation is completed. For example, even if the soot is reduced by performing the regenerating operation and the accumulation amount corresponding to the accumulation amount level A is reached after the accumulation amount level is determined to be "B", the accumulation amount level remains to be "B". Note that the accumulation amount may fall to the lower accumulation amount level before the regenerating operation is completed.

In Step S203, a regeneration permit signal is set to "0". The regeneration permit signal is a signal for determining whether or not the regenerating operation is being performed. The regeneration permit signal is "0" when the regenerating operation is prohibited and "1" when the regenerating operation is permitted.

(Flow X: S301 to S303)

Figure 3:
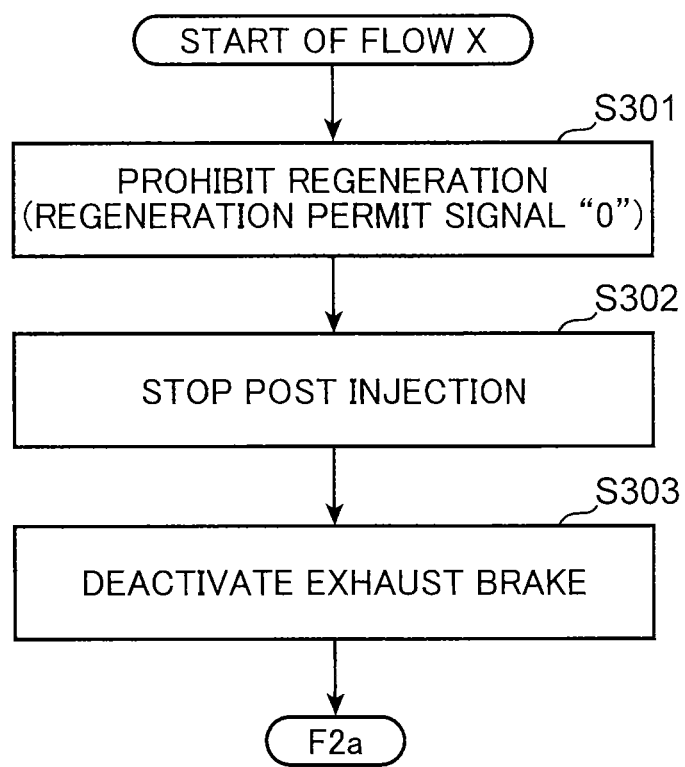
FIG. 3 is a flow chart of the operation of the exhaust gas purification control device shown in FIG. 1.

The flow X shown in FIG. 3 is a flow when the accumulation amount of the soot is below the accumulation amount level A. Further, the flow X is a flow when the regenerating operation is not performed at the accumulation amount level A (when YES in S415 shown in FIG. 4).

In Step S301, the regeneration permit signal is set to "0".

In Step S302, the post injection is stopped. If the post injection is already stopped, the stopped state is continued (the same holds true for the start and stop of the regenerating operation and the post injection, the permission and prohibition of the regenerating operation, the activation and deactivation of the exhaust brake 39, the validation and invalidation of the operation and the like).

In Step S303, the exhaust brake 39 is deactivated. Then, Step S201 shown in FIG. 2 follows via F1a.

(Flow A: S401 to S429)

Figure 4:
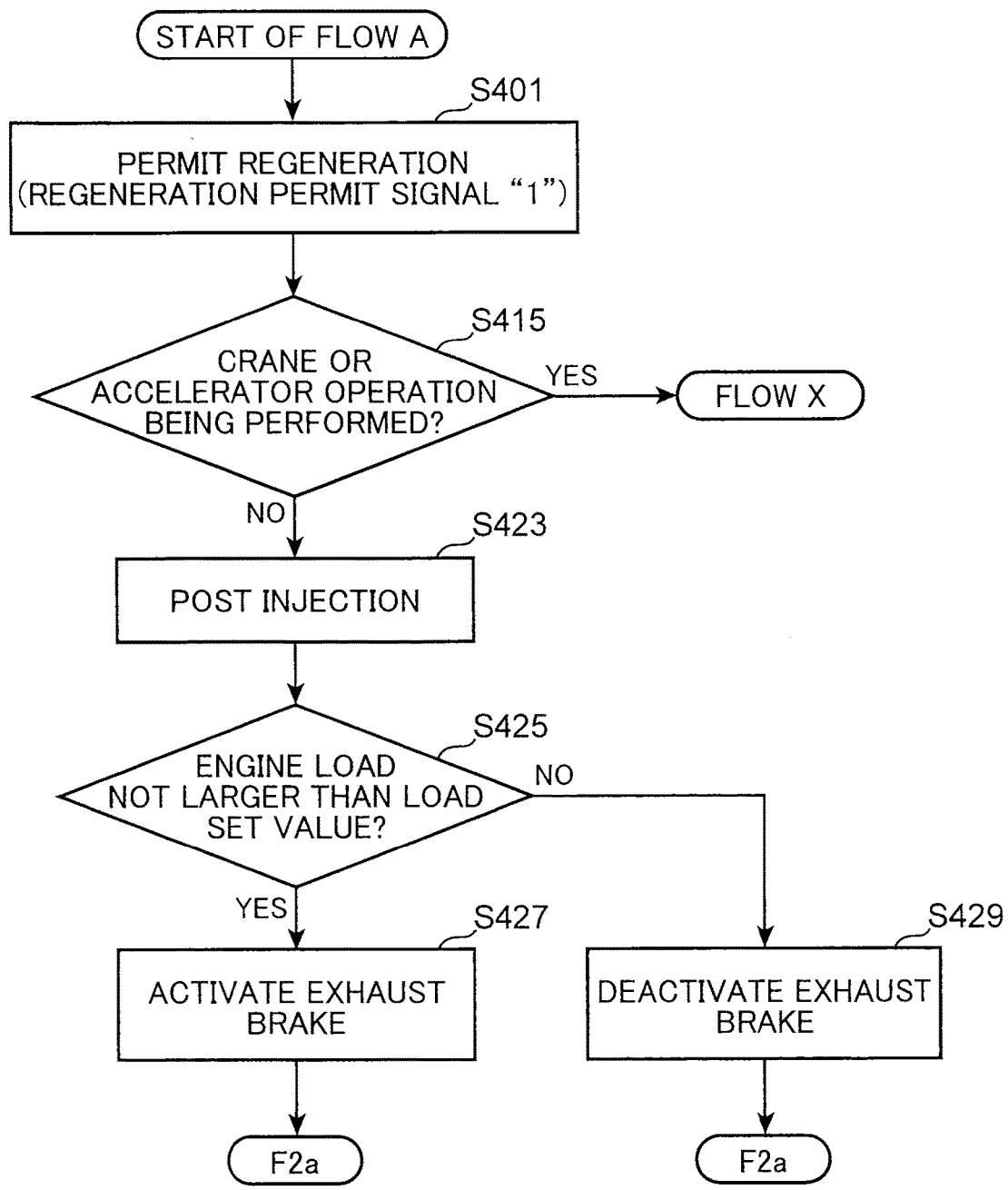
FIG. 4 is a flow chart of the operation of the exhaust gas purification control device shown in FIG. 1.

The flow A shown in FIG. 4 is a flow when the accumulation amount of the soot is at the accumulation amount level A. In the flow A, the automatic regeneration control (described above) is executed.

In Step S401, the regeneration permit signal is set to "1".

In Step S415, it is determined whether or not at least one of the crane operation and the accelerator operation is being performed. If either one of the crane operation and the accelerator operation is being performed (YES in Step S415), the flow X (FIG. 3) flows and the regenerating operation is not performed. If neither of these operations is being performed (NO in Step S415), Step S423 follows and the regenerating operation may be performed.

(Steps S423 to S429: Regenerating Operation Partial Stop Control)

In Steps S423 to S429, a regenerating operation partial stop control is executed. In the regenerating operation partial stop control, the regenerating operation is at least partially stopped when a load detected by the load detection unit 11b during the regenerating operation exceeds a "load set value". The above "load set value" (specified value, upper limit value) is set in advance in the regeneration control unit 50. The regenerating operation partial stop control is also executed in the flow B (see FIG. 5) and the flow C (see FIG. 7) to be described later.

(Total Stop)

When the regenerating operation is totally stopped in the regenerating operation partial stop control, the load application to the engine 11 by the exhaust brake 39 and the post injection by the post injection unit 37 are stopped.

(Partial Stop)

When the regenerating operation is partially stopped in the regenerating operation partial stop control, the load application by the exhaust brake 39 is stopped and the post injection is performed. By stopping the load application by the exhaust brake 39, the production of the soot can be suppressed and the erosion of the purification device 31 associated with the production of the soot can be suppressed. The details of the production of the soot and the occurrence of the erosion are as in the following steps [a] to [e]. [a] When the exhaust brake 39 is closed, an exhaust pressure (back pressure) of the engine 11 increases. At this time, if an operation not detected by the operation detection unit 43 (e.g. steering wheel operation) is performed, a load applied to the engine 11 further increases. Note that the steering wheel operation is an operation to change an angle of wheels (not shown) with respect to a front-back direction of the construction machine by extending or contracting a steering cylinder (not shown). In this embodiment, the steering wheel operation is not detected (may be detected) by the operation detection unit 43. [b] Then, an engine stall occurs in some cases due to an excessively large load applied to the engine 11. [c] If the engine 11 is going to stall, it maintains the rotation by injecting the fuel (main injection). However, since the exhaust brake 39 is activated (exhaust pipe 11a is throttled), the engine 11 cannot sufficiently burn the fuel by sucking a sufficient amount of air (enters a state of oxygen deficiency). [d] As a result, a large amount of the soot is produced and accumulated in the purification device 31. As a result, the purification device 31 may be clogged in an early stage. [e] If the regenerating operation is performed when the large amount of the soot is accumulated in the purification device 31, the burning of the soot spreads at once and a temperature inside the purification device 31 abnormally increases. As a result, the erosion of the purification device 31 occurs.

The regenerating operation partial stop control is described based on the flow chart shown in FIG. 4 below.

In Step S423, the post injection is performed.

In Step S425, it is determined whether or not the load of the engine 11 detected by the load detection unit 11b is not larger than the load set value. If the load of the engine 11 is not larger than the load set value (YES in Step S425), Step S427 follows and the exhaust brake 39 is activated. If the load is larger than the load set value (NO in Step S425), Step S429 follows and the exhaust brake 39 is deactivated. Step S201 shown in FIG. 2 follows after Steps S427 and S429 via F2a.

(Flow B: S501 to S531)

Figure 5:
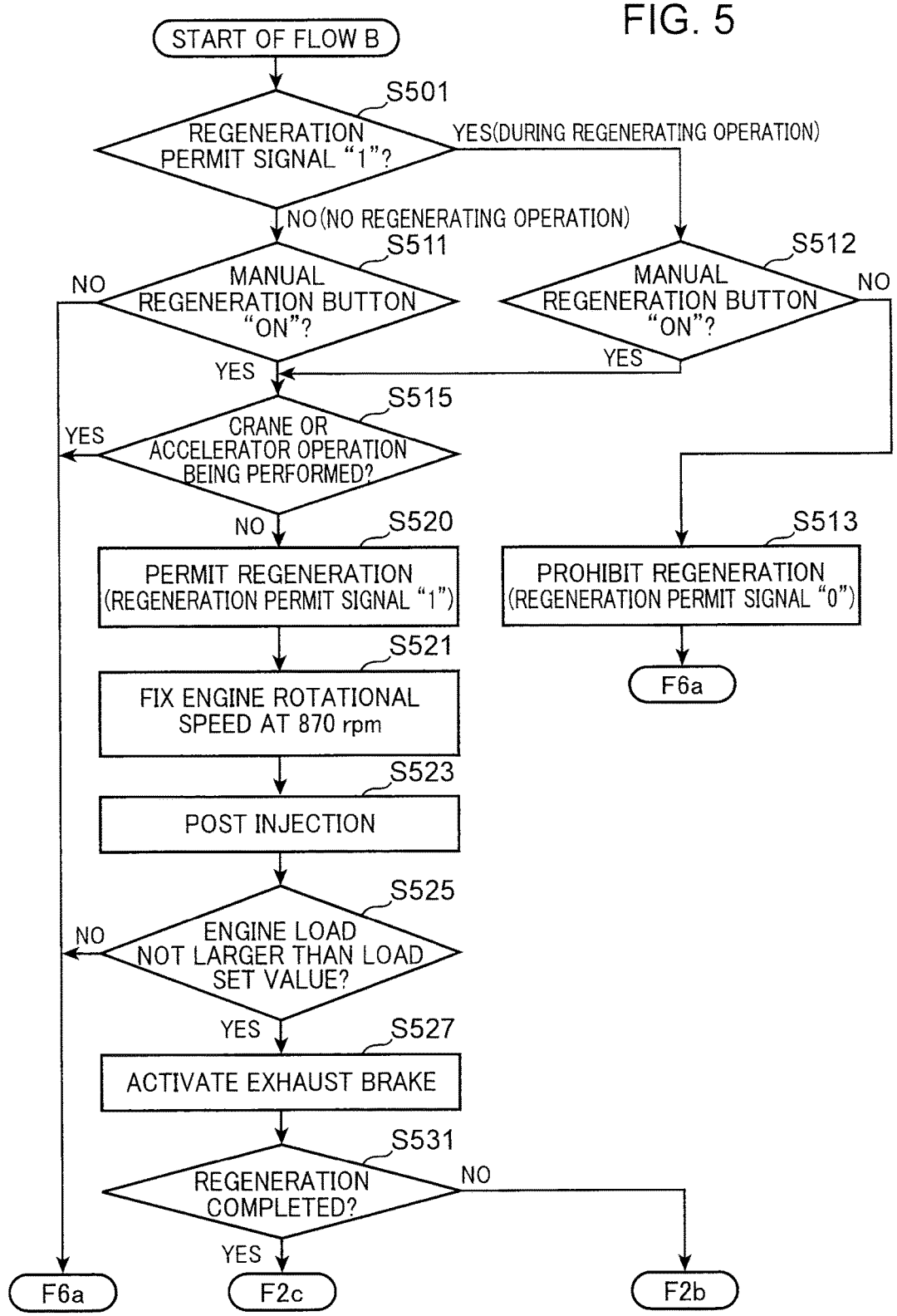
FIG. 5 is a flow chart of the operation of the exhaust gas purification control device shown in FIG. 1.

The flow B shown in FIG. 5 is a flow when the accumulation amount of the soot is at the accumulation amount level B. In the flow B, the manual regeneration control, the manual regeneration interruption control, the manual regeneration restart control and the manual stop control described above are executed.

In Step S501, it is determined whether or not the regeneration permit signal is "1" (whether or not the regenerating operation is being performed). If the regeneration permit signal is "0" (NO in Step S501 (during the stop of the regenerating operation)), Step S511 follows. If the regeneration permit signal is "1" (YES in Step S501 (during the regenerating operation)), Step S512 follows. Note that if the regenerating operation has been interrupted by performing the operation of the operating unit 41 during the regenerating operation, the regeneration permit signal is "1" (YES).

Operation in Steps S511 to S515 is as follows.

When the manual regeneration button 45 is "ON" (YES in S511 or S512) and neither the crane operation nor the accelerator operation is being performed (NO in S515), Step S520 follows and the regenerating operation is performed.

Figure 6:
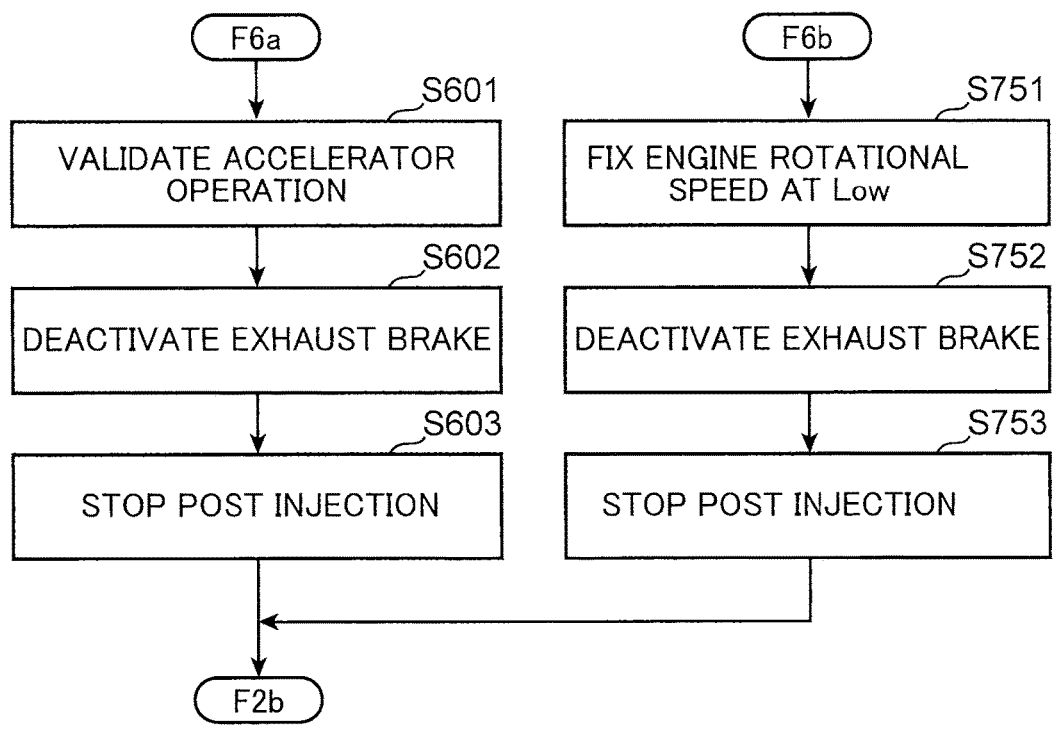
FIG. 6 is a flow chart of the operation of the exhaust gas purification control device shown in FIG. 1.

If the manual regeneration button 45 is "OFF" (NO in S511 or S512), Step S601 shown in FIG. 6 follows via F6a and the regenerating operation is stopped. Further, if at least either one of the crane operation and the accelerator operation is performed (YES in S515 shown in FIG. 5), Step S601 shown in FIG. 6 follows via F6a and the regenerating operation is stopped.

Note that the regeneration permit signal is set to "0" (S513) during the regenerating operation (YES in S501 shown in FIG. 5) and if the manual regeneration button 45 is "OFF" (NO in S512).

In Step S520, the regeneration permit signal is set to "1".

In Step S521, the rotational speed of the engine 11 is limited. The rotational speed of the engine 11 is fixed, for example, at 870 rpm. In this way, the amount of the exhaust gas is ensured and the exhaust temperature of the engine 11 easily increases. Thus, the regenerating operation is reliably performed.

In Step S523, the post injection is performed.

In Step S525, as in Step S425, it is determined whether or not the load applied to the engine 11 is not larger than the load set value. If the load is not larger than the load set value (YES), Step S527 follows, the exhaust brake 39 is activated (S527) and Step S531 follows. If the load is larger than the load set value (NO), Step S601 shown in FIG. 6 follows via F6a and the regenerating operation is stopped.

In Step S531, it is determined whether or not the regenerating operation has been completed as shown in FIG. 5. Unless the regenerating operation has been completed (NO), Step S204 shown in FIG. 2 follows via F2b. If the regenerating operation has been completed (YES), Step S551 shown in FIG. 2 follows via F2c.

(Steps S551 to S554: Operation when Regenerating Operation is Completed)

Figure 2:
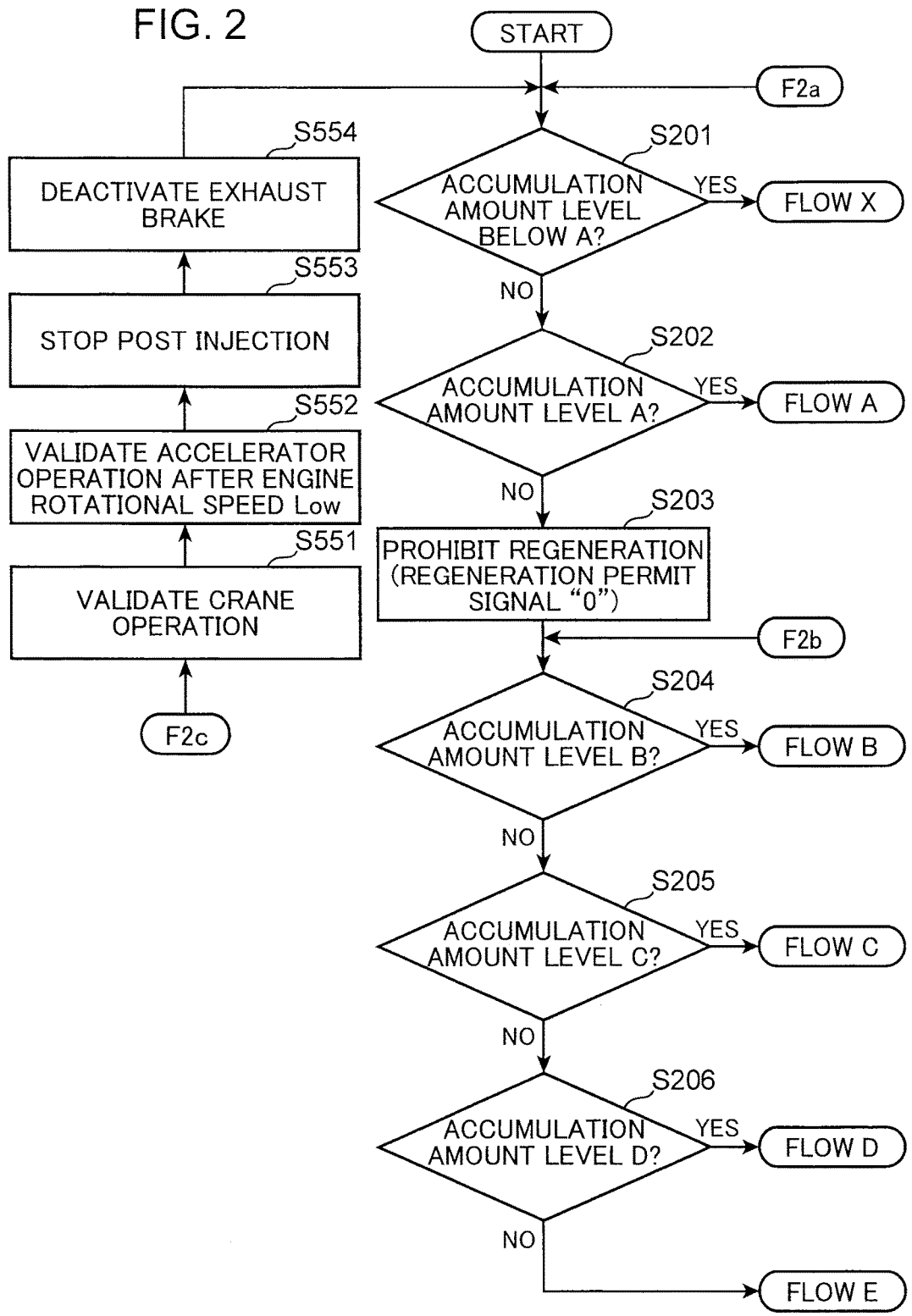
FIG. 2 is a flow chart of the operation of the exhaust gas purification control device shown in FIG. 1.

As shown in FIG. 2, the operation when the regenerating operation is completed is as follows.

In Step S551, the crane operation is validated.

In S552, the accelerator operation is validated after the rotational speed of the engine 11 is set to a predetermined value (e.g. Low idle rotational speed).

In Step S553, the post injection is stopped.

In Step S554, the exhaust brake 39 is deactivated.

(Steps S601 to S603: Operation During Interruption of Regenerating Operation)

As shown in FIG. 6, the operation when the regenerating operation is interrupted is as follows.

In Step S601, the accelerator operation is validated.

In Step S602, the exhaust brake 39 is deactivated.

In Step S603, the post injection is stopped. Then, Step S204 shown in FIG. 2 follows via F2b.

(Flow C: S701 to S731)

Figure 7:
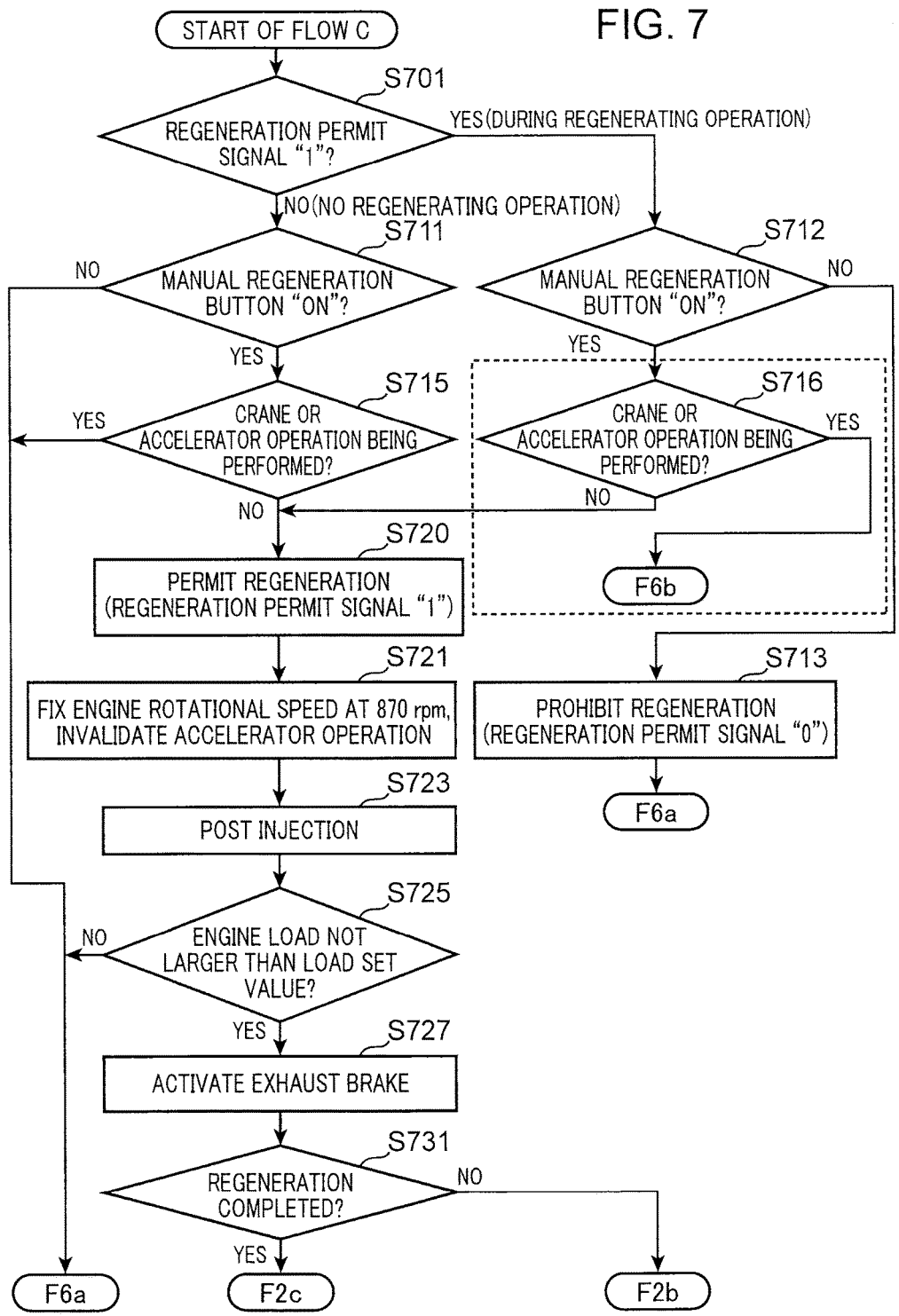
FIG. 7 is a flow chart of the operation of the exhaust gas purification control device shown in FIG. 1.

The flow C shown in FIG. 7 is a flow when the accumulation amount of the soot is at the accumulation amount level C. In the flow C, the aforementioned accelerator invalidation control is executed. The flow C differs from the flow B (see FIG. 5) in that the flow C has Step S716 (see broken line part of FIG. 7). Note that Steps common to the flow B (see FIG. 5) and the flow C have the same lower two digits of reference signs in the flows B and C (Steps common to the flow C and the flow D shown in FIG. 8 and Steps common to the flow D and the flow E shown in FIG. 9 also have the same lower two digits of reference signs).

As shown in FIG. 7, Step S716 follows during the regenerating operation (YES in S701) and if the manual regenerating button 45 is "ON" (YES in S712).

In Step S716, it is determined whether or not at least either one of the crane operation and the accelerator operation is being performed. If neither the crane operation nor the accelerator operation is being performed (NO), Step S720 follows and the regenerating operation is performed (regenerating operation is continued). If either one of the crane operation and the accelerator operation is being performed, Step S751 shown in FIG. 6 follows via F6b.

In Step S751, the rotational speed of the engine 11 is limited. Specifically, the rotational speed of the engine 11 is fixed at the Low idle rotational speed and the accelerator operation is invalidated.

In Step S752, the exhaust brake 39 is deactivated.

In Step S753, the post injection is stopped. Then, Step S204 shown in FIG. 2 follows via F2b.

(Flow D: S801 to S831)

Figure 8:
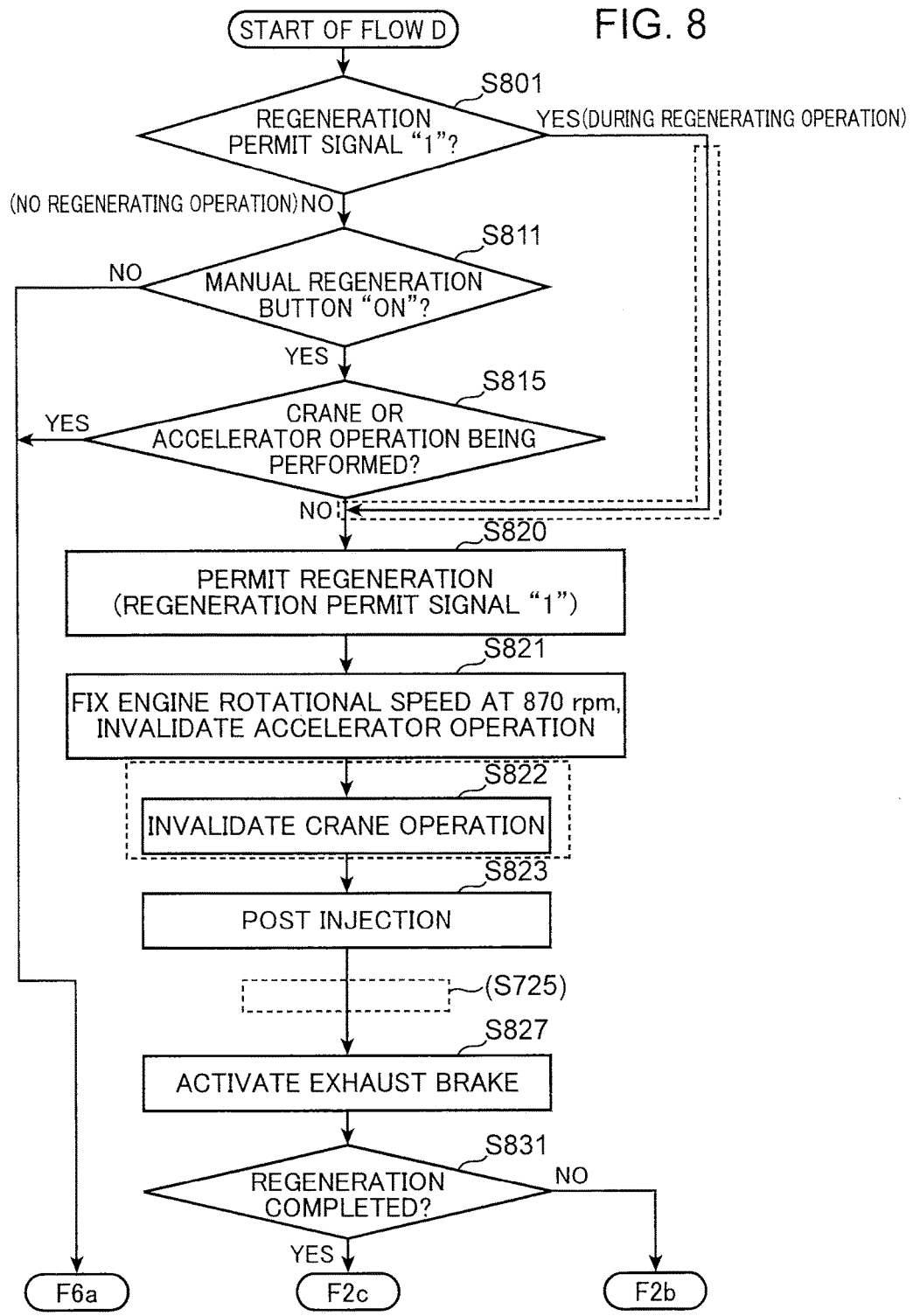
FIG. 8 is a flow chart of the operation of the exhaust gas purification control device shown in FIG. 1.

The flow D shown in FIG. 8 is a flow when the accumulation amount of the soot is at the accumulation amount level D. In the flow D, the aforementioned manual regeneration switch invalidation control is executed. The flow D differs from the flow C (see FIG. 7) in a broken line part of FIG. 8 and further in that Step S820 follows when YES in Step S801 (during the regenerating operation) (Steps S712, S713 and S716 shown in FIG. 7 are absent), Step S822 shown in FIG. 8 is present and Step S725 shown in FIG. 7 is absent. Note that Step S725 may be present.

As shown in FIG. 8, Step S820 follows and the regenerating operation is continued if the regenerating operation is being performed (YES) in Step S801. At this time, judgment as to whether the manual regenerating button 45 is "ON" or "OFF" (S712 of FIG. 7) is not made. Further, judgment as to whether the crane operation or the accelerator operation is being performed (S716 of FIG. 7) is not made. In the flow D, there is no Step (logic) in which the regenerating operation is interrupted (same holds true also in the flow E to be described later).

In Step S822, the crane operation is invalidated. Specifically, both the accelerator operation (S821) and the crane operation are invalidated during the regenerating operation.

(Flow E: S903 to S931)

Figure 9:
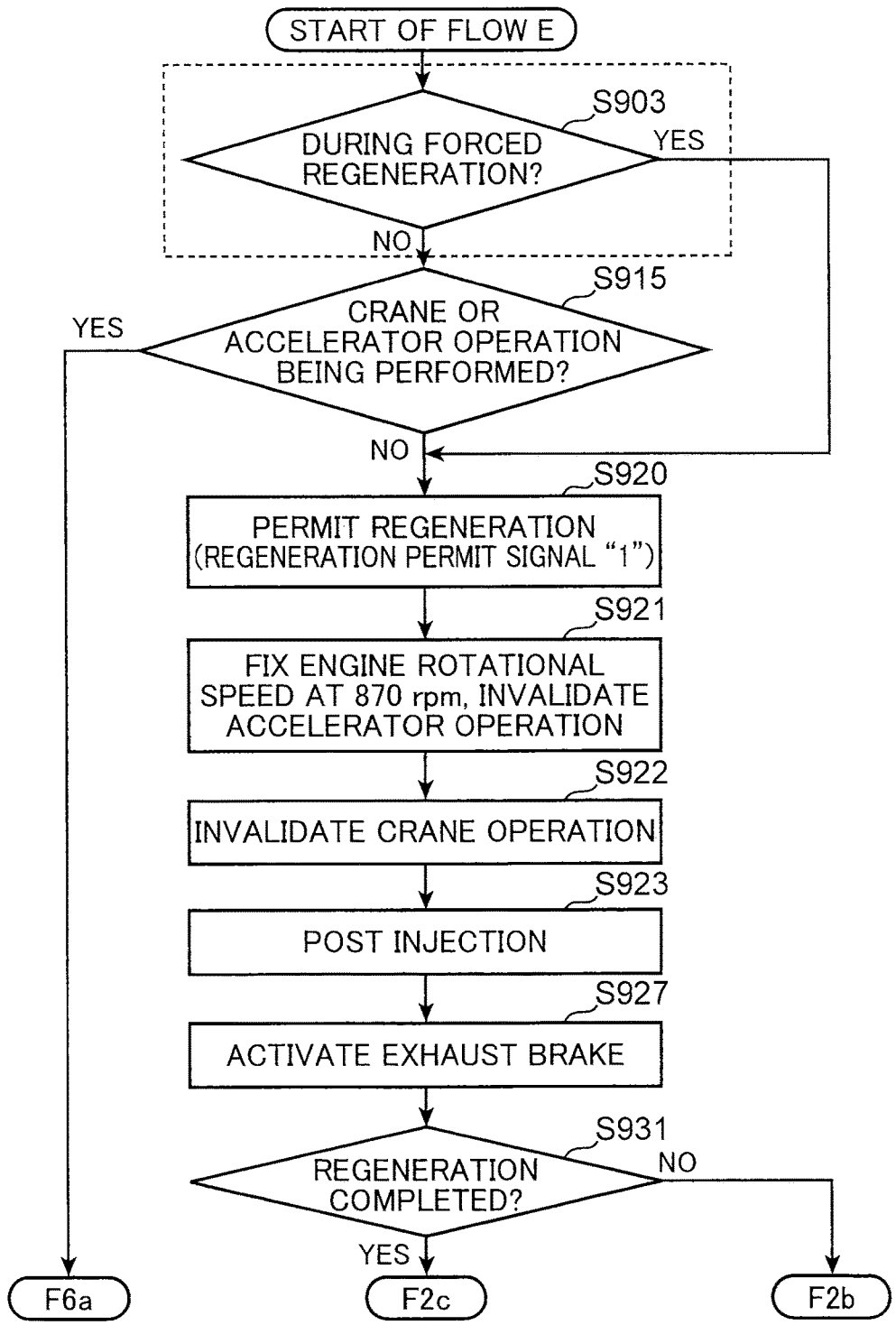
FIG. 9 is a flow chart of the operation of the exhaust gas purification control device shown in FIG. 1.

The flow E shown in FIG. 9 is a flow when the accumulation amount of the soot is at the accumulation amount level E. In the flow E, the aforementioned forced regeneration control is executed. The flow E differs from the flow D (see FIG. 8) in a broken line part of FIG. 9 and in that Step S903 of FIG. 9 is present instead of Step S801 of FIG. 8 and Step S811 of FIG. 8 is absent.

In Step S903, as shown in FIG. 9, it is determined whether or not the regenerating operation by the forced regeneration control is being performed (forced regeneration is being performed). If the forced regeneration is being performed (YES), Step S920 follows and the regenerating operation is continued. In this case, judgment as to whether the manual regenerating button 45 is "ON" or "OFF" (S811 of FIG. 8) is not made. If the forced regeneration is not being performed (NO), Step S915 follows and it is determined whether or not the crane operation or the accelerator operation is being performed as in Step S815 shown in FIG. 8.

(Effect 1)

Next, effects by the exhaust gas purification control device 1 shown in FIG. 1 are described. The exhaust gas purification control device 1 includes the engine 11, the actuator 23 using the engine 11 as a driving source, the operation unit 41 used by the operator to operate the actuator 23 or the engine 11, the operation detection unit 43 for detecting whether or not the operation unit 41 is being operated, the purification device 31 for capturing the soot in the exhaust of the engine 11, the accumulation amount detection unit 33 for detecting the accumulation amount of the soot captured by the purification device 31, the regulation unit 36 for performing the regenerating operation (operation of regenerating the purification device 31 by burning the soot captured by the purification device 31), and the regulation control unit 50 for executing a plurality of types of controls for the regenerating operation.

[Configuration 1] The regulation control unit 50 switches the control from the control of prioritizing the operation by the operation unit 41 to the control of prioritizing the regenerating operation in a stepwise manner as the accumulation amount of the soot detected by the accumulation amount detection unit 33 increases.

In the above [Configuration 1], the control is executed to prioritize the operation by the operation unit 41 as the accumulation amount of the soot decreases. Thus, the operability of the construction machine is ensured (work is easily performed by operating the operation unit 41). Further, in the above [Configuration 1], the control is executed to prioritize the regenerating operation as the accumulation amount of the soot increases. Thus, a chance of regenerating the purification device 31 is ensured (regenerating operation is easily completed). Therefore, the soot clogging of the purification device 31 is suppressed.

In the above [Configuration 1], the priority of the operation by the operation unit 41 is reduced more than the priority of the regenerating operation as the accumulation amount of the soot increases. Thus, the operator is urged to perform the regenerating operation. More specifically, the operator easily notices an increase in the accumulation amount of the soot. Further, the operator tends to think of performing the regenerating operation in a stage where the accumulation amount of the soot is small (while the priority of the operation by the operation unit 41 is high). In this way, the operator is urged to perform the regenerating operation, wherefore a chance of regenerating the purification device 31 is easily ensured. Further, if the regenerating operation is performed in the stage where the accumulation amount is small, the regenerating operation is completed in a shorter time as compared with the case where the regenerating operation is performed in a stage where the accumulation amount is large. Thus, operability is improved.

(Effect 2)

A plurality of types of controls executed by the regulation control unit 50 include the automatic regeneration control (see FIG. 4). In the automatic regeneration control, the following operation is performed.

[Configuration 2-1] The regulation unit 36 is caused to perform the regenerating operation when it is detected by the operation detection unit 43 that the operation unit 41 is not being operated (NO in S415 of FIG. 4).

[Configuration 2-2] The regenerating operation of the regulation unit 36 is stopped when it is detected by the operation detection unit 43 that the operation unit 41 is being operated (YES in S415 of FIG. 4).

By the above [Configuration 2-1], the regenerating operation is automatically performed even without the operator being aware of the regenerating operation. Thus, a chance of regenerating the purification device 31 is ensured.

In the above [Configuration 2-2], the operation of the operation unit 41 is prioritized over the regenerating operation. Thus, operability is more reliably ensured.

(Effect 3)

The exhaust gas purification control device 1 includes the manual regeneration button 45 (manual regeneration switching unit) used by the operator to select whether or not to perform the regenerating operation. The plurality of types of controls executed by the regulation control unit 50 include the manual regeneration control (see FIG. 5, etc.). In the manual regeneration control, the regulation unit 36 is caused to perform the regenerating operation when it is detected by the operation detection unit 43 that the operation unit 41 is not being operated (NO in S515 of FIG. 5) and the regenerating operation is selected by the manual regeneration button 45 (YES in S511 or S512 of FIG. 5).

To perform the regenerating operation in this manual regeneration control, the operator selects to perform the regenerating operation using the manual regeneration button 45 (ON). Thus, the operator's intention to perform the regenerating operation is necessary to perform the regenerating operation in the manual regeneration control. On the other hand, if the regenerating operation is automatically started (e.g. automatic regeneration control), the operator's intension is unnecessary. Thus, in the manual regeneration control, the operator is easily aware of an increase in the accumulation amount of the soot as compared with the case where the regenerating operation is automatically started (e.g. automatic regeneration control). As a result, in the manual regeneration control, the operator is urged to perform the regenerating operation.

(Effect 4)

The plurality of types of controls executed by the regulation control unit 50 include the manual regeneration interruption control. In the manual regeneration interruption control, the regenerating operation of the regulation unit 36 is stopped if it is detected by the operation detection unit 43 that the operation unit 41 is being operated (YES in S515 of FIG. 5) when the regulation unit 36 is performing the regenerating operation by the manual regeneration control (YES in S501 of FIG. 5).

In this manual regeneration interruption control, the operation of the operation unit 41 is prioritized over the regenerating operation. Thus, operability is reliably ensured.

(Effect 5)

The operation unit 41 includes the accelerator operation unit 41a used by the operator to control the rotational speed of the engine 11. The plurality of types of controls executed by the regulation control unit 50 include the accelerator invalidation control (see F6b of FIG. 6, etc.). In the accelerator invalidation control, the operation by the accelerator operation unit 41a is invalidated and the rotational speed of the engine 11 is regulated (S751 of FIG. 6) when the regenerating operation of the regulation unit 36 is stopped by the manual regeneration interruption control (YES in S716 of FIG. 7).

In this accelerator invalidation control, the regenerating operation is more prioritized as compared with the case where the operation by the accelerator operation unit 41a is not invalidated and the rotational speed of the engine 11 is not regulated. Thus, the operator easily notices a transition from the control free from the accelerator invalidation control (operation-prioritized control) to the control with the accelerator invalidation control (regenerating operation-prioritized control). As a result, the operator easily notices an increase in the accumulation amount of the soot.

(Effect 6)

The plurality of types of controls executed by the regulation control unit 50 include the manual regeneration restart control (see FIG. 5). In the manual regeneration restart control, the regulation unit 36 is caused to perform the regenerating operation if it is detected by the operation detection unit 43 that the operation unit 41 is not being operated (NO in S515 of FIG. 5) and the regenerating operation is selected by the manual regeneration button 45 (YES in S512), when the regenerating operation is stopped by the manual regeneration interruption control (at this time, the regeneration permit signal is "1" and YES in S501 of FIG. 5).

In this manual regeneration restart control, the regenerating operation is restarted when the operation unit 41 is no longer operated after the regenerating operation is interrupted due to the operation of the operation unit 41 (after the manual regeneration interruption control). Thus, a chance of regenerating the purification device is ensured. For example, the regenerating operation is restarted if a state free from the operation of the operation unit 41 is set even if the operator unintentionally operates the operation unit 41 (such as if something contacts the crane operation unit 41c without the operator noticing).

(Effect 7)

The plurality of types of controls executed by the regulation control unit 50 include the manual regeneration manual stop control (see FIG. 5). In the manual regeneration manual stop control, the regenerating operation of the regulation unit 36 is stopped (S513 of FIG. 5, etc.) when it is selected by the manual regeneration button 45 not to perform the regenerating operation ("OFF") (NO in S512 of FIG. 5).

In this manual regeneration manual stop control, the operator can manually stop the regenerating operation (by operating the manual regeneration button 45). Thus, operability is ensured. Further, retraction in an emergency is possible. Examples of the "retraction in an emergency" include moving the boom when it becomes suddenly necessary to move the boom.

(Effect 8)

The plurality of types of controls executed by the regulation control unit 50 include the operation invalidation control (see FIG. 8). In the operation invalidation control, the operation by the operation unit 41 is invalidated (S821 and S822 of FIG. 8) and the regeneration unit 36 is caused to perform the regenerating operation regardless of whether or not the operation unit 41 is being operated (judgment in S716 of FIG. 7 is not made in the flow D of FIG. 8) when the regeneration unit 36 performs the regenerating operation by the manual regeneration control (see S820 of FIG. 8, etc.).

In this operation invalidation control, the regenerating operation is prioritized over the operation by the operation unit 41. Thus, a chance of regenerating the purification device is ensured, wherefore the regenerating operation is easily completed.

(Effect 9)

The plurality of types of controls executed by the regulation control unit 50 include the manual regeneration switch invalidation control (see FIG. 8). In the manual regeneration switch invalidation control, the regeneration unit 36 is caused to perform the regenerating operation regardless of the selection state of the manual regeneration button 45 (judgment in S712 of FIG. 7 is not made in the flow D of FIG. 8) when the regeneration unit 36 performs the regenerating operation by the manual regeneration control (YES in S801 of FIG. 8).

In this manual regeneration switch invalidation control, the regenerating operation is prioritized over the operation by the operation unit 41. Thus, a chance of regenerating the purification device 31 is ensured, wherefore the regenerating operation is easily completed.

(Effect 10)

The plurality of types of controls executed by the regulation control unit 50 include the forced regeneration control (see FIG. 9). In the forced regeneration control, the regeneration unit 36 is caused to perform the regenerating operation regardless of the detection state of the operation detection unit 43 and regardless of the selection state of the manual regeneration button 45 (judgment in S711, S712, S715 and S716 of FIG. 7 is not made in the flow E of FIG. 9).

In this forced regeneration control, the regenerating operation is more reliably completed since a chance of regenerating the purification device 31 is reliably ensured.

(Effect 11)

The engine 11 includes the load detection unit 11b for detecting the load of the engine 11. The load set value is set in the regeneration control unit 50. The plurality of types of controls executed by the regulation control unit 50 include the regenerating operation partial stop control (see FIG. 4, etc.). In the regenerating operation partial stop control, the regenerating operation of the regeneration unit 36 is at least partially stopped (S429 of FIG. 4) when the load detected by the load detection unit 11b during the regenerating operation is larger than the load set value (NO in S425 of FIG. 4).

By this regenerating operation partial stop control, the application of an excessive load to the engine 11 is suppressed. This suppresses the discharge of a large amount of the soot when the engine 11 is going to stall. Thus, the accumulation of the soot in the purification device 31 is suppressed, wherefore the soot clogging of the purification device 31 is suppressed. Further, the erosion of the purification device 31 caused by the spread of the burning of the large amount of the soot at once is suppressed.

Second Embodiment

Figure 12:
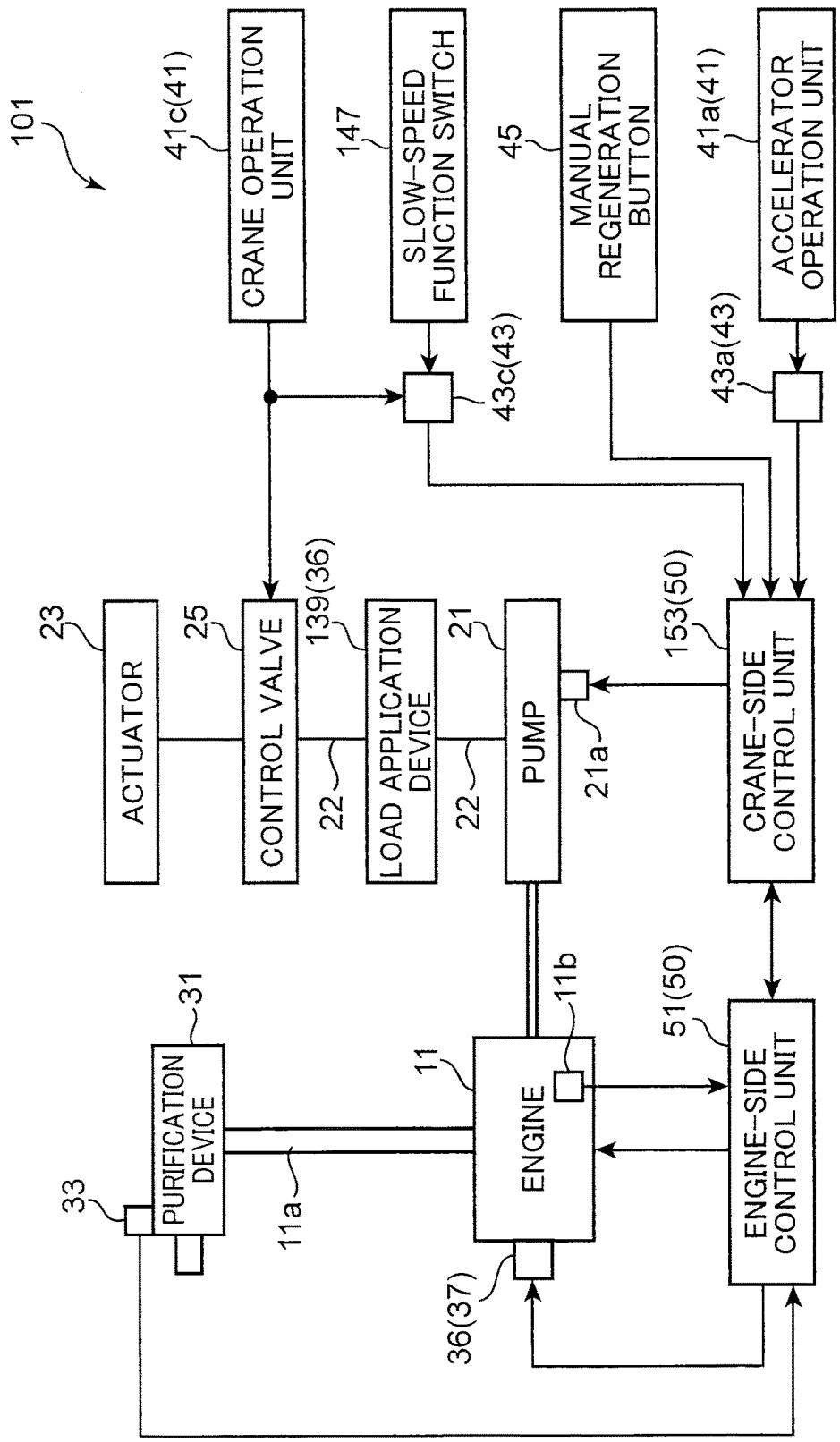

Points of difference of an exhaust gas purification control device 101 of a second embodiment from the first embodiment are described with reference to FIGS. 12 to 17. The points of difference are as follows. As shown in FIG. 12, the exhaust gas purification control device 101 includes a load application device 139 instead of the exhaust brake 39 of the first embodiment (see FIG. 1). The exhaust gas purification control device 101 includes a slow-speed function switch 147 (automatic regeneration automatic stop selection switch, discharge flow rate setting switch) which is not provided in the first embodiment. The operation of a crane-side control unit 153 of the second embodiment differs from that of the crane-side control unit 53 (see FIG. 1) of the first embodiment. The above points of difference are further described below. Note that constituent elements and Steps of the exhaust gas purification control device 101 common to the first embodiment are denoted by the same reference signs and not described.

The exhaust gas purification control device 101 is used for a crawler crane, a wheel crane or the like.

(Load Application Device 139)

A regeneration unit 36 includes the load application device 139 for applying a load to an engine 11 by generating a pressure in a pipe line 22 (described later). The load application device 139 applies a load to the engine 11 to increase an exhaust temperature of the engine 11. The load application device 139 applies a load necessary for a regenerating operation to the engine 11. Specifically, the load application device 139 applies a load for increasing the exhaust temperature of the engine 11 to a temperature at which the regenerating operation is performed to the engine 11. The load application device 139 is a device for increasing a discharge pressure of a pump 21. The load application device 139 is arranged between the pump 21 and a control valve 25 (on the pipe line 22 connecting the pump 21 and the control valve 25). The load application device 139 is a valve (load application value). The load application device 139 is switchable between "activation" and "deactivation". The load application device 139 in an "activated" state generates a pressure in the pipe line 22 (performs a load applying operation). The load application device 139 in a "deactivated" state generates no pressure in the pipe line 22 (does not perform the load applying operation). The regenerating operation by the regeneration unit 36 is performed by at least one of post injection in a post injection unit 37 and the activation of the load application device 139. In the regenerating operation using the load application device 139, a discharge flow rate of the pump 21 is set, for example, at a maximum value (may be a substantially maximum value). The discharge flow rate of the pump 21 is controlled by a discharge flow rate control device 21a. The discharge flow rate control device 21a is a device for controlling the discharge flow rate of the pump 21 and, for example, a valve. The discharge flow rate control device 21a is controlled by the crane-side control unit 153.

(Slow-Speed Function Switch 147)

Operation-related devices 41 to 45 and 147 include an operation unit 41, an operation detection unit 43, a manual regeneration button 45 and the slow-speed function switch 147. The slow-speed function switch 147 is provided in a driving room (not shown) of a construction machine. Examples of the slow-speed function switch 147 include a switch on a touch panel and a push-button switch.

This slow-speed function switch 147 (automatic regeneration automatic stop selection switch, discharge flow rate setting switch) is a switch used by an operator to select whether or not to use a slow-speed function (slow-speed function is ON or OFF). The slow-speed function is a function for making a slow-speed operation of an actuator 23 easily performed. Specifically, if "slow-speed function ON" is selected by the slow-speed function switch 147, the discharge flow rate of the pump 21 is regulated. For example, the discharge flow rate of the pump 21 is set at a minimum value (may be a substantially minimum value). As just described, the slow-speed function switch 147 is also a discharge flow rate setting switch. The discharge flow rate setting switch is a switch for selection on a function affecting the discharge flow rate of the pump 21. Further, the slow-speed function switch 147 is also an automatic regeneration automatic stop selection switch. The automatic regeneration automatic stop selection switch is a switch for switching whether or not to use an automatic regeneration automatic stop function (described later) (automatic regeneration automatic stop function is ON or not) according to a selection state of the switch.

The crane-side control unit 153 (machine-side control unit) controls the operation of the load application device 139. The crane-side control unit 153 instructs whether or not to perform the regenerating operation (load applying operation) to the load application device 139. The crane-side control unit 153 determines whether or not to permit the regenerating operation in response to a request of the regenerating operation from an engine-side control unit 51. Detection results and selection results are input to the crane-side control unit 153 from the load detection unit 11b, the operation detection unit 43, the manual regeneration button 45 and the slow-speed function switch 147.

Note that, in the first embodiment shown in FIG. 1, an output signal of the accelerator operation unit 41a is input to the engine-side control unit 51. On the other hand, in the second embodiment shown in FIG. 12, an output signal of an accelerator operation unit 41a is input not to the engine-side control unit 51, but to the crane-side control unit 153 via an accelerator operation detection unit 43a.

(Control of Regenerating Operation According to Accumulation Amount Level by Regeneration Control Unit 50)

The regeneration control unit 50 (crane-side control unit 153) switches a control of the regenerating operation by the regeneration unit 36 according to an accumulation amount level or a request from the engine-side control unit 51. A total of five accumulation amount levels of below A, A, B, D and E are set in the regeneration control unit 50. As shown in Table 2, the regeneration control unit 50 changes conditions on the start and stop of the regenerating operation according to the accumulation amount levels of below A, A, B, D and E.

TABLE 2

| Accumulation Amount Level | Regulating Operation ○: Performed, X: Not Performed | Start of Regenerating Operation | Interruption of Regenerating Operation |
|---|---|---|---|
| E | ○ | Automatic (Forced) | X |
| D | ○ | Manual | X |
| B | ○ | Manual | ○ |
| A | ○ | Automatic | ○ |
| Below A | X | — | — |

(Accumulation Amount Level A or Higher)

In the first embodiment, the conditions on the start of the regenerating operation at the accumulation amount level A or higher include that the "operation unit 41 (see FIG. 1) is not being operated". In the second embodiment, that the "operation unit 41 is not being operated" includes that the "operation of the operation unit 41 is invalid" (described later). The reason why the conditions on the start of the regenerating operation include that the operation unit 41 is not being operated (or is invalid) is to prevent a sudden change in the operation of the actuator 23 due to the start of the regenerating operation during the operation of the operation unit 41. This sudden change occurs as follows. When the load application device 139 is activated, a load is applied to the pump 21. Thus, even if the rotational speed of the engine 11 and the crane operation are stable, the discharge flow rate of the pump 21 changes. As a result, the operation of the actuator 23 suddenly changes.

(Accumulation Amount Level A: Automatic Regeneration Control, Automatic Regeneration Manual Stop Control)

At the accumulation amount level A (automatic regeneration region), the regenerating operation is automatically started. At the accumulation amount level A, the operation of the operation unit 41 is prioritized over the regenerating operation. In the first embodiment, at the accumulation amount level A, the regenerating operation is temporarily stopped if the crane operation or the accelerator operation is performed during the regenerating operation. On the other hand, in the second embodiment, this control (control to temporarily stop the regenerating operation if the crane operation or the accelerator operation is performed during the regenerating operation) is not executed. In the second embodiment, the regenerating operation is temporarily stopped if the crane operation is performed when an "automatic regeneration automatic stop function is ON" (described later). When the "automatic regeneration automatic stop function is OFF", the regenerating operation is not temporarily stopped even if the crane operation is performed. More specifically, the regeneration control unit 50 executes the following automatic regeneration control (automatic regeneration control of the second embodiment) at the accumulation amount level A.

In the automatic regeneration control of the second embodiment, as in the first embodiment, the regeneration unit 36 is caused to start the regenerating operation when it is detected by the operation detection unit 43 that the operation unit 41 is not being operated. Further, in the automatic regeneration control of the second embodiment, the regenerating operation by the regeneration unit 36 is stopped when it is detected by the operation detection unit 43 that the operation unit 41 is being operated and when the use of the automatic regeneration automatic stop function (described later) (automatic regeneration automatic stop function ON) is selected by an automatic regeneration automatic stop switch (slow-speed function switch 147). The automatic regeneration automatic stop function is a function of stopping (temporarily stopping) the regenerating operation by the regeneration unit 36 in the automatic regeneration region and when it is detected by the operation detection unit 43 that the operation unit 41 is being operated.

ON and OFF of the automatic regeneration automatic stop function are linked with ON and OFF of the slow-speed function (function affecting the discharge flow rate of the pump 21). These are linked for the following reason. As described above, in the case of using the slow-speed function, the discharge flow rate of the pump 21 is regulated. On the other hand, in the case of performing the regenerating operation using the load application device 139, the discharge flow rate of the pump 21 needs to be set high (equal to or higher than a flow rate necessary for the regenerating operation). Accordingly, one of the slow-speed function (low discharge flow rate) and the regenerating operation (high discharge flow rate) is prioritized. Specifically, the regeneration control unit 50 turns on the automatic regeneration automatic stop function (uses the automatic regeneration automatic stop function) when the slow-speed function ON is selected by the slow-speed function switch 147. The regeneration control unit 50 turns off the automatic regeneration automatic stop function (does not use the automatic regeneration automatic stop function) when the slow-speed function OFF is selected by the slow-speed function switch 147. If the regenerating operation is stopped (temporarily stopped) by this control, the slow-speed function operates. Specifically, the operation of the operation unit 41 is enabled with the discharge flow rate of the pump 21 regulated (set, for example, at the minimum value). Further, if it is detected by the operation detection unit 43 that the operation unit 41 is not being operated after the regenerating operation is stopped by this control, the regeneration control unit 50 causes the regeneration unit 36 to restart the regenerating operation. Specifically, the discharge flow rate of the pump 21 is set, for example, to the maximum value and the regeneration unit 36 (load application device 139) is set in the activated state.

(Accumulation Amount Levels B and D: Manual Regeneration Control, Manual-Regeneration-Time Operation Invalidation Control)

At the accumulation amount levels B and D (manual regeneration region), the regeneration control unit 50 executes a manual regeneration control (same as in the first embodiment) and a manual-regeneration-time operation invalidation control. In the manual-regeneration-time operation invalidation control, the operation by the operation unit 41 is invalidated in the manual regeneration region and when the regenerating operation is being performed. In the manual-regeneration-time operation invalidation control, the regeneration control unit 50 (crane-side control unit 153) does not receive a command of the operation unit 41 (sets a state where the construction machine cannot be operated). In other words, in the manual-regeneration-time operation invalidation control, the regeneration control unit 50 prevents the actuator 23 from being activated even if the operation unit 41 is operated (regenerating operation is prioritized). On the other hand, the regeneration control unit 50 validates the operation by the operation unit 41 in the manual regeneration region and when the regenerating operation is not being performed.

(Accumulation Amount Level B: Manual Regeneration Manual Stop Control)

At the accumulation amount level B, the regenerating operation (manual regeneration) can be interrupted and restarted. At the accumulation amount level B, the regeneration control unit 50 executes a manual regeneration manual stop control substantially similar to that of the first embodiment without executing the manual regeneration interruption control and the manual regeneration restart control executed in the first embodiment. In the manual regeneration manual stop control, as in the first embodiment, the regenerating operation is interrupted when the manual regeneration button 45 is turned "OFF". In the second embodiment, the regenerating operation of the load application device 139 is stopped and the operation by the operation unit 41 is validated (the operation stop of the actuator 23 is released) when the manual regeneration button 45 is turned "OFF".

Note that the accelerator invalidation control executed at the accumulation amount level C in the first embodiment is not executed in the second embodiment.

(Accumulation Amount Level D: Manual Regeneration Manual Stop Invalidation Control)

At the accumulation amount level D, the interruption of the regenerating operation is prohibited. At the accumulation amount level D, the operation invalidation control executed in the first embodiment is not executed and a manual regeneration manual stop invalidation control (control substantially similar to the manual regeneration switch invalidation control of the first embodiment) is executed. In the manual regeneration manual stop invalidation control, the above manual regeneration manual stop control is invalidated when the manual regeneration button 45 is turned "ON" once and the manual regeneration control is started. Specifically, when the manual regeneration control is started by turning "ON" the manual regeneration button 45 once, the regenerating operation is not interrupted ("OFF" is not received) even if the manual regeneration button 45 is turned "OFF".

(Accumulation Amount Level E: Forced Regeneration Control)

At the accumulation amount level E (forced regeneration region), as in the first embodiment, the regenerating operation is automatically started even when the manual regeneration button 45 is "OFF" if the operation unit 41 is not being operated. Further, at this time, the interruption of the regenerating operation is prohibited.

(Flow Charts)

Points of difference of the operation (Steps S1301 to S1931) of the exhaust gas purification control device 101 (see FIG. 12) from the first embodiment are described in more detail with reference to flow charts shown in FIGS. 13 to 17 (see FIG. 12 concerning each constituent element of the exhaust gas purification control device 101 below).

(Determination of Accumulation Amount Level: S1301 to S1306)

Figure 13:
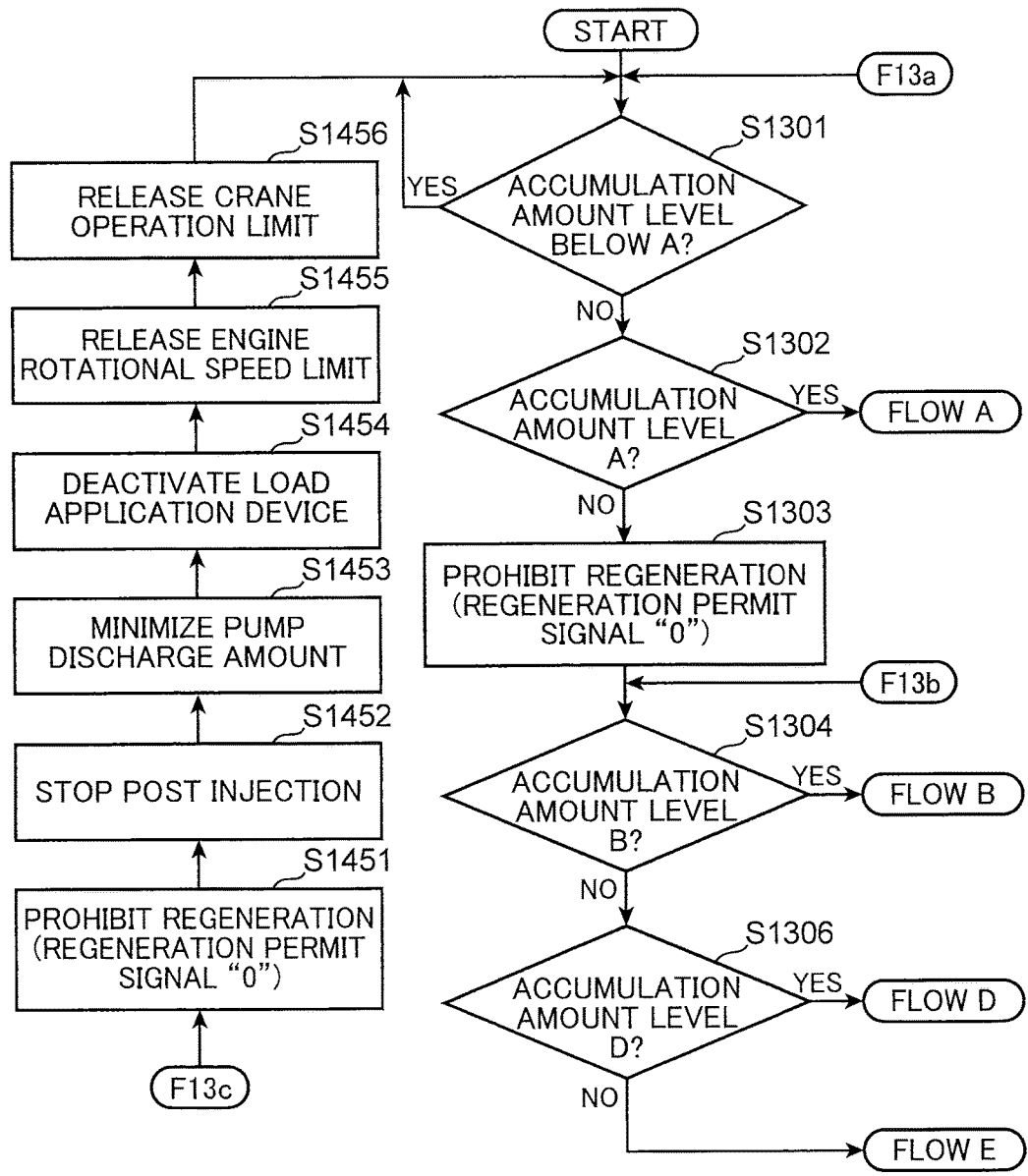
FIG. 13 is a flow chart of the operation of the exhaust gas purification control device shown in FIG. 12.

As shown in FIG. 13, the accumulation amount level is determined in Steps S1301 to S1306 of the second embodiment substantially as in Steps S201 to S206 (see FIG. 2) of the first embodiment. A return is made to Step S1301 when the accumulation amount of the soot is below the accumulation amount level A (YES in S1301) (flow X shown in FIG. 3 is absent in the second embodiment). Since the accumulation amount level C is not set in the second embodiment, whether or not the accumulation amount is at the accumulation amount level C (see S205 of FIG. 2) is not determined.

(Flow A: S1401 to S1431)

Figure 14:
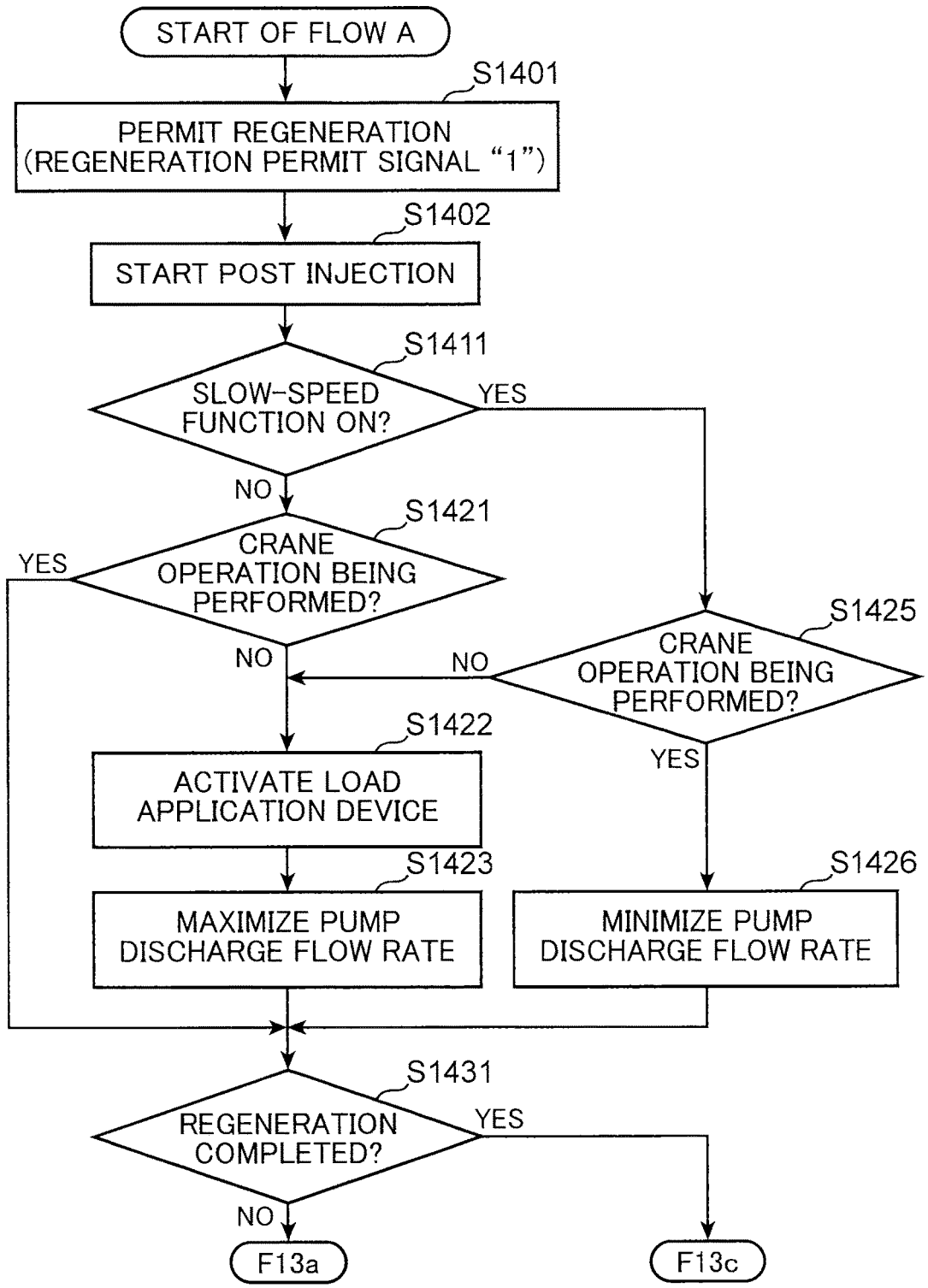
FIG. 14 is a flow chart of the operation of the exhaust gas purification control device shown in FIG. 12.

In a flow A shown in FIG. 14, the automatic regeneration control (described above) is executed.

In Step S1401, a regeneration permit signal is set to "1".

In Step S1402, the post injection is started (post injection is continued if the post injection is already started as described above).

In Step S1411, it is determined whether or not the slow-speed function is ON (automatic regeneration automatic stop function is ON). If the slow-speed function is OFF (NO), Step S1421 follows. If the slow-speed function is ON (YES), Step S1425 follows.

In Steps S1421 and the S1425, it is determined whether or not the crane operation is being performed. If the crane operation is not being performed (NO), the regenerating operation is performed. Specifically, the regeneration control unit 50 actuates the load application device 139 (S1422) to maximize the discharge flow rate of the pump 21 (S1423). Step S1431 follows if the slow-speed function is OFF (NO in S1411) and the crane operation is being performed (YES in S1421). If the slow-speed function is ON (YES in S1411) and the crane operation is being performed (YES in S1425), the discharge flow rate of the pump 21 is set to the minimum value (regenerating operation is temporarily stopped by the automatic regeneration automatic stop function) and the crane operation is performed using the slow-speed function.

In Step S1431, it is determined whether or not the regenerating operation has been completed (as in Step S531 of FIG. 5). If the regenerating operation has been completed, Step S1451 of FIG. 13 follows. Unless the regenerating operation has been completed, a return is made to Step S1301.

(Steps S1451 to S1456: Operation when Regenerating Operation is Completed)

As shown in FIG. 13, the operation when the regenerating operation is completed is as follows.

In Step S1451, the regeneration permit signal is set to "0".

In Step S1452, the post injection is stopped.

In Step S1453, the discharge flow rate of the pump 21 is set, for example, to the minimum value.

In Step S1454, the load application device 139 is set in a "deactivated state".

In Step S1455, the limit (fixing) of the rotational speed of the engine 11 is released.

In Step S1456, the limit of the crane operation is released.

(Flow B: S1501 to S1531)

Figure 15:
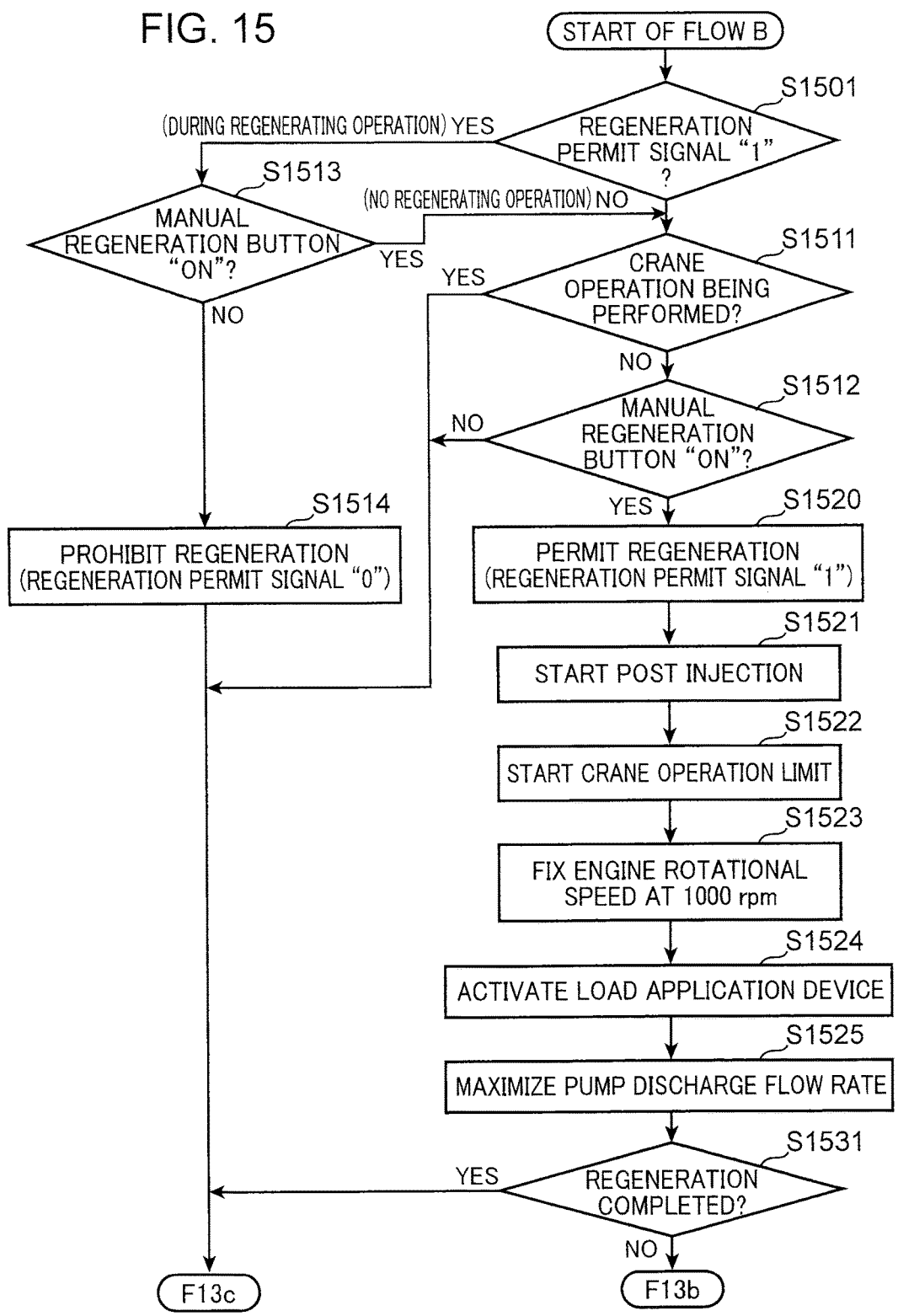
FIG. 15 is a flow chart of the operation of the exhaust gas purification control device shown in FIG. 12.

In a flow B shown in FIG. 15, the manual regeneration control, the manual-regeneration-time operation invalidation control and the manual regeneration manual stop control described above are executed.

In Step S1501, it is determined whether or not the regeneration permit signal is "1" (whether or not the regenerating operation is being performed) as in Step S501 of the first embodiment (see FIG. 5). If the regeneration permit signal is "0" (No in Step S1501 (during the stop of the regenerating operation)), Step S1511 follows. If the regeneration permit signal is "1" (YES in Step S1501 (during the regenerating operation)), Step S1513 follows.

Operation in Steps S1511 and S1512 is as follows. If the crane operation is being performed (YES in S1511), Step S1451 (see FIG. 13) follows (regenerating operation is not performed). Step S1451 follows (regenerating operation is not performed) if the crane operation is not being performed (NO in S1512) and the manual regeneration button 45 is "OFF" (NO in S1512). Step S1520 follows and the regenerating operation is performed if the crane operation is not being performed (NO in S1512) and the manual regeneration button 45 is "ON" (YES in S1512).

The operation in Step S1513 is as follows. If the manual regeneration button 45 is turned "OFF" (NO in S1513) during the regenerating operation (YES in S1501), the regenerating operation is stopped (S1514) (manual regeneration manual stop control) and Step S1451 (see FIG. 13) follows. If the manual regeneration button 45 is "ON" (YES in S1513) during the regenerating operation (YES in S1501), Step S1511 follows.

The operation when the regenerating operation is performed (YES in S1512) as follows.

In Step S1520, the regeneration permit signal is set to "1".

In Step S1521, the post injection is started.

In Step S1522, the limit of the crane operation is started (manual-regeneration-time operation invalidation control).

In Step S1523, the rotational speed of the engine 11 is fixed, for example, at 1000 rpm.

In Step S1524, the load application device 139 is set in the "activated" state.

In Step S1525, the discharge flow rate of the pump 21 is set, for example, to the maximum value.

In Step S1531, it is determined whether or not the regenerating operation has been completed as in Step S1431 (see FIG. 14).

(Flow D: S1801 to S1831)

Figure 16:
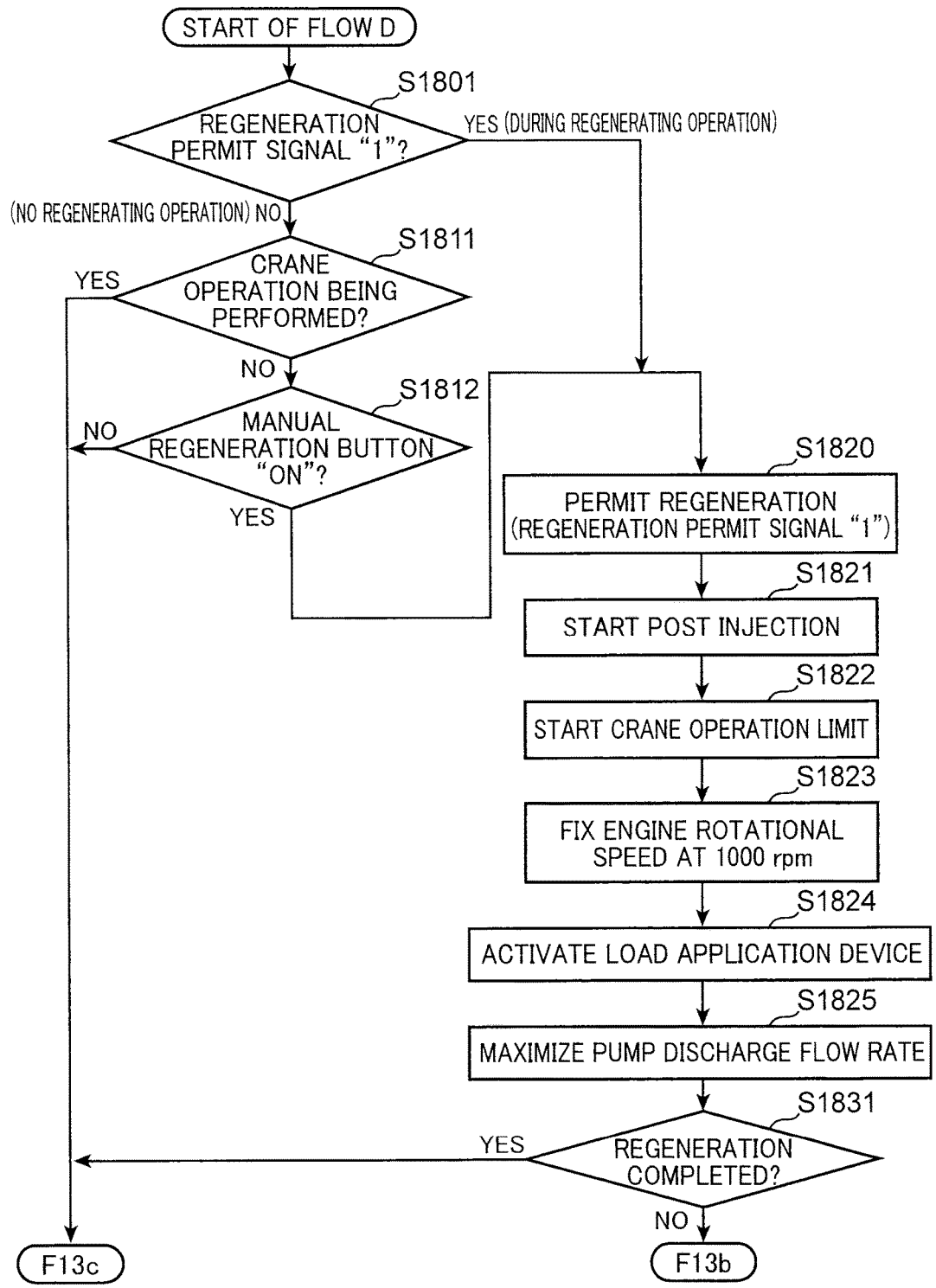
FIG. 16 is a flow chart of the operation of the exhaust gas purification control device shown in FIG. 12.

In a flow D shown in FIG. 16, the aforementioned manual regeneration manual stop invalidation control is executed.

In Step S1801, it is determined whether or not the regeneration permit signal is "1" as in Step S1501 (see FIG.

15). If the regeneration permit signal is "1" (YES in Step S1801 (during the regenerating operation)), Step S1820 follows and the regenerating operation is continued. If the regeneration permit signal is "0" (NO in Step S1801 (during the stop of the regenerating operation)), Step S1811 follows.

Operation in Steps S1811 and S1812 is as follows. The regenerating operation is not performed and Step S1451 (see FIG. 13) follows at least either when the crane operation is being performed (YES in S1811) or when the manual regeneration button 45 is "OFF" (NO in S1812). Step S1820 follows and the regenerating operation is stated if the crane operation is not being performed (NO in S1811) and the manual regeneration button 45 is "ON" (YES in S1812).

Operation in Steps S1820 to S1831 is the same as that in Steps S1520 to 1531 shown in FIG. 15.

(Flow E: S1901 to S1915)

Figure 17:
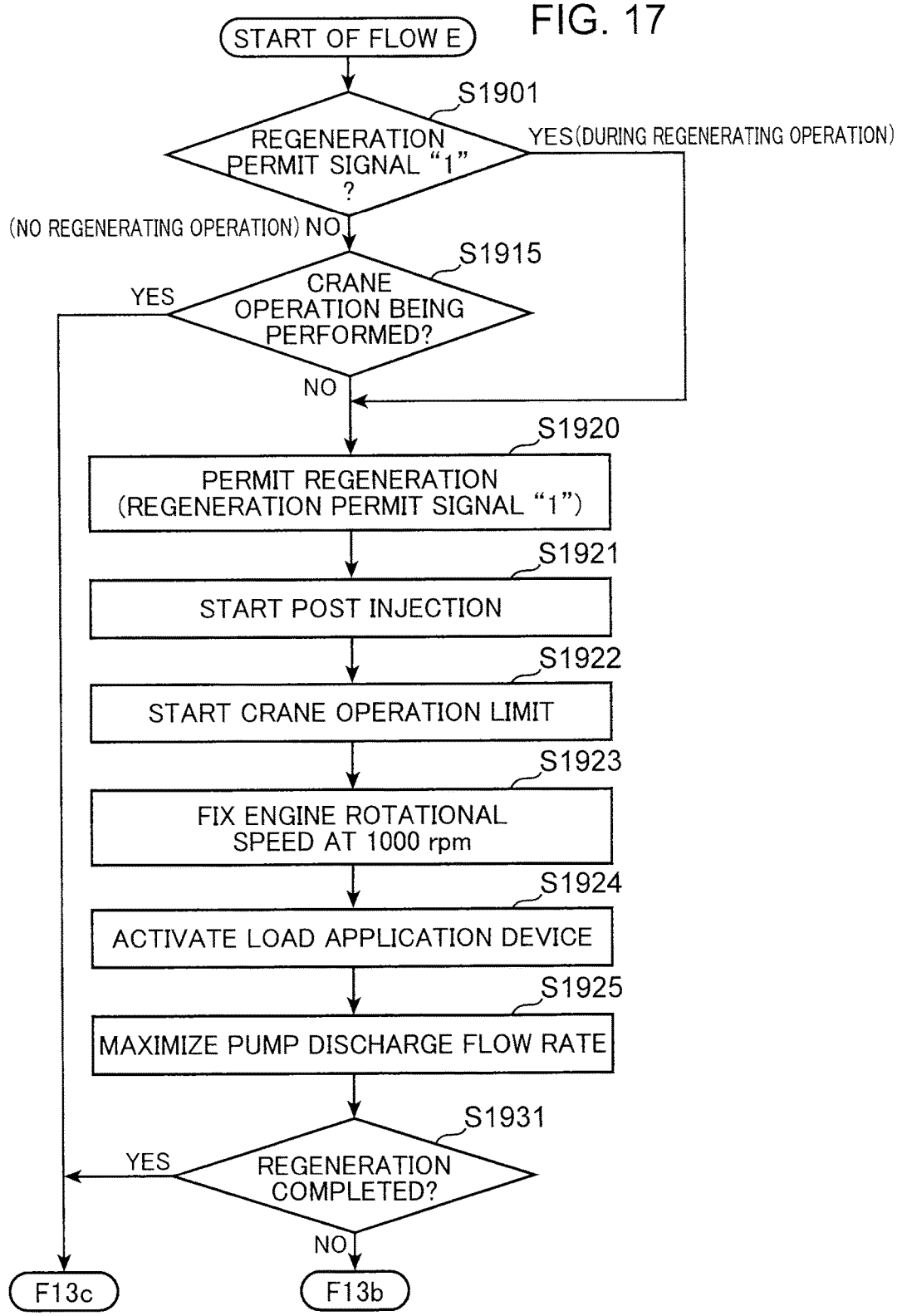
FIG. 17 is a flow chart of the operation of the exhaust gas purification control device shown in FIG. 12.

In a flow E shown in FIG. 17, the aforementioned forced regeneration control is executed.

Operation in Steps S1901 and S1915 is as follows. The regenerating operation is not started and Step S1451 (see FIG. 13) follows if the regeneration permit signal is "0" (NO in S1901 (during the stop of the regenerating operation)) and the crane operation is being performed (YES in S1915). Step S1920 follows and the regenerating operation is started if the regeneration permit signal is "0" (NO in S1901 (during the stop of the regenerating operation)) and the crane operation is not being performed (NO in S1915). Step S1920 follows and the regenerating operation is continued if the regeneration permit signal is "1" (YES in S1901 (during the stop of the regenerating operation)).

Operation in Steps S1920 to S1931 is the same as that in Steps S1520 to 1531 shown in FIG. 15.

(Effect 12)

Effects by the exhaust gas purification control device 101 shown in FIG. 12 are described. The exhaust gas purification control device 101 includes the automatic regeneration automatic stop selection switch (slow-speed function switch 147) for switching whether or not to use the automatic regeneration automatic stop function. The plurality of types of controls executed by the regeneration control unit 50 include the automatic regeneration control (see FIG. 14).

[Configuration 12-1] In the automatic regeneration control, the regeneration unit 36 is caused to perform the regenerating operation when it is detected by the operation detection unit 43 that the operating unit 41 is not being operated (NO in Step S1421 or NO in Step S1425 of FIG. 14).

[Configuration 12-2] In the automatic regeneration control, the regenerating operation of the regeneration unit 36 is stopped (see S1426 of FIG. 14) when it is detected by the operation detection unit 43 that the operating unit 41 is being operated (YES in Step S1425 of FIG. 14) and when the use of the automatic regeneration automatic stop function (automatic regeneration automatic stop function ON (slow-speed function ON)) is selected by the automatic regeneration automatic stop selection switch (slow-speed function switch 147) (YES in S1411 of FIG. 14).

By the above [Configuration 12-1], the regenerating operation is automatically performed even without the operator being aware of the regenerating operation. Thus, a chance of regenerating the purification device 31 is ensured.

In the above [Configuration 12-2], the operation of the operation unit 41 is prioritized over the regenerating operation when the automatic regeneration automatic stop function is ON. Thus, operability is ensured.

(Effect 13)

The exhaust gas purification control device 101 includes the pump 21 to be driven by the engine 11 and the discharge flow rate setting switch (slow-speed function switch 147).

[Configuration 13-1] The discharge flow rate setting switch (slow-speed function switch 147) is a switch for selection on the function affecting the discharge flow rate of the pump 21.

[Configuration 13-2] The regeneration unit 36 includes the load application device 139 for applying a load to the engine 11 so that a load for increasing the exhaust temperature of the engine 11 to a temperature at which the regenerating operation is performed is applied to the engine 11.

[Configuration 13-3] The discharge flow rate setting switch (slow-speed function switch 147) is the automatic regeneration automatic stop selection switch (see the above [Configuration 12-2]).

In the above [Configuration 13-2], a load is applied to the pump 21 to cause the load application device 139 to perform the regenerating operation. At this time, the discharge flow rate of the pump 21 needs to be increased to such an extent that the regenerating operation is appropriately performed. On the other hand, the discharge flow rate of the pump 21 may be affected by the operation of the discharge flow rate setting switch of the above [Configuration 13-1]. Thus, it is necessary to prioritize either one of the function selected by the discharge flow rate setting switch (e.g. slow-speed function) and the regenerating operation by the load application device 139. Accordingly, in the above [Configuration 13-3], the discharge flow rate setting switch (slow-speed function switch 147) is also the automatic regeneration automatic stop selection switch (see the above [Configuration 12-2]). Thus, ON and OFF of the automatic regeneration automatic stop function can be linked with the selection state by the discharge flow rate setting switch (slow-speed function switch 147). Therefore, the priority to set the discharge flow rate of the pump 21 by the discharge flow rate setting switch (e.g. minimum flow rate) and the priority to perform the regenerating operation by the load application device 139 (e.g. maximum flow rate) can be appropriately switched.

(Modification)

In the above second embodiment, the slow-speed function switch 147 is the automatic regeneration automatic stop selection switch and the discharge flow rate setting switch. However, other switches may be provided as the automatic regeneration automatic stop selection switch and the discharge flow rate setting switch in addition to (or instead of) the slow-speed function switch 147. The "other switches" may include an operation mode changeover switch, a drum brake changeover switch and the like. Further, the above "other switches" include an excessive load preventing device release switch, an excessive load preventing device redundant switch and the like. For example, if an excessive load preventing device is released by the excessive load preventing device release switch (when an excessive load preventing device releasing function is ON), the above automatic regeneration automatic stop function is turned ON (regenerating operation is temporarily stopped if the operating unit 41 is operated in the automatic regeneration region). If the excessive load preventing device release switch function is OFF, the automatic regeneration automatic stop function is turned OFF. Further, if it is selected, for example, to use an excessive load preventing device redundant function (described later) by the excessive load preventing device redundant switch (excessive load preventing device redundant function is ON), the above automatic regeneration automatic stop function is turned ON. If the excessive load preventing device redundant function is OFF, the above automatic regeneration automatic stop function is turned OFF. Note that the excessive load preventing device redundant function is a function of enabling a minimum work of the construction machine (crane operation, etc.) by causing only minimum functions of the excessive load preventing device to work when the excessive load preventing device is broken.

Connections among the respective devices in the block diagrams shown in FIGS. 1 and 12 may be appropriately changed. Further, the sequences of Steps of the flow charts shown in FIGS. 2 to 9 and FIGS. 13 to 17 may be appropriately changed. Further, all or parts of the configurations and controls of the first embodiment and all or parts of the configurations and controls of the second embodiment may be combined.

Third Embodiment

An exhaust gas purification control device 201 of a third embodiment is described with reference to FIGS. 18 to 22. In this third embodiment, only parts different from the first embodiment are described and the same structures, functions and effects as the first embodiment are not described.

An engine-side control unit 51 of this embodiment includes a post injection amount integration unit 51a and an error determination unit 51b.

The post injection amount integration unit 51a computes a post injection integration amount P. The post injection integration amount P is an integration amount of post injection from the completion of the last regenerating operation (closest from the present point of time) to the present point of time. The "completion" of the regenerating operation is described later. The post injection integration amount P increases according to the post injection and becomes 0 (reset) when the regenerating operation is completed. Specifically, the post injection amount integration unit 51a computes the post injection integration amount P and returns the post injection integration amount P to a value (0) at the completion of the last regenerating operation when the regenerating operation is completed.

The error determination unit 51b is a part for determining an "error (reduction in a purification function of the purification device 31)" when the post injection integration amount P exceeds an upper limit value Pmax. The upper limit value Pmax is set in advance in the error determination unit 51b. This error determination is made to determine catalyst deterioration (described later) of the purification device 31. The error determination unit 51b determines an "error" even if a catalyst is not actually deteriorated when the post injection integration amount P exceeds the upper limit value Pmax (erroneous determination on catalyst deterioration). If the error determination unit 51b determines an "error", an engine 11 limits, for example, an output. Note that the details of catalyst deterioration are as in the following points [a], [b]. [a] If the catalyst of the purification device 31 is deteriorated, an exhaust temperature of the engine 11 (temperature of soot) does not sufficiently increase and the soot is not burned even if the post injection is performed. [B] As a result, the regenerating operation is not completed although the post injection integration amount P is large.

(Operation of Regeneration Control Unit 50)

A plurality of types of controls executed by a regeneration control unit 50 (crane-side control unit 53) include a control according to an accumulation amount level and a control according to the post injection integration amount P. The control according to the accumulation amount level (display control and regenerating operation control) is not described since it is the same as that of the first embodiment.

(Control According to Post Injection Integration Amount P)

The regeneration control unit 50 (crane-side control unit 53) controls the regenerating operation according to the post injection integration amount P. The control of the regenerating operation according to the post injection integration amount P by the regeneration control unit 50 differs when the regenerating operation is not necessary (accumulation amount level below A), when in an automatic regeneration region (accumulation amount level A) and when in a manual regeneration region (accumulation amount levels B to D). Devices and the like constituting the exhaust gas purification control device 201 are described with reference to FIG. 18.

(When Regenerating Operation is not Necessary)

At the accumulation amount level below A, i.e. when there is no request for the regenerating operation from the engine-side control unit 51 to the crane-side control unit 53 (NO in S11 of FIG. 20), the regenerating operation is not performed as described above.

(Automatic Regeneration Region: S12 to S16)

Figure 19:
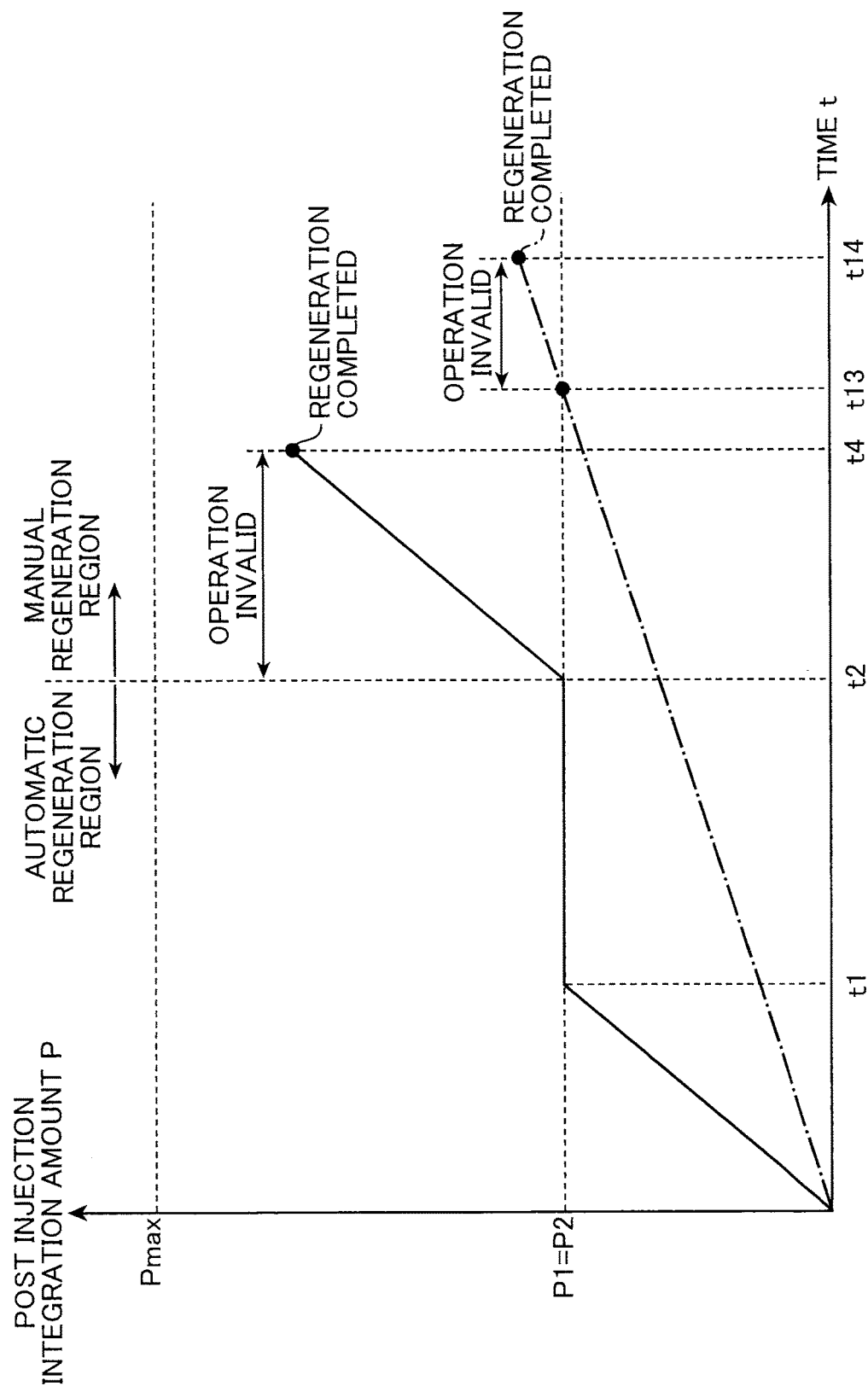
FIG. 19 is a time chart of the operation of the exhaust gas purification control device shown in FIG. 18.

In the automatic regeneration region (accumulation amount level A), the regeneration control unit 50 limits a regenerating operation of a post injection unit 37 according to the post injection integration amount P. More specifically, as shown in FIG. 19, a set value P1 (post injection prohibition set value) is set in the regeneration control unit 50 (crane-side control unit 53). If the post injection integration amount P is larger than the set value P1 (see time t1 to time t2 of FIG. 19), the regenerating operation of the post injection unit 37 is prohibited. The regeneration control unit 50 prohibits (continues to prohibit) the regenerating operation of the post injection unit 37 until the accumulation amount of the soot detected by an accumulation amount detection unit 33 reaches the manual regeneration region after the post injection integration amount P exceeds the set value P1 (period from time t1 to time t2 of FIG. 19). The set value P1 is, for example, set larger than the post injection integration amount P normally required for automatic regeneration (regenerating operation by an automatic regeneration control). The set value P1 is, for example, set as the post injection integration amount P when the automatic regeneration and control are repeated a large number of times. The set value P1 is, for example, set at about 50% of the upper limit value Pmax.

(Flow Charts)

The operation (S12 to S16) of the regeneration control unit 50 in the automatic regeneration region is more specifically described with reference to a flow chart shown in FIG. 20.

In Step S12, it is determined whether or not the accumulation amount of the soot is in the automatic regeneration region. In the case of the automatic regeneration region (YES in Step S12), Step S13 follows. On the other hand, if the accumulation amount of the soot is larger than in the automatic regeneration region (NO in Step S12 (accumulation amount level B or higher)), Step S21 of FIG. 21 follows via F4a.

Figure 20:
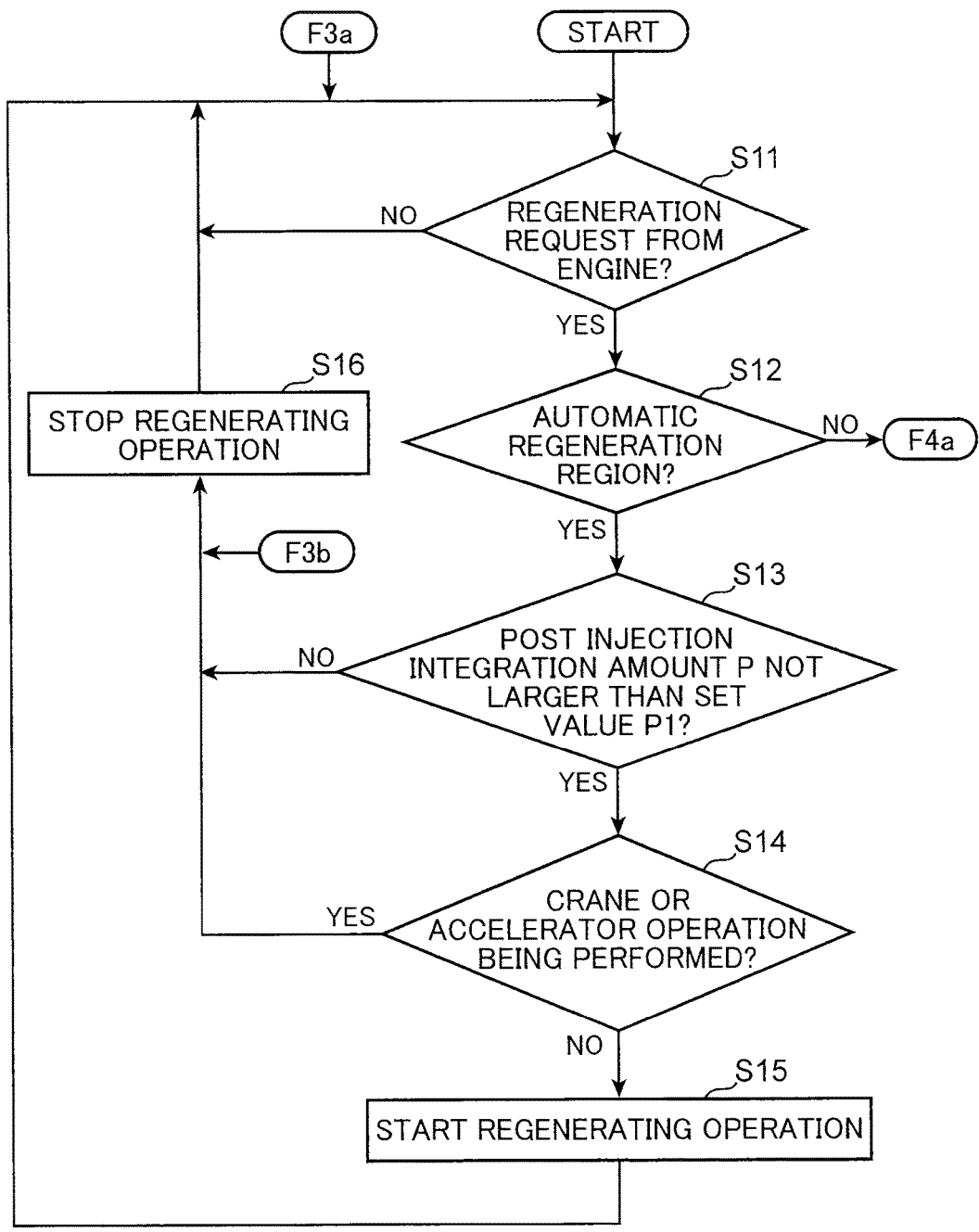
FIG. 20 is a flow chart of the operation of the exhaust gas purification control device shown in FIG. 18.

In Step S13, as shown in FIG. 20, it is determined whether or not the post injection integration amount P is not larger than the set value P1 (P≤P1). If P>P1 (NO in Step S13), Step S16 follows and the regenerating operation is stopped. If P≤P1 (YES in Step S13), Step S14 follows.

In Step S14, it is determined whether or not the crane operation or the accelerator operation is being performed. If at least one of the crane operation and the accelerator operation is being operated (YES in Step S14), Step S16 follows and the regenerating operation is stopped. If neither of the operations is being performed (No in Step S14), Step S15 follows.

In Step S15, the regenerating operation by the post injection unit 37 (and an exhaust brake 39) is started. If the regenerating operation is already performed, it is continued (same hold trues for the stop and start and the permission and the prohibition of the regenerating operation, the validation and invalidation of the operation and the like below). Subsequently, a return is made to Step S11.

In Step S16, the regenerating operation by the post injection unit 37 is stopped. Subsequently, a return is made to Step S11.

(Manual Regeneration Region, S21 to S27)

In the manual regeneration region (accumulation amount levels B to D), the regeneration control unit 50 switches the presence or absence of the regenerating operation according to the post injection integration amount P. More specifically, as shown in FIG. 19, the regeneration unit 36 permits the regenerating operation by the post injection unit 37 when a transition is made (a change is made) from the automatic regeneration region to the manual regeneration region (time t2).

The regeneration control unit 50 switches the validation or invalidation of the operation of the operation unit 41 according to the post injection integration amount P in the manual regeneration region. More specifically, as shown in FIG. 19, a set value P2 (operation prohibition set value) is set in the regeneration control unit 50 (crane-side control unit 53). The set value P2 is not smaller than the set value P1. A case where the set values P1 and P2 are equal is described below (case where these values are not equal is described later). The regeneration control unit 50 invalidates the operation by the operation unit 41 and causes the post injection unit 37 to perform the regenerating operation when the post injection integration amount P is larger than the set value P2 (and the manual regeneration is performed) (time t2 to time t4 of a solid polygonal line of FIG. 19 and time t13 to time t14 of a straight dashed-dotted line). The regeneration control unit 50 validates the operation by the operation unit 41 when the post injection integration amount P is not larger than the set value P2 (time t2 to time t13 of the straight dashed-dotted line of FIG. 19). This control is executed for the following reason. While the post injection integration amount P has a margin for the set value P2, there is a low possibility that the post injection integration amount P reaches the upper limit value Pmax. Thus, even if the operation by the operation unit 41 is prioritized over the regenerating operation, there is a high possibility of being able to complete the regenerating operation.

The operation (S21 to S27) of the regeneration control unit 50 in the manual regeneration region is further specifically described with reference to a flow chart shown in FIG. 21.

In Step S21, it is determined whether or not the manual regeneration button 45 is "ON". If the manual regeneration button 45 is "OFF" (NO in Step S21), a return is made to Step S11 of FIG. 20 via F3a (the regeneration operation remains stopped). If the manual regeneration button 45 is "ON" (YES in Step S21), Step S22 follows.

In Step S22, it is determined whether or not the post injection integration amount P is not larger than the set value P2 (P≤P2). If P>P2 (NO in Step S22), Step S23 follows. If P>P2, the post injection integration amount P may exceed the set value P1 (=P2) during the regenerating operation in the automatic regeneration region (time t1 of FIG. 19), the accumulation amount of the soot may increase with the regenerating operation stopped (time t1 to time t2) and the manual regeneration region may be reached (time t2) as shown by the solid polygonal line in FIG. 19. If P≤P2 (YES in Step S22), Step S24 follows. If P≤P2, the manual regeneration region may be reached (time t2) with the post injection integration amount P kept equal to or smaller than the set value P1 (=P2) in the automatic regeneration region as shown by the dashed-dotted line in FIG. 19.

Since the regenerating operation is prioritized in Step S23, the crane operation and the accelerator operation are invalidated (not received). Then, Step S25 follows.

In Step S24, it is determined whether or not the crane operation or the accelerator operation is being performed (same as in Step S14). If neither of the operations is being performed (No in Step S24), Step S25 follows. If at least one of the above operations is being performed (YES in Step S24), a return is made to Step S16 (see FIG. 20) via F3b and the regenerating operation is stopped.

In Step S25, the regenerating operation is started as in Step S15 (see FIG. 20). Then, Step S26 follows.

In Step S26, it is determined whether or not the regenerating operation has been completed (see the items of the accumulation amount levels B, C for the completion of the regenerating operation). If the regenerating operation has been completed (YES in Step S26), Step S27 follows and the crane operation and the accelerator operation are validated (received). Subsequently, a return is made to Step S11 (see FIG. 20) via F3a. Unless the regenerating operation has been completed (NO in Step S26), the regenerating operation is continued. Specifically, a loop of F3a, YES in Step S11 and NO in Step 21 of FIG. 20, YES in Step S21, YES in Step S22 and NO in Step S24, Step S25 and Step S26 of FIG. 21 is established.

(Effect 14)

Figure 18:
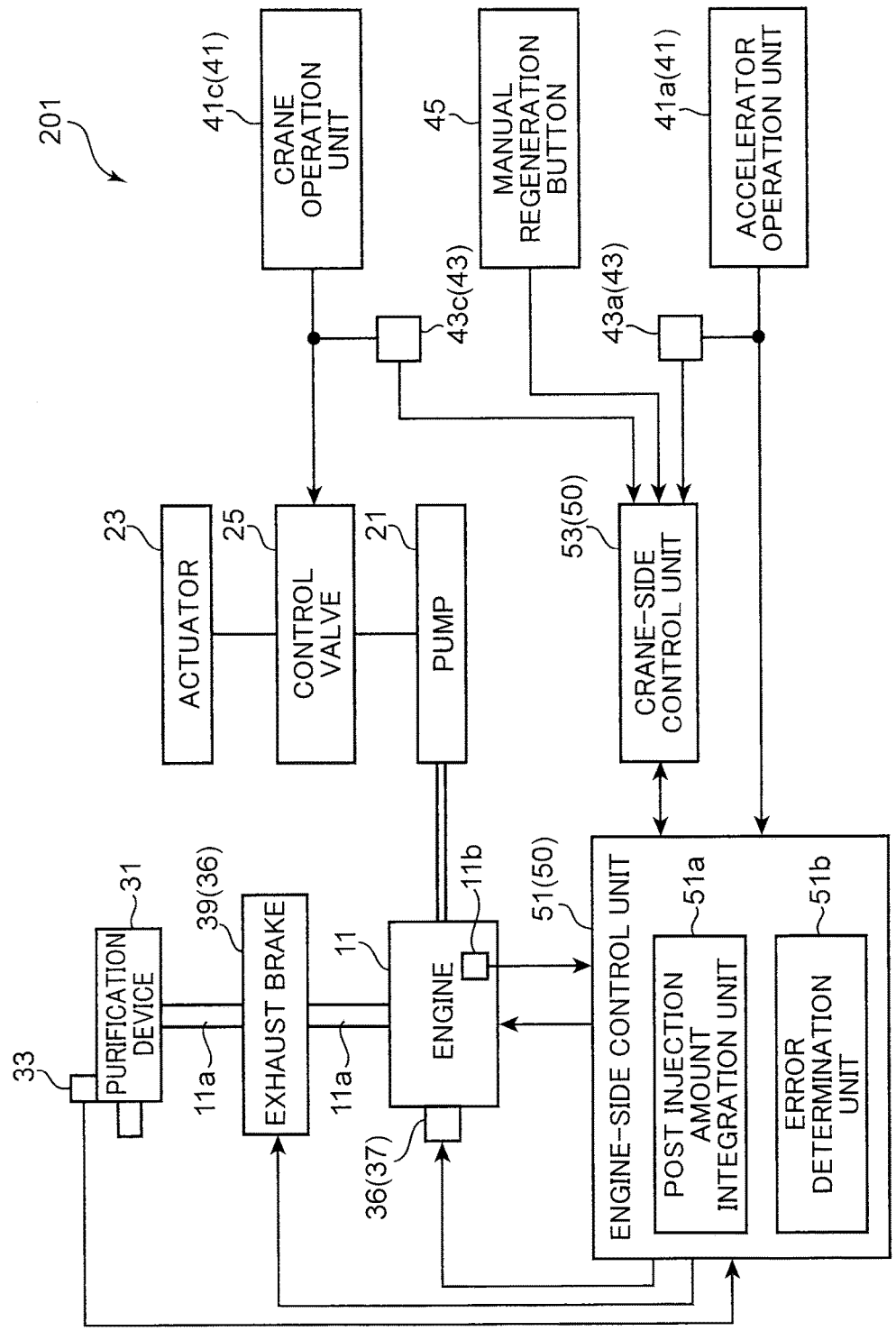
FIG. 18 is a block diagram of an exhaust gas purification control device for construction machine of a third embodiment.

Next, effects by the exhaust gas purification control device 201 (exhaust gas purification control device of the construction machine) shown in FIG. 18 are described. The exhaust gas purification control device 201 includes the engine 11, the actuator 23 using the engine 11 as a driving source, the operation unit 41 used by an operator to operate the actuator 23 or the engine 11, the operation detection unit 43 for detecting whether or not the operation unit 41 is being operated, the purification device 31 for capturing the soot in the exhaust of the engine 11, the accumulation amount detection unit 33 for detecting the accumulation amount of the soot captured by the purification device 31, the post injection unit 37 for performing the post injection to inject fuel into the engine 11 in an exhaust stroke after an expansion stroke of the engine 11 so that the exhaust temperature of the engine 11 increases to a temperature at which the regenerating operation (operation of regenerating the purification device 31 by burning the soot captured by the purification device 31) is performed, the manual regeneration button 45 (manual regeneration switching unit) used by the operator to select whether or not to perform the regenerating operation, the post injection amount integration unit 51a for computing the post injection integration amount P (see FIG. 19), which is an integration amount of the post injection from the completion of the last regenerating operation of the purification device 31, and returning the post injection integration amount P to the value at the completion of the last regenerating operation when the regenerating operation is completed, the error determination unit 51b for determining a reduction in the purification function of the purification device 31 if the post injection integration amount P exceeds the upper limit value Pmax (see FIG. 19) set in advance, and the regeneration control unit 50 for controlling the regenerating operation. The plurality of types of controls executed by the regeneration control unit 50 include the automatic regeneration control and the manual regeneration control.

[Configuration 14-1] In the automatic regeneration control, the post injection unit 37 is caused to perform the regenerating operation when it is detected by the operation detection unit 43 that the operating unit 41 is not being operated.

[Configuration 14-2] In the manual regeneration control, the regenerating operation of the post injection unit 37 is permitted when it is detected by the operation detection unit 43 that the operating unit 41 is not being operated and the regenerating operation is selected by the manual regeneration button 45.

[Configuration 14-3] A plurality of regions corresponding to the accumulation amount of the soot detected by the accumulation amount detection unit 33 are set in the regeneration control unit 50. The plurality of regions include the automatic regeneration region where the regeneration control unit 50 executes the automatic regeneration control and the manual regeneration region where the accumulation amount of the soot is larger than in the automatic regeneration region and the regeneration control unit 50 executes the manual regeneration control.

[Configuration 14-4] The regeneration control unit 50 limits the regenerating operation of the post injection unit 37 according to the post injection integration amount P in the automatic regeneration region (see time t1 to time 2 of FIG. 19).

Figure 21:
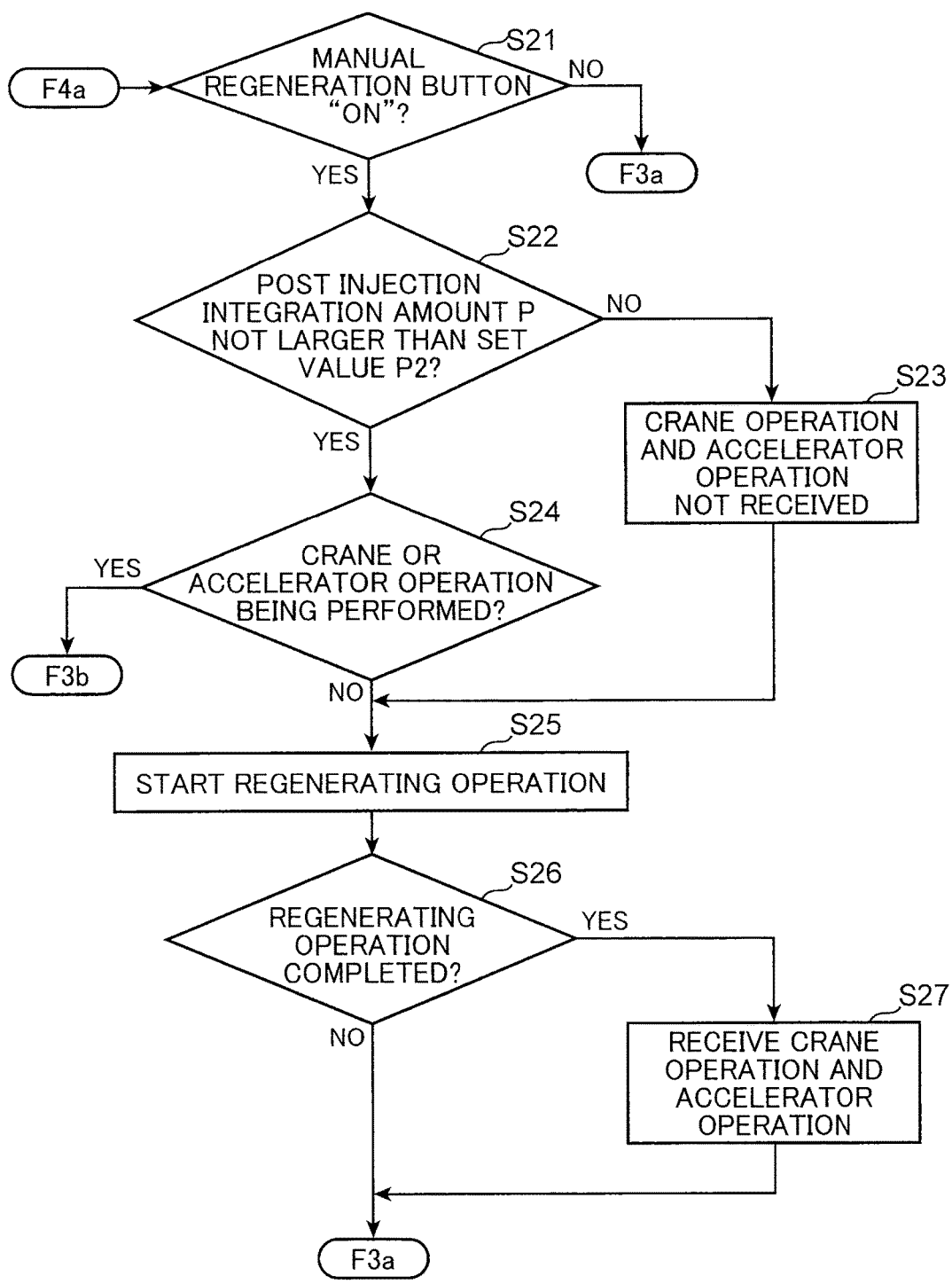
FIG. 21 is a flow chart of the operation of the exhaust gas purification control device shown in FIG. 18.

To start the regenerating operation in the manual regeneration region of the above [Configuration 14-2], it is necessary to select the regenerating operation ("ON") by the manual regeneration button 45 (YES in S21 of FIG. 21). Thus, the operator of the construction machine more easily notices an increase in the accumulation amount of the soot as compared with the case where the regenerating operation is automatically started. Thus, the manual regeneration region can be said to be a region where the operator is more urged to complete the regenerating operation than in the automatic regeneration region (this is a "property X" of the manual regeneration region).

On the other hand, a button operation and the like are not necessary to start the regenerating operation in the automatic regeneration region of the above [Configuration 14-1]. Thus, the automatic regeneration region is a region where the operator is less aware of the regenerating operation as compared with the manual regeneration region. Thus, the operator may stop the regenerating operation by performing a certain operation (e.g. operation of the operation unit 41) without being aware of the regenerating operation. Thus, the regenerating operation is continued for a shorter time in the automatic regeneration region than in the manual regeneration region in many cases. Thus, there is a high possibility that the exhaust temperature of the engine 11 does not increase to a temperature necessary to burn the soot even if the post injection unit 37 performs the post injection. Further, even if the exhaust temperature increases up to the above temperature, there is a high possibility that that temperature is kept for a short time. Therefore, the automatic regeneration region can be said to be a region with a high possibility of more useless post injection as compared with the manual regeneration region (this is a "property Y" of the automatic regeneration region).

(Effect 14-1)

In the above [Configuration 14-4], the regenerating operation of the post injection unit 37 is limited according to the post injection integration amount P in the automatic regeneration region where useless post injection is easily performed (above "property Y") (see time t1 to time t2 of FIG. 19). By doing so, the useless post injection is reduced as compared with the case free from this limitation. Thus, the deterioration of fuel economy by the useless post injection is suppressed. Further, since the post injection is reduced, a possibility that the post injection integration amount P exceeds the upper limit value Pmax is reduced. Thus, an erroneous determination by the error detection unit 51b is suppressed.

(Effect 14-2)

In the above [Configuration 14-4], the accumulation amount of the soot tends to increase in the automatic regeneration region since the regenerating operation is limited. Thus, a transition is easily made from the automatic regeneration region to the manual regeneration region having the above "property X". Therefore, the operator of the construction machine is urged to complete the regenerating operation.

(Effect 15)

[Configuration 15] In the automatic regeneration control, the regenerating operation of the post injection unit 37 is stopped when it is detected by the operation detection unit 43 that the operation unit 41 is being operated.

In the above [Configuration 15], the regenerating operation is stopped if the operator operates the operation unit 41 during the regenerating operation in the automatic regeneration region. Thus, in the automatic regeneration region, the operator may stop the regenerating operation without being aware of the regenerating operation. As a result, there is a high possibility of increasing the useless post injection. However, the useless post injection can be suppressed by the above (Effect 14-1).

(Effect 16)

The set value P1 (post injection prohibition set value) (see FIG. 19) is set in the regeneration control unit 50. The regeneration control unit 50 prohibits the regenerating operation of the post injection unit 37 when the post injection integration amount P exceeds the set value P1 in the automatic regeneration region (time t1 to time t2 of FIG. 19).

In this configuration, the above "(Effect 14-1)" can be specifically realized. In this configuration, if the set value P1 is set smaller than the upper limit value Pmax set in the error determination unit 51b, an erroneous determination by the error determination unit 51b is more reliably suppressed.

(Effect 17)

The regeneration control unit 50 prohibits the regenerating operation of the post injection unit 37 until the accumulation amount of the soot detected by the accumulation amount detection unit 33 reaches the manual regeneration region after the post injection integration amount P exceeds the set value P1 (period from time t1 to time t2 of FIG. 19).

In this configuration, the post injection integration amount P is more reliably reduced as compared with the case where the regenerating operation is prohibited only before the manual regeneration region is reached (before time t2 of FIG. 19).

(Effect 18)

[Configuration 18] The regeneration control unit 50 permits the regenerating operation by the post injection unit 37 when a transition is made from the automatic regeneration region to the manual regeneration region (time t2 of FIG. 19).

As described above, the manual regeneration region has the above "property X". Thus, when a transition is made from the automatic regeneration region to the manual regeneration region, the operator is urged to complete the regenerating operation. At this time, in the above [Configuration 18], the regenerating operation is easily completed since the regenerating operation is permitted.

(Effect 19)

The set value P2 (operation prohibition set value) (see FIG. 19) is set in the regeneration control unit 50. The regeneration control unit 50 invalidates the operation by the operation unit 41 and causes the post injection unit 37 to perform the regenerating operation in the manual regeneration region and when the post injection integration amount P is higher than the set value P2 (see time t2 to time t4 of the solid polygonal line of FIG. 19 and time t13 to time t14 of the straight dashed-dotted line).

In this configuration, the regenerating operation can be reliably completed when P>P2.

(Effect 20)

The regeneration control unit 50 validates the operation by the operation unit 41 when the post injection integration amount P is not larger than the set value P2 (operation prohibition set value) (see time t2 to time t13 of the straight dashed-dotted line of FIG. 19).

In this configuration, operability is ensured since a work by the operation of the operation unit 41 is possible when P≤P2.

(Other Effects)

The exhaust gas purification control device 201 is provided in a crane. Here, a load applied to the engine 11 is smaller in the crane than, for example, in a transportation vehicle (truck) in many cases. The reason for that is described, for example, in [a] and [b] below. [a] A crane operation (construction work, etc.) is continued for a shorter time and an idle time is longer than the travel of a transportation vehicle in many cases. [b] A load during an operation of hoisting a light load is smaller than a load during the travel of the transportation vehicle in many cases.

If the load applied to the engine 11 is small, the exhaust temperature of the engine 11 is unlikely to increase, wherefore the useless post injection easily occurs. On the other hand, in the above "(Effect 14-1)", the useless post injection is suppressed. Thus, the above "(Effect 14-1)" becomes more notable when the exhaust gas purification control device 201 is provided in a crane than when the exhaust gas purification control device 201 is provided in a transportation vehicle or the like in which a load applied to the engine 11 is large.

(Modification of Third Embodiment)

Figure 22:
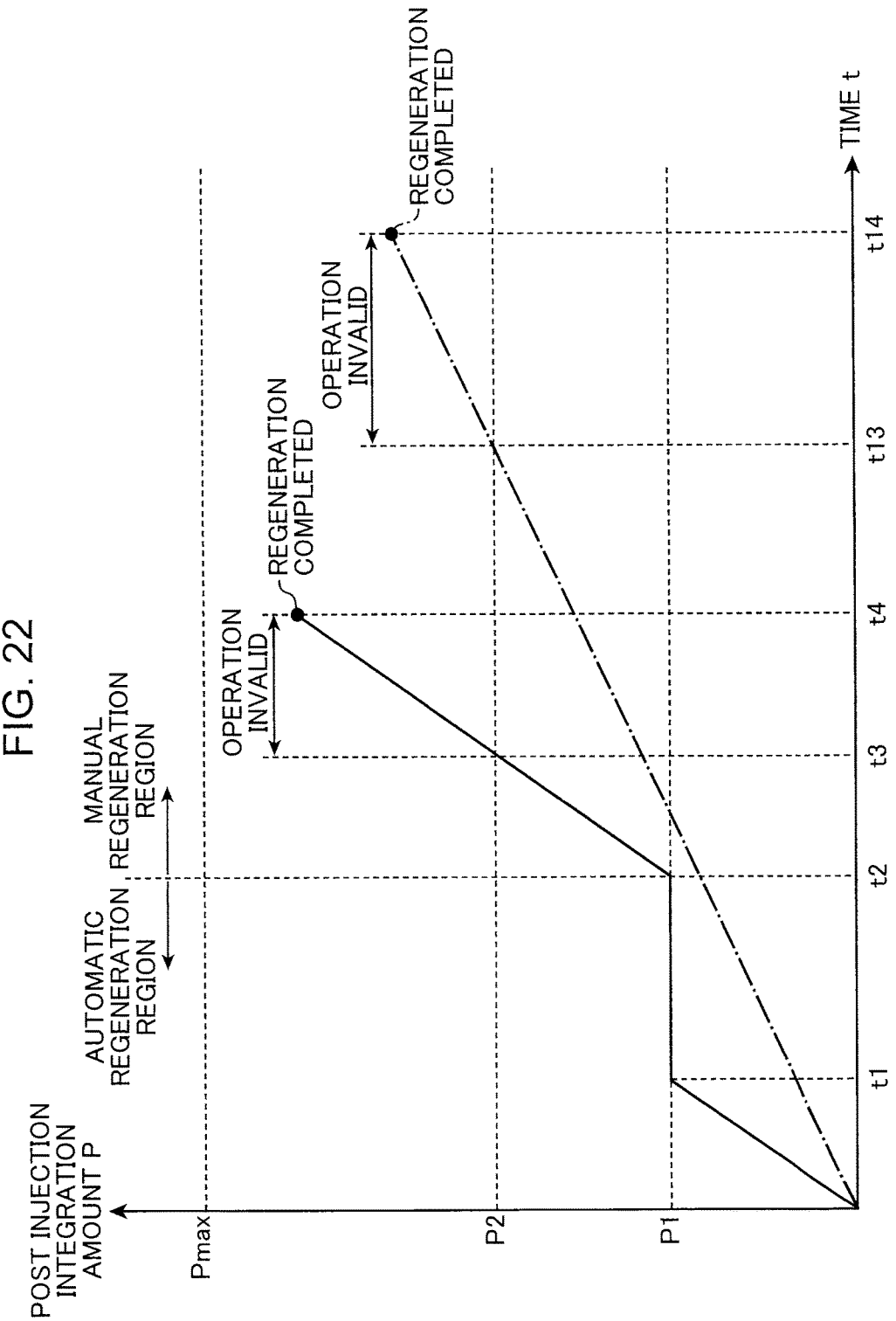
FIG. 22 is a time chart of the operation of an exhaust gas purification control device as a modification of the third embodiment.

With reference to FIG. 22, points of difference between the aforementioned case where the set values P1, P2 are different (case where P1<P2) and the case where these are equal (case where P1=P2) are described.

(Case where P1=P2) As shown in FIG. 19, the exhaust gas purification control device 201 operates as follows when P1=P2 as in the above third embodiment. As shown by the solid polygonal line in FIG. 19, when the post injection integration amount P exceeds the set value P1 in the automatic regeneration region (time t1), it also exceeds the set value P2. As a result, when a transition is made from the automatic regeneration region to the manual regeneration region (time t2), the operation by the operation unit 41 is inevitably invalidated (S23 of FIG. 21).

(Case where P1<P2) On the other hand, as shown in FIG. 22, the exhaust gas purification control device 201 operates as follows when P1<P2. As shown by a solid polygonal line in FIG. 22, a transition is made from the automatic regeneration region to the manual regeneration region (time t2) after the post injection integration amount P exceeds the set value P1 in the automatic regeneration region (time t1). The operation by the operation unit 41 is validated from this time (time t2) until the post injection integration amount P exceeds the set value P2 (time t3) (YES in S22 of FIG. 21). Thus, a work by the operation of the operation unit 41 can be performed (operability is ensured).

Fourth Embodiment

Figure 23:
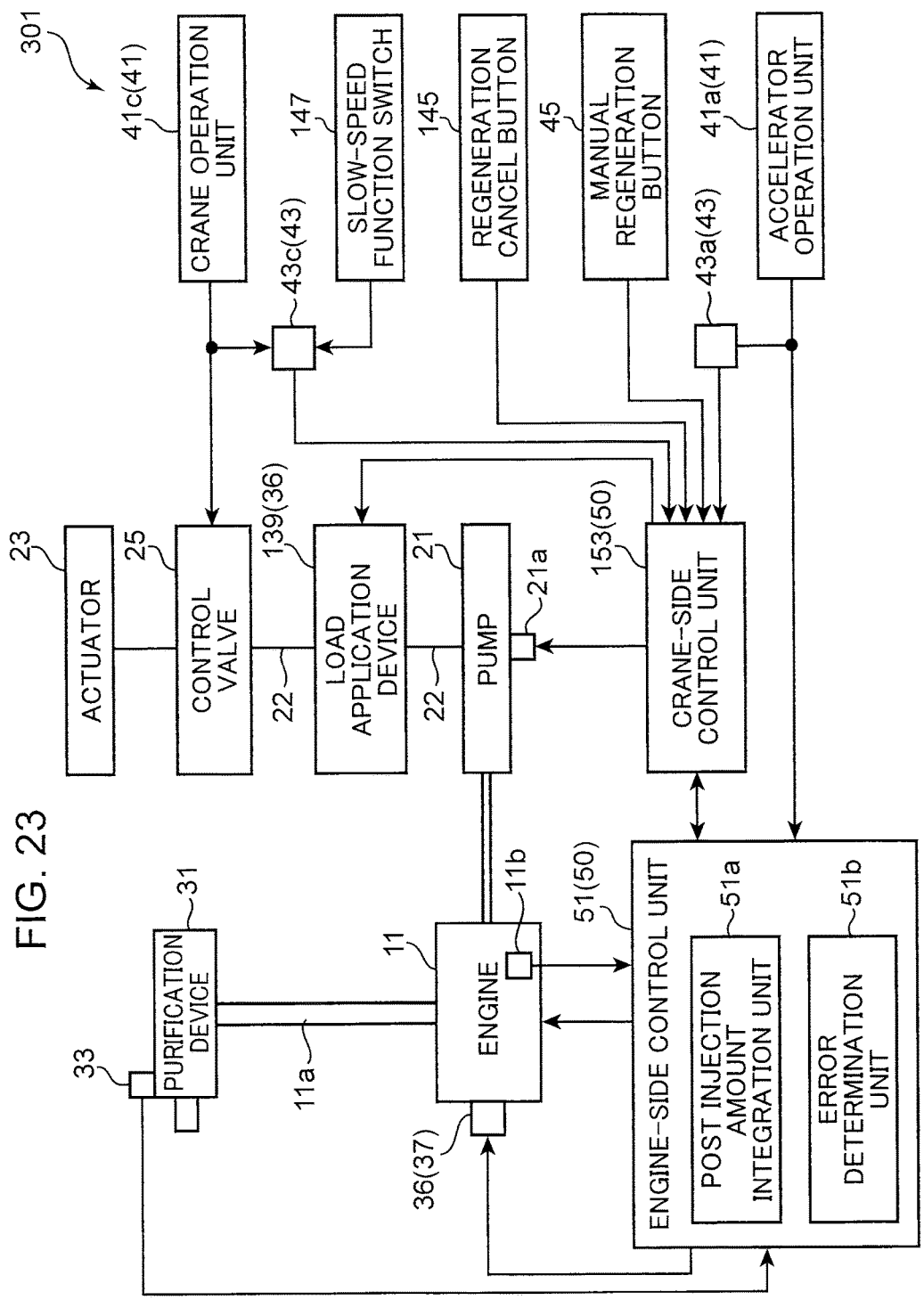
FIG. 23 is a block diagram, corresponding to FIG. 18, of a fourth embodiment.

Points of difference of an exhaust gas purification control device 301 of a fourth embodiment from the third embodiment are described with reference to FIGS. 23 to 27. The points of difference are as follows. As shown in FIG. 23, the exhaust gas purification control device 301 includes a load application device 139 instead of the exhaust brake 39 of the third embodiment (see FIG. 18). The exhaust gas purification control device 301 includes a regeneration cancel button 145 and a slow-speed function switch 147 (automatic regeneration automatic stop selection switch, discharge flow rate setting switch) which are not provided in the third embodiment. The operation of a crane-side control unit 153 of the fourth embodiment differs from that of the crane-side control unit 53 (see FIG. 18) of the third embodiment. The above points of difference are further described below. Note that constituent elements and Steps of the exhaust gas purification control device 301 common to the third embodiment are denoted by the same reference signs and not described.

The exhaust gas purification control device 301 is used for a crawler crane, a wheel crane or the like.

(Load Application Device 139)

A regeneration unit 36 includes the load application device 139 for applying a load to an engine 11 by generating a pressure in a pipe line 22 (described later). The load application device 139 applies a load to the engine 11 to increase an exhaust temperature of the engine 11. The load application device 139 applies a load necessary for a regenerating operation to the engine 11. Specifically, the load application device 139 applies a load for increasing the exhaust temperature of the engine 11 to a temperature at which the regenerating operation is performed to the engine 11. The load application device 139 is a device for increasing a discharge pressure of a pump 21. The load application device 139 is arranged between the pump 21 and a control valve 25 (on the pipe line 22 connecting the pump 21 and the control valve 25). The load application device 139 is a valve (load application value). The load application device 139 is switchable between "activation" and "deactivation". The load application device 139 in an "activated" state generates a pressure in the pipe line 22 (performs a load applying operation). The load application device 139 in a "deactivated" state generates no pressure in the pipe line 22 (does not perform the load applying operation). The regenerating operation by the regeneration unit 36 is performed by at least one of post injection in a post injection unit 37 and the activation of the load application device 139. In the regenerating operation using the load application device 139, a discharge flow rate of the pump 21 is set, for example, at a maximum value (may be a substantially maximum value). The discharge flow rate of the pump 21 is controlled by a discharge flow rate control device 21a. The discharge flow rate control device 21*a* is a device for controlling the discharge flow rate of the pump 21 and, for example, a valve. The discharge flow rate control device 21*a* is controlled by the crane-side control unit 153.

(Regeneration Cancel Button 145)

Operation-related devices 41 to 45, 145 and 147 include an operation unit 41, an operation detection unit 43, a manual regeneration button 45, the regeneration cancel button 145 and the slow-speed function switch 147. The regeneration cancel button 145 is a button used by an operator to perform a regeneration canceling operation. The regeneration canceling operation is an operation of stopping the regenerating operation by the regeneration cancel button 145. More specifically, the regeneration cancel button 145 is a means used by the operator to select whether to stop the regenerating operation (regenerating operation OFF (cancel ON)) or not to stop the regenerating operation (regenerating operation OFF (cancel OFF)). The regeneration cancel button 145 is provided in a driving room (not shown) of a construction machine. The slow-speed function switch 147 is also similar. Examples of the regeneration canceling operation 145 include a switch on a touch panel and a push-button switch. The slow-speed function switch 147 is also similar.

The slow-speed function switch 147 (automatic regeneration automatic stop selection switch, discharge flow rate setting switch) is a switch used by the operator to select whether or not to use a slow-speed function (slow-speed function is ON or OFF). The slow-speed function is a function for making a slow-speed operation of an actuator 23 easily performed. Specifically, if "slow-speed function ON" is selected by the slow-speed function switch 147, the discharge flow rate of the pump 21 is regulated and, for example, set at a minimum value (may be a substantially minimum value). As just described, the slow-speed function switch 147 is also a discharge flow rate setting switch. The discharge flow rate setting switch is a switch for selection on a function affecting the discharge flow rate of the pump 21. Further, the slow-speed function switch 147 is also an automatic regeneration automatic stop selection switch. The automatic regeneration automatic stop selection switch is a switch for switching whether or not to use an automatic regeneration automatic stop function (described later) (automatic regeneration automatic stop function is ON or not) according to a selection state of the switch.

The crane-side control unit 153 (machine-side control unit) controls the operation of the load application device 139. The crane-side control unit 153 instructs whether or not to perform the regenerating operation (load applying operation) to the load application device 139. The crane-side control unit 153 determines whether or not to permit the regenerating operation in response to a request of the regenerating operation from an engine-side control unit 51. Detection results and selection results are input to the crane-side control unit 153 from the load detection unit 11*b*, the operation detection unit 43, the manual regeneration button 45, the regeneration cancel button 145 and the slow-speed function switch 147.

(Control of Regenerating Operation According to Accumulation Amount Level by Regeneration Control Unit 50)

The regeneration control unit 50 (crane-side control unit 153) switches a control of the regenerating operation by the regeneration unit 36 according to an accumulation amount level or a request from the engine-side control unit 51. A total of five accumulation amount levels of below A, A, B, D and E are, for example, set in the regeneration control unit 50. As shown in Table 2, the regeneration control unit 50 changes conditions on the start and stop of the regenerating operation according to the accumulation amount levels of below A, A, B, D and E.

TABLE 2

| Accumulation Amount Level | Regulating Operation ○: Performed, X: Not Performed | Start of Regenerating Operation | Interruption of Regenerating Operation |
|---|---|---|---|
| E | ○ | Automatic (Forced) | X |
| D | ○ | Manual | X |
| B | ○ | Manual | ○ |
| A | ○ | Automatic | ○ |
| Below A | X | — | — |

(Accumulation Amount Level A or Higher)

In the third embodiment, the conditions on the start of the regenerating operation at the accumulation amount level A or higher include that the "operation unit 41 (see FIG. 18) is not being operated". In the fourth embodiment, that the "operation unit 41 is not being operated" includes that the "operation of the operation unit 41 is invalid" (described later). The reason why the conditions on the start of the regenerating operation include that the operation unit 41 is not being operated (or is invalid) is to prevent a sudden change in the operation of the actuator 23 due to the start of the regenerating operation during the operation of the operation unit 41. This sudden change occurs as follows. When the load application device 139 is activated, a load is applied to the pump 21. Thus, even if the rotational speed of the engine 11 and the crane operation are stable, the discharge flow rate of the pump 21 changes. As a result, the operation of the actuator 23 suddenly changes.

(Accumulation Amount Level A: Automatic Regeneration Control, Automatic Regeneration Manual Stop Control)

At the accumulation amount level A (automatic regeneration region), the regenerating operation is automatically started. At the accumulation amount level A, the operation of the operation unit 41 is prioritized over the regenerating operation. In the third embodiment, at the accumulation amount level A, the regenerating operation is temporarily stopped if the crane operation or the accelerator operation is performed during the regenerating operation. On the other hand, in the fourth embodiment, this control (control to temporarily stop the regenerating operation if the crane operation or the accelerator operation is performed during the regenerating operation) is not executed. In the fourth embodiment, the regenerating operation is temporarily stopped if the crane operation is performed when an "automatic regeneration automatic stop function is ON" (described later). When the "automatic regeneration automatic stop function is OFF", the regenerating operation is not temporarily stopped even if the crane operation is performed. More specifically, the regeneration control unit 50 executes the following automatic regeneration control (automatic regeneration control of the fourth embodiment) at the accumulation amount level A.

In the automatic regeneration control of the fourth embodiment, as in the third embodiment, the regeneration unit 36 is caused to start the regenerating operation when it is detected by the operation detection unit 43 that the operation unit 41 is not being operated. Further, in the automatic regeneration control of the fourth embodiment, the regenerating operation by the regeneration unit 36 is stopped when it is detected by the operation detection unit 43 that the operation unit 41 is being operated and when the use of the automatic regeneration automatic stop function (described later) (automatic regeneration automatic stop function ON) is selected by an automatic regeneration automatic stop switch (slow-speed function switch 147). The automatic regeneration automatic stop function is a function of stopping (temporarily stopping) the regenerating operation by the regeneration unit 36 in the automatic regeneration region and when it is detected by the operation detection unit 43 that the operation unit 41 is being operated.

ON and OFF of the automatic regeneration automatic stop function are linked with ON and OFF of the slow-speed function (function affecting the discharge flow rate of the pump 21). These are linked for the following reason. As described above, in the case of using the slow-speed function, the discharge flow rate of the pump 21 is regulated. On the other hand, in the case of performing the regenerating operation using the load application device 139, the discharge flow rate of the pump 21 needs to be set high (equal to or higher than a flow rate necessary for the regenerating operation). Accordingly, one of the slow-speed function (low discharge flow rate) and the regenerating operation (high discharge flow rate) is prioritized. Specifically, the regeneration control unit 50 turns on the automatic regeneration automatic stop function (uses the automatic regeneration automatic stop function) when the slow-speed function ON is selected by the slow-speed function switch 147. The regeneration control unit 50 turns off the automatic regeneration automatic stop function (does not use the automatic regeneration automatic stop function) when the slow-speed function OFF is selected by the slow-speed function switch 147. If the regenerating operation is stopped (temporarily stopped) by this control, the slow-speed function operates. Specifically, the operation of the operation unit 41 is enabled with the discharge flow rate of the pump 21 regulated (set, for example, at the minimum value). Further, if it is detected by the operation detection unit 43 that the operation unit 41 is not being operated after the regenerating operation is stopped by this control, the regeneration control unit 50 causes the regeneration unit 36 to restart the regenerating operation. Specifically, the discharge flow rate of the pump 21 is set, for example, to the maximum value and the regeneration unit 36 (load application device 139) is set in the activated state.

At the accumulation amount level A, the regeneration canceling operation by the regeneration cancel button 145 is possible. More specifically, at the accumulation amount level A, the regeneration control unit 50 executes an automatic regeneration manual stop control. In the automatic regeneration manual stop control, the regenerating operation of the regeneration unit 36 is stopped (temporarily stopped) when it is selected by the regeneration cancel button 145 to stop the regenerating operation (not to perform the regenerating operation (regenerating operation OFF)).

(Accumulation Amount Levels B and D: Manual Regeneration Control, Manual-Regeneration-Time Operation Invalidation Control)

At the accumulation amount levels B and D (manual regeneration region), the regeneration control unit 50 executes a manual regeneration control (same as in the third embodiment) and a manual-regeneration-time operation invalidation control. In the manual-regeneration-time operation invalidation control, the operation by the operation unit 41 is invalidated in the manual regeneration region and when the regenerating operation is being performed. In the manual-regeneration-time operation invalidation control, the regeneration control unit 50 (crane-side control unit 153) does not receive a command of the operation unit 41 (sets a state where the construction machine cannot be operated). In other words, in the manual-regeneration-time operation invalidation control, the regeneration control unit 50 prevents the actuator 23 from being activated even if the operation unit 41 is operated (regenerating operation is prioritized). On the other hand, the regeneration control unit 50 validates the operation by the operation unit 41 in the manual regeneration region and when the regenerating operation is not being performed.

(Accumulation Amount Level B: Manual Regeneration Manual Stop Control)

At the accumulation amount level B, the regenerating operation (manual regeneration) can be interrupted and restarted. At the accumulation amount level B, the regeneration control unit 50 executes a manual regeneration manual stop control different from that of the third embodiment without executing the manual regeneration interruption control and the manual regeneration restart control executed in the third embodiment.

In the third embodiment, the regenerating operation is interrupted when the manual regeneration button 45 (see FIG. 18) is turned "OFF" in the manual regeneration manual stop control. On the other hand, in the fourth embodiment, the regenerating operation is interrupted when the regeneration cancel button 145 is set to "regenerating operation OFF" (cancel ON) in the manual regeneration manual stop control. More specifically, in the manual regeneration manual stop control of the fourth embodiment, the regenerating operation of the regeneration unit 36 is stopped when the it is selected by the regeneration cancel button 145 not to perform the regenerating operation ("regenerating operation OFF"), i.e. when the regeneration canceling operation is performed.

Note that the accelerator invalidation control executed at the accumulation amount level C in the third embodiment is not executed in the fourth embodiment.

(Accumulation Amount Level D: Manual Regeneration Manual Stop Invalidation Control)

At the accumulation amount level D, the interruption of the regenerating operation is prohibited. At the accumulation amount level D, the operation invalidation control and the manual regeneration switch invalidation control executed in the third embodiment are not executed and a manual regeneration manual stop invalidation control not executed in the third embodiment is executed. In the manual regeneration manual stop invalidation control, the regeneration canceling operation by the regeneration cancel button 145 is invalidated and the regeneration unit 36 is caused to perform the regenerating operation. In the manual regeneration manual stop invalidation control, the regeneration unit 36 is caused to perform the regenerating operation regardless of a selection state of the regeneration cancel button 145 (regardless of "regenerating operation ON" or "regenerating operation OFF") when the regeneration unit 36 performs the regenerating operation by the manual regeneration control. In the manual regeneration manual stop invalidation control, the crane-side control unit 153 does not receive an instruction of the regeneration cancel button 145.

(Accumulation Amount Level E: Forced Regeneration Control)

At the accumulation amount level E (forced regeneration region), the regeneration control unit 50 executes a forced regeneration control different from that of the third embodiment. In the forced regeneration control of the fourth embodiment, the regeneration unit 36 is caused to automatically perform the regenerating operation regardless of the selection state of the regeneration cancel button 145 (and regardless of a detection state of the operation detection unit 43 and a selection state of the manual regeneration button 45).

(Control According to Post Injection Integration Amount P)

Figure 24:
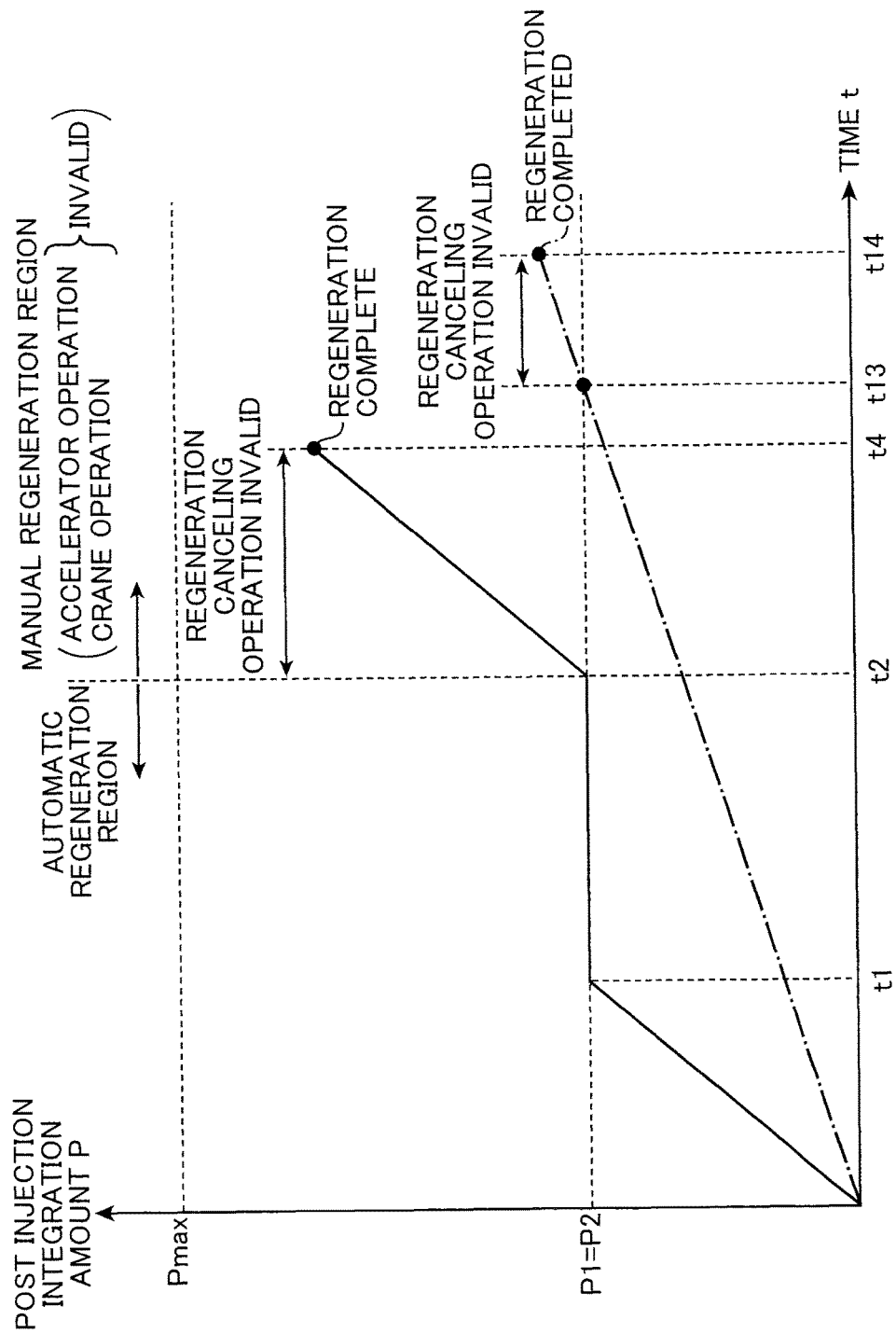
FIG. 24 is a time chart, corresponding to FIG. 19, of the fourth embodiment.

The regeneration control unit 50 (crane-side control unit 153) controls the regenerating operation according to the post injection integration amount P (see FIG. 24). Reference is made to FIG. 18 for devices constituting the exhaust gas purification control device 201 of the third embodiment and reference is made to FIG. 23 for devices constituting the exhaust gas purification control device 301 of the fourth embodiment below.

(Automatic Regeneration Region: S12 to S16, S114)

Figure 25:
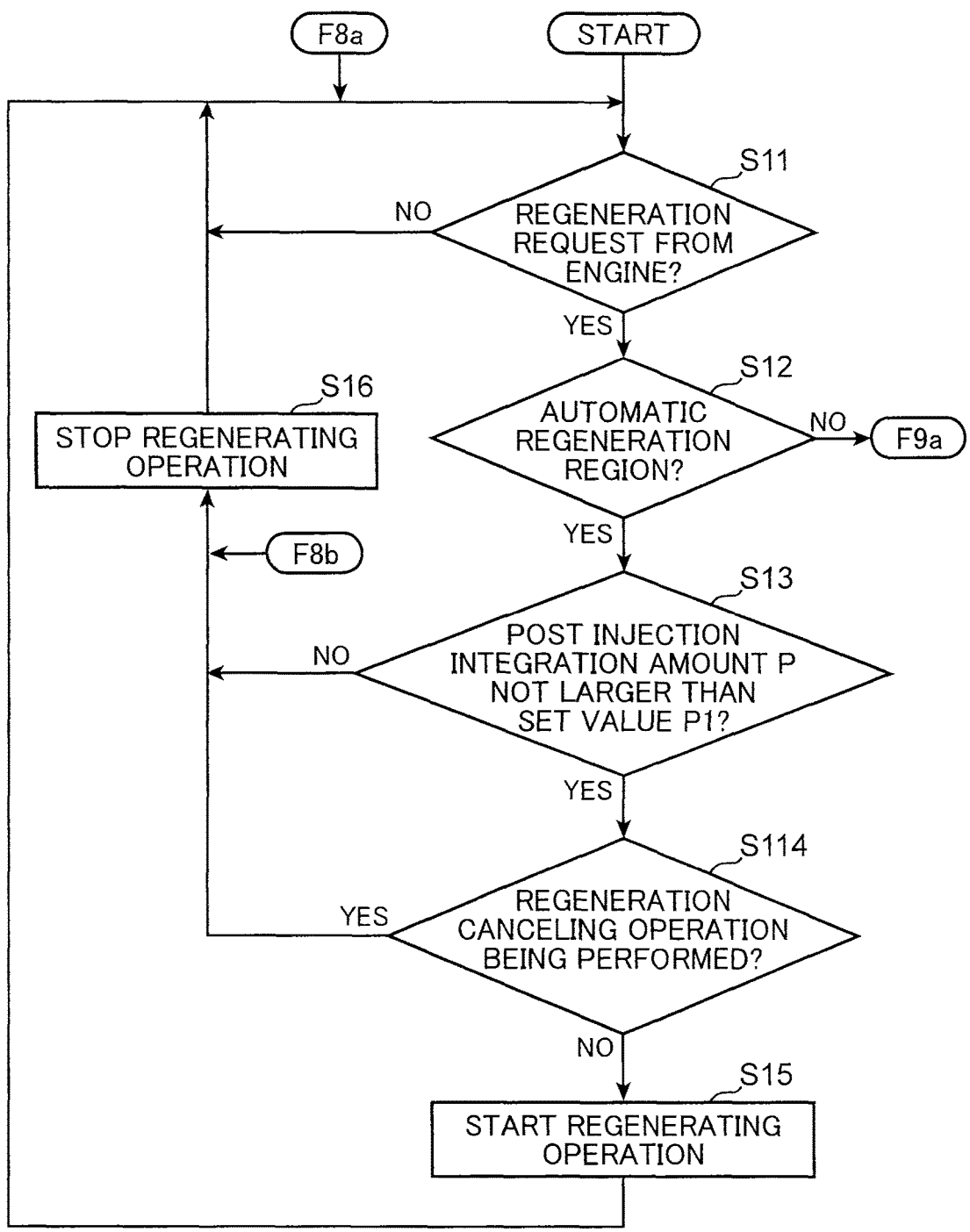
FIG. 25 is a flow chart, corresponding to FIG. 20, of the fourth embodiment.

In the automatic regeneration region (accumulation amount level A), the regeneration control unit 50 limits the regenerating operation of the post injection unit 37 according to the post injection integration amount P (see FIGS. 24 and 25). The flow chart of the third embodiment shown in FIG. 20 differs from that of the fourth embodiment shown in FIG. 25 in Step S114.

In Step S114, it is determined whether or not the regeneration canceling operation by the regeneration cancel button 145 is being performed. If the regeneration canceling operation is being performed (YES in Step S114), Step S16 follows and the regenerating operation is stopped. Unless the regeneration canceling operation is being operated performed (NO in Step S114), Step S15 follows and the regenerating operation by the post injection unit 37 (and the load application device 139) is started.

(Manual Regeneration Region, S21 to S27, S123, S124, S127)

In the manual regeneration region (accumulation amount levels B and D), the regeneration control unit 50 switches the presence or absence of the regenerating operation according to the post injection integration amount P. As in the third embodiment, as shown in FIG. 24, the regeneration unit 50 permits the regenerating operation by the post injection unit 37 when a transition is made (change is made) from the automatic regeneration region to the manual regeneration region (time t2).

The regeneration control unit 50 switches the validation or invalidation of the regeneration canceling operation of the regeneration cancel button 145 according to the post injection integration amount P in the manual regeneration region. More specifically, a set value P2 (regeneration canceling operation prohibition set value) is set in the regeneration control unit 50 (crane-side control unit 153). The set value P2 is not smaller than the set value P1. A case where the set values P1 and P2 are equal is described below (case where these values are not equal is described later). The regeneration control unit 50 invalidates the operation by the regeneration cancel button 145 and causes the regeneration unit 36 to perform the regenerating operation when the post injection integration amount P is larger than the set value P2 (and the manual regeneration is performed) (time t2 to time t4 of a solid polygonal line of FIG. 24 and time t13 to time t14 of a straight dashed-dotted line). The regeneration control unit 50 validates the operation by the regeneration cancel button 145 when the post injection integration amount P is not larger than the set value P2 (time t2 to time t13 of the straight dashed-dotted line of FIG. 24). This control is executed for the following reason. While the post injection integration amount P has a margin for the set value P2, there is a low possibility that the post injection integration amount P reaches the upper limit value Pmax. Thus, even if the regeneration canceling operation by the regeneration cancel button 145 is prioritized over the regenerating operation, there is a high possibility of being able to complete the regenerating operation.

Figure 26:
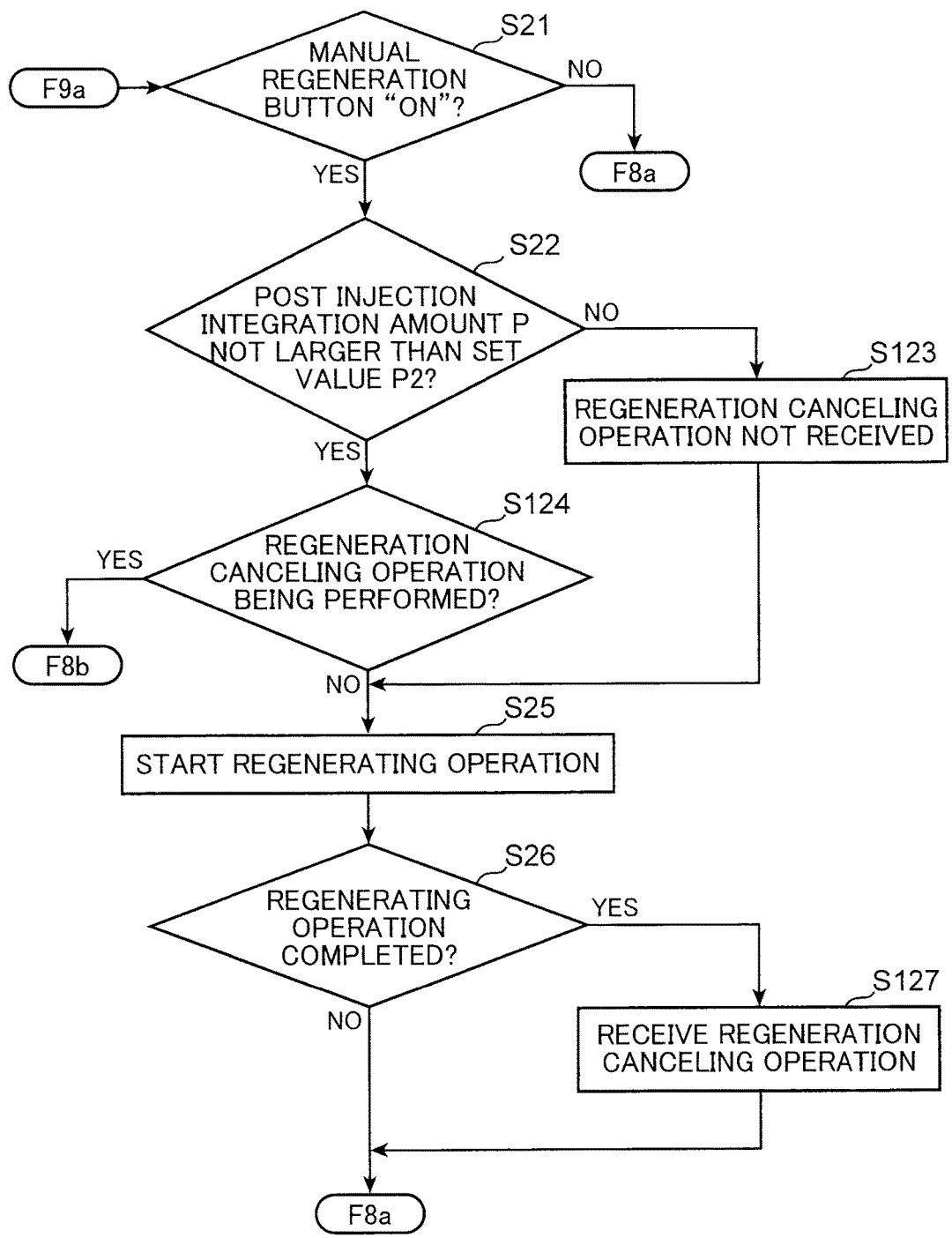
FIG. 26 is a flow chart, corresponding to FIG. 21, of the fourth embodiment.

Points of difference of the operation of the regeneration unit 50 in the manual regeneration region from that of the third embodiment are more specifically described with reference to a flow chart shown in FIG. 26. The flow chart of the fourth embodiment shown in FIG. 26 differs from that of the third embodiment shown in FIG. 21 in Steps S123, S124 and S127.

In Step S123, the regeneration canceling operation by the regeneration cancel button 145 is invalidated (not received) to prioritize the regenerating operation.

In Step S124, it is determined whether or not the regeneration canceling operation is being performed (as in Step S114 (see FIG. 25)). If the regeneration canceling operation is not being performed (NO in Step S124), Step S25 follows. If the regeneration canceling operation is being performed (YES in Step S124), a return is made of Step S16 (see FIG. 25) via F8b and the regenerating operation is stopped.

(Step S127)

If the regenerating operation is completed in Step S26 (YES), Step S127 follows and the regeneration canceling operation is validated (received).

(Effect 21)

Effects by the exhaust gas purification control device 301 of the fourth embodiment shown in FIG. 23 are described. The exhaust gas purification control device 301 includes the automatic regeneration automatic stop selection switch (slow-speed function switch 147) for switching whether or not to use the automatic regeneration automatic stop function.

[Configuration 21] In the automatic regeneration control, the regenerating operation by the post injection unit 37 is stopped when it is detected by the operation detection unit 43 that the operation unit 41 is being operated and when the use of the automatic regeneration automatic stop function is selected by the automatic regeneration automatic stop selection switch (slow-speed function switch 147) (when the automatic regeneration automatic stop function is ON).

In the above [Configuration 21], the regenerating operation is stopped if the operator operates the operation unit 41 when the "automatic regeneration automatic stop function is ON". Thus, in the automatic regeneration region, the operator may stop the regenerating operation without being aware of the regenerating operation. Thus, there is a high possibility of causing useless post injection. However, the useless post injection is suppressed by the above (Effect 14-1).

(Effect 22)

The exhaust gas purification control device 301 includes the pump 21 to be driven by the engine 11, the load application device 139 for applying a load to the ump 21 so that a load for increasing the exhaust temperature of the engine 11 to a temperature at which the regenerating operation is performed is applied to the engine 11, and the discharge flow rate setting switch (slow-speed function switch 147).

[Configuration 22-1] The discharge flow rate setting switch (slow-speed function switch 147) is a switch for selection on the function affecting the discharge flow rate of the pump 21.

[Configuration 22-2] The discharge flow rate setting switch (slow-speed function switch 147) is an automatic regeneration automatic stop selection switch (see the above [Configuration 21]).

The exhaust gas purification control device 301 includes the discharge flow rate setting switch (slow-speed function switch 147) of the above [Configuration 22-1]. The operator may operate the discharge flow rate setting switch (slow-speed function switch 147) for selection on the function affecting the discharge flow rate of the pump 21 (e.g. selection of slow-speed function ON and slow-speed function OFF). Here, this discharge flow rate setting switch is also the automatic regeneration automatic stop selection switch having the function of the above [Configuration 21]. Thus, the operator may select "automatic regeneration automatic stop function ON" without being aware of the selection of "automatic regeneration automatic stop function ON". In the case of the automatic regeneration region and "automatic regeneration automatic stop function ON", the regenerating operation is stopped if the operator operates the operation unit 41 (see the above [Configuration 21]). Thus, there is a high possibility of causing the useless post injection. However, the useless post injection is suppressed by the above (Effect 14-1).

(Effect 23)

[Configuration 23] The regeneration control unit 50 invalidates the operation by the operation unit 41 in the manual regeneration region and when the regenerating operation is being performed (see after time t2 of FIG. 24).

The regenerating operation is easily completed by the above [Configuration 23]. The details of this effect are as follows. There is a rotational speed of the engine 11 suitable for the regenerating operation (rotational speed at which the exhaust temperature easily increases). On the other hand, the rotational speed of the engine 11 affects the operation of the actuator 23 by the operation unit 41. Thus, if the operation by the operation unit 41 is valid, it may not be possible to set the rotational speed of the engine 11 at the rotational speed suitable for the regenerating operation. Contrary to this, if the operation by the operation unit 41 is invalidated as in the above [Configuration 23], the rotational speed of the engine 11 is easily set at the rotational speed suitable for the regenerating operation. Thus, the exhaust temperature of the engine 11 easily increases, wherefore the regenerating operation is easily completed.

The above "(Effect 23)" is effective particularly when outside air temperature (air temperature around the construction machine) is low. The details of this effect are as follows. As described above, the regenerating operation is performed by increasing the exhaust temperature of the engine 11 and this exhaust temperature is subject to outside air temperature. If the outside air temperature is low, the exhaust temperature of the engine 11 may not sufficiently increase (purification device 31 may not be sufficiently regenerated) even if the post injection is performed. As a result, the post injection integration amount P may reach the upper limit value Pmax (see FIG. 24). On the other hand, in the above "(Effect 23)", the rotational speed of the engine 11 is easily set at the rotational speed suitable for the regenerating operation even if the outside air temperature is low. Thus, the exhaust temperature easily increases in an appropriate manner. Therefore, the regenerating operation is easily completed even if the outside air temperature is low.

(Effect 24)

The exhaust gas purification control device 301 includes the regeneration cancel button 145 used by the operator to perform the regeneration canceling operation (operation of stopping the regenerating operation). The regeneration canceling operation prohibition set value P2 (see FIG. 24) is set in the regeneration control unit 50.

[Configuration 24] As shown in FIG. 24, the regeneration control unit 50 (see FIG. 23) invalidates the regeneration canceling operation by the regeneration cancel button 145 (see FIG. 23) and causes the post injection unit 37 to perform the regenerating operation in the manual regeneration region and when the post injection integration amount P is higher than the regeneration canceling operation prohibition set value P2 (see t2 to t4, t13 to t14 of FIG. 24).

In the above [Configuration 24], the regenerating operation is reliably completed when P>P2.

(Effect 25)

[Configuration 25-1] The regeneration control unit 50 validates the regeneration canceling operation by the regeneration cancel button 145 shown in FIG. 23 when the post injection integration amount P is not larger than the regeneration canceling operation prohibition set value P2.

[Configuration 25-2] The regeneration control unit 50 validates the operation by the operation unit 41 in the manual regeneration region and when the regenerating operation is not being performed.

By the above [Configuration 25-1] and [Configuration 25-2], the operation by the operation unit 41 is possible if the regenerating operation is stopped by the regeneration canceling operation when P≤P2 (see FIG. 24). Since a work by the operation of the operation unit 41 is possible, operability is ensured.

(Modification of Fourth Embodiment)

Figure 27:
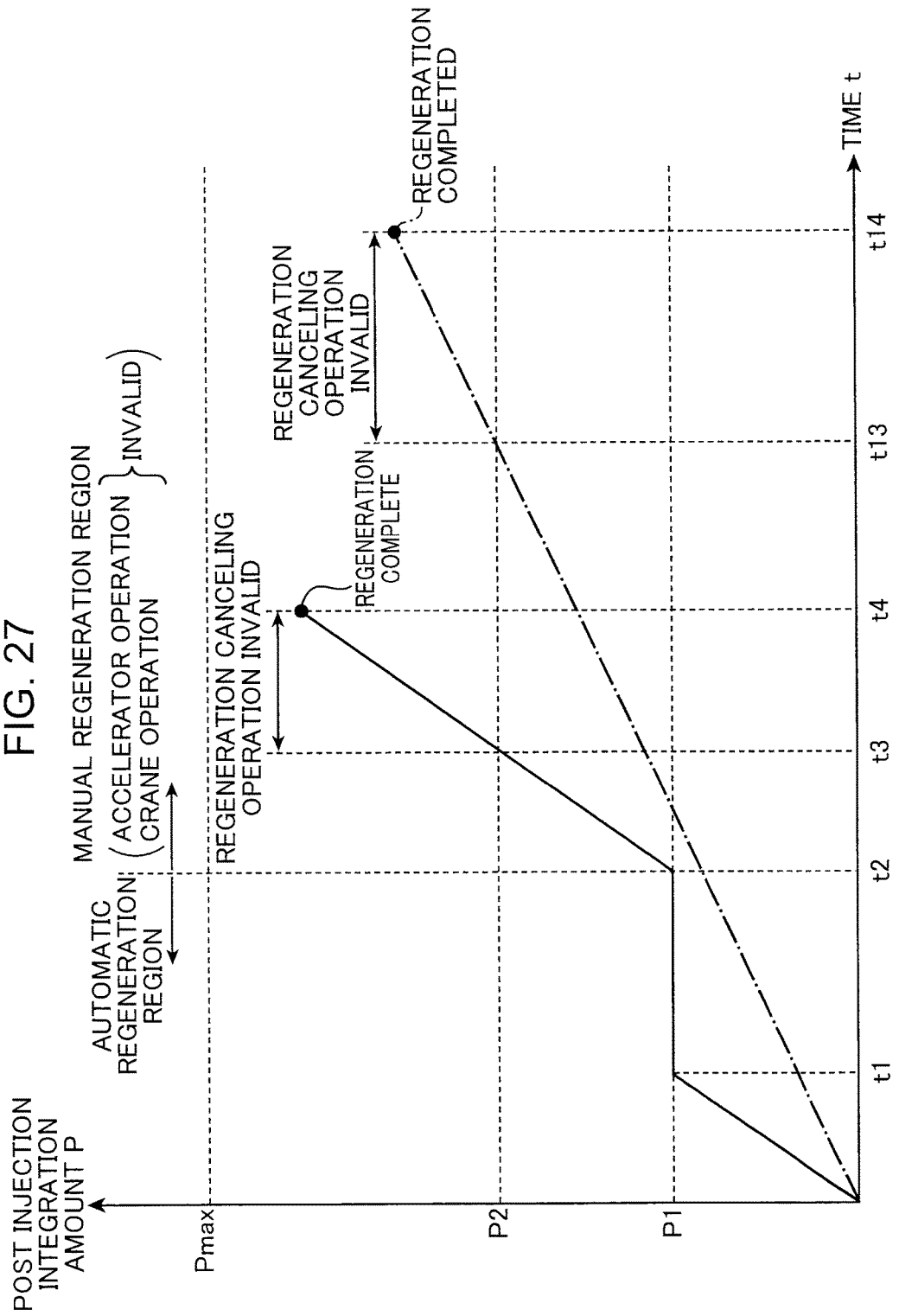
FIG. 27 is a time chart, corresponding to FIG. 22, of a modification of the fourth embodiment.
Figure 28:
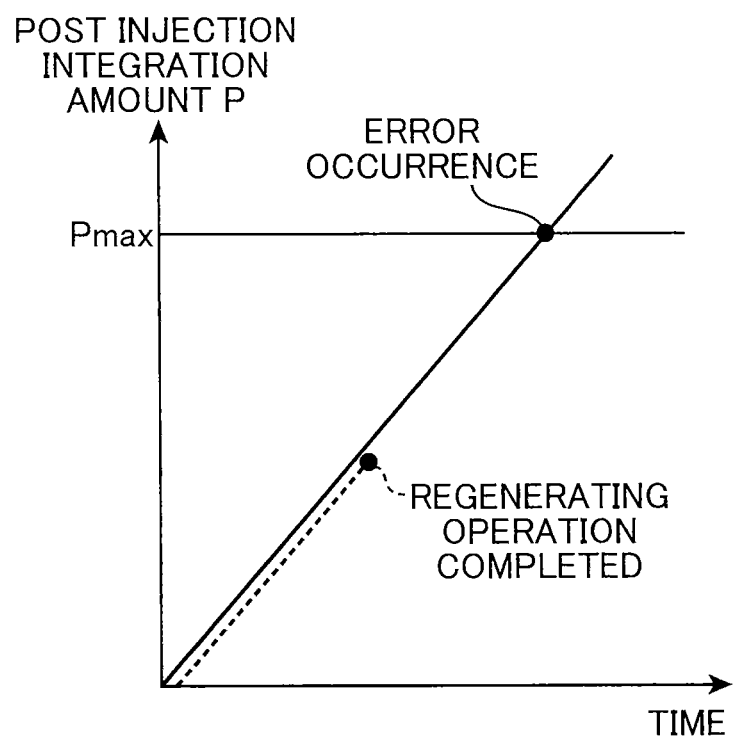
FIG. 28 is a graph showing an upper limit value Pmax of a post injection integrated amount P.

With reference to FIG. 27, points of difference between the aforementioned case where the aforementioned set values P1, P2 are different (case where P1<P2) and the case where these are equal (case where P1=P2) as shown in FIG. 24 are described.

(Case where P1=P2) The exhaust gas purification control device 301 operates as follows when P1=P2 as in the above fourth embodiment. As shown by a solid polygonal line in FIG. 24, when the post injection integration amount P exceeds the set value P1 in the automatic regeneration region (time t1), it also exceeds the set value P2. That is, when a transition is made from the automatic regeneration region to the manual regeneration region (time t2), the regeneration canceling operation by the regeneration cancel button 145 (see FIG. 23) is inevitably invalidated (S123 of FIG. 26).

(Case where P1<P2) On the other hand, as shown in FIG. 27, the exhaust gas purification control device 301 (see FIG. 24) operates as follows when P1<P2. As shown by a solid polygonal line in FIG. 27, a transition is made from the automatic regeneration region to the manual regeneration region (time t2) after the post injection integration amount P exceeds the set value P1 in the automatic regeneration region (time t1). The operation by the regeneration cancel button 145 (see FIG. 24) is validated (YES in S22 of FIG. 26) from this time (time t2) until the post injection integration amount P exceeds the set value P2 (time t3). If the manual regeneration is stopped by the regeneration canceling operation, the operation of the operation unit 41 is validated, wherefore operability is ensured.

(Other Modifications)

In the above fourth embodiment, the slow-speed function switch 147 is the automatic regeneration automatic stop selection switch and the discharge flow rate setting switch. However, other switches may be provided as the automatic regeneration automatic stop selection switch and the discharge flow rate setting switch in addition to (or instead of) the slow-speed function switch 147. The "other switches" may include an operation mode changeover switch, a drum brake changeover switch and the like. Further, the above "other switches" include an excessive load preventing device release switch, an excessive load preventing device redundant switch and the like. For example, if an excessive load preventing device is released by the excessive load preventing device release switch (when an excessive load preventing device releasing function is ON), the above automatic regeneration automatic stop function is turned ON (regenerating operation is temporarily stopped if the operating unit 41 is operated in the automatic regeneration region). If the excessive load preventing device release switch function is OFF, the automatic regeneration automatic stop function is turned OFF. Further, if it is selected, for example, to use an excessive load preventing device redundant function (described later) by the excessive load preventing device redundant switch (excessive load preventing device redundant function is ON), the above automatic regeneration automatic stop function is turned ON. If the excessive load preventing device redundant function is OFF, the above automatic regeneration automatic stop function is turned OFF. Note that the excessive load preventing device redundant function is a function of enabling a minimum work of the construction machine (crane operation, etc.) by causing only minimum functions of the excessive load preventing device to work when the excessive load preventing device is broken.

Connections among the respective devices in the block diagrams shown in FIGS. 18 and 23 may be appropriately changed. Further, the sequences of Steps of the flow charts shown in FIGS. 20, 21, 25 and 26 may be appropriately changed. Further, all or parts of the configurations and controls of the third embodiment and all or parts of the configurations and controls of the fourth embodiment may be combined.

Fifth Embodiment

An exhaust gas purification control device 401 of a fifth embodiment is described with reference to FIGS. 29 to 32. In this fifth embodiment, only parts different from the first embodiment are described and the same structures, functions and effects as the first embodiment are not described.

The exhaust gas purification control device 401 includes a display control unit 60 and an accumulation amount display unit 70 in addition to an engine 11, actuator circuit devices 21 to 25, engine peripheral devices 31 and 33, a regeneration unit 36, operation-related devices 41 to 45 and a regeneration control unit 50.

An engine-side control unit 51 of this embodiment includes a post injection amount integration unit 51a, an error determination unit 51b and an accumulation amount information transmission unit 51c.

The post injection amount integration unit 51a computes a post injection integration amount P. The post injection integration amount P is an integration amount of post injection from the completion of the last regenerating operation (closest from the present point of time) to the present point of time. The "completion" of the regenerating operation is described later. The post injection integration amount P increases according to the post injection and becomes 0 (reset) when the regenerating operation is completed. Specifically, the post injection amount integration unit 51a computes the post injection integration amount P and returns the post injection integration amount P to a value (0) at the completion of the last regenerating operation when the regenerating operation is completed.

The error determination unit 51b is a part for determining an "error (reduction in a purification function of a purification device 31)" when the post injection integration amount P exceeds an upper limit value Pmax. The upper limit value Pmax is set in advance in the error determination unit 51b.

Figure 36:
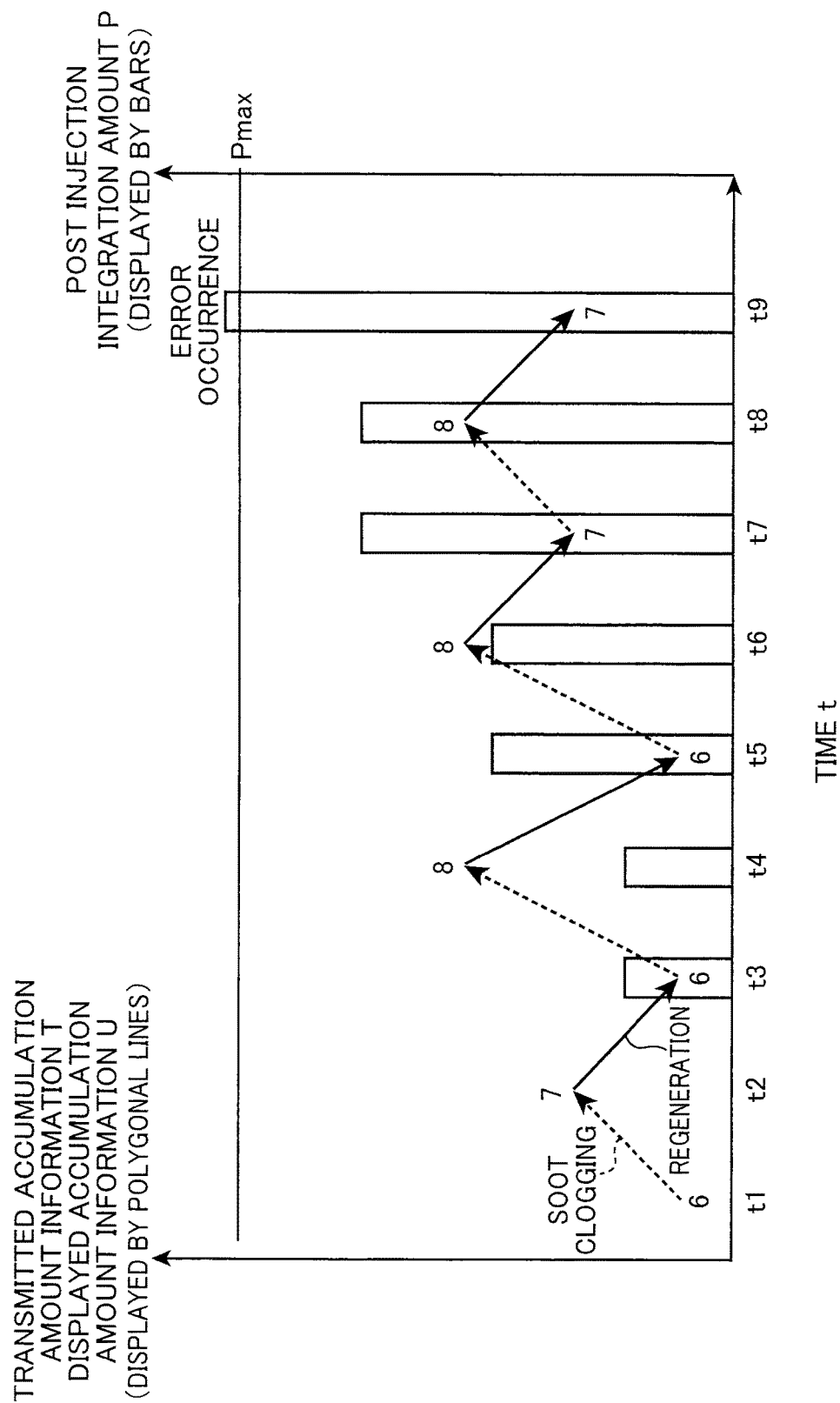
FIG. 36 is a time chart of the operation of the exhaust gas purification control device.

This error determination is made to determine catalyst deterioration (described later) of the purification device 31. The error determination unit 51b determines an "error" even if a catalyst is not actually deteriorated when the post injection integration amount P exceeds the upper limit value Pmax (erroneous determination on catalyst deterioration) (see FIG. 36). If the error determination unit 51b determines an "error", the engine 11 limits, for example, an output. Note that the details of catalyst deterioration are as in the following points [a], [b]. [a] If the catalyst of the purification device 31 is deteriorated, an exhaust temperature of the engine 11 (temperature of soot) does not sufficiently increase and the soot is not burned even if the post injection is performed. [b] As a result, the regenerating operation is not completed although the post injection integration amount P is large.

The accumulation amount information transmission unit 51c transmits "accumulation amount information" based on an accumulation amount detected by an accumulation amount detection unit 33. The above "accumulation amount information" is information on the accumulation amount of soot captured by the purification device 31 (ECU soot amount information). The accumulation amount information transmitted from the accumulation amount information transmission unit 51c is referred to as "transmitted accumulation amount information T".

A crane-side control unit 53 (machine-side control unit) determines whether or not to permit the regenerating operation in response to a request of the regenerating operation from the engine-side control unit 51. Detection results and selection results are input to the crane-side control unit 53 from a load detection unit 11b, an operation detection unit 43 and a manual regeneration button 45.

Figure 29:
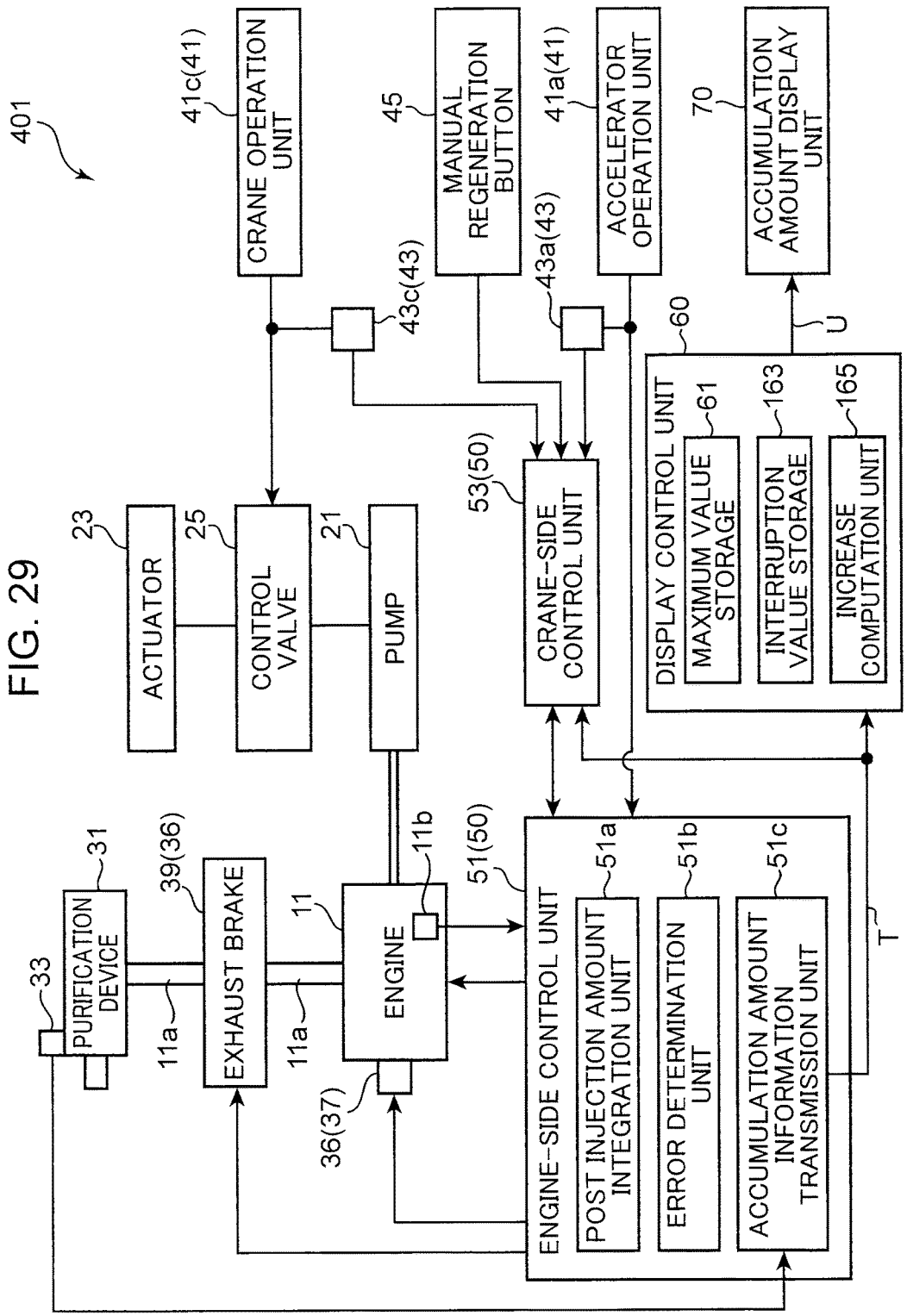
FIG. 29 is a block diagram of an exhaust gas purification control device for construction machine of a fifth embodiment.

The display control unit 60 controls displayed accumulation amount information U based on the transmitted accumulation amount information T. The displayed accumulation amount information U is accumulation amount information to be displayed on the accumulation amount display unit 70 by the display control unit 60. The transmitted accumulation amount information T is input from the accumulation amount information transmission unit 51c to the display control unit 60. The display control unit 60 includes a maximum value storage 61. Note that an interruption value storage 163 and an increase computation unit 165 shown in FIG. 29 are described later (see modification 1).

The maximum value storage 61 stores maximum transmitted accumulation amount information Tm. The maximum transmitted accumulation amount information Tm is a maximum value of the transmitted accumulation amount information T from the completion of the last regenerating operation of the purification device 31 to the present point of time.

The accumulation amount display unit 70 is a device for displaying the accumulation amount information. The accumulation amount display unit 70 is a monitor (display) to be viewed by an operator of a construction machine. The accumulation amount display unit 70 is arranged in a driving room (not shown) of the construction machine.

(Operation of Regeneration Control Unit 50)

The regeneration control unit 50 of this embodiment controls the regenerating operation corresponding to an accumulation amount level without controlling a display corresponding to the accumulation amount level. Since the control of the regenerating operation according to the accumulation amount level is the same as in the first embodiment, this control is not described.

(Operation of Display Control Unit 60)

The display control unit 60 controls the display of the accumulation amount display unit 70 according to the accumulation amount information. The display control unit 60 specifically operates as follows. A total of eleven pieces of accumulation amount information of "0" to "10" are, for example, set in the engine-side control unit 51. "0" is the accumulation amount information with a minimum accumulation amount. "10" is the accumulation amount information with a maximum accumulation amount. The display control unit 60 outputs the accumulation amount information of "0" to "10" to the accumulation amount display unit 70. A relationship between the aforementioned accumulation amount levels of below A, A to E and the accumulation amount information of "0" to "10" is set, for example, as follows (this relationship may be changed). Note that the purification device 31 is judged to be broken when the accumulated amount information is "10".

Accumulation amount information "0": accumulation amount level below A

Accumulation amount information "1", "2": accumulation amount level A

Accumulation amount information "3", "4": accumulation amount level B

Accumulation amount information "5", "6": accumulation amount level C

Accumulation amount information "7", "8": accumulation amount level D

Accumulation amount information "9": accumulation amount level E

Accumulation amount information "10": breakdown

Figure 30:
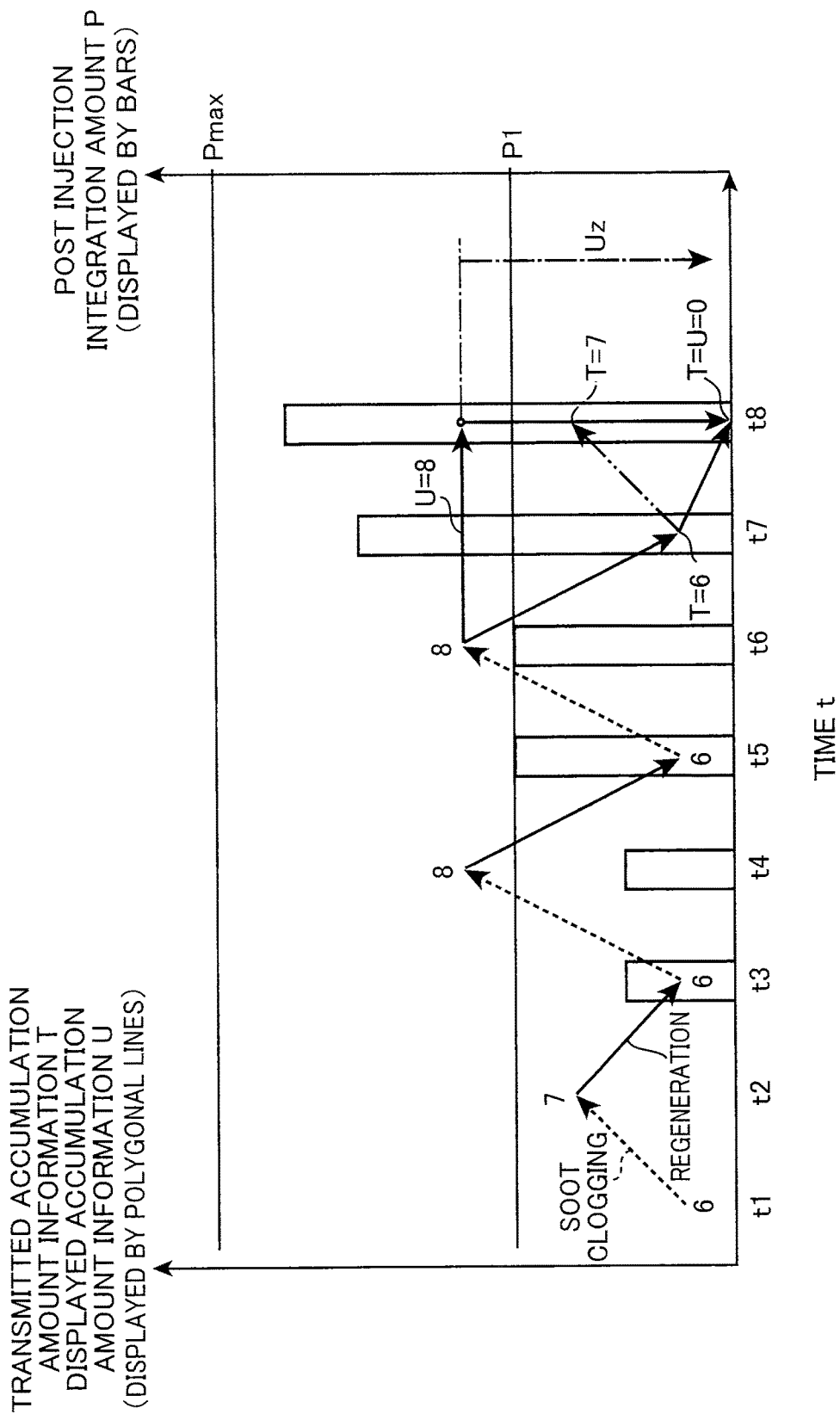
FIG. 30 is a time chart of the operation of the exhaust gas purification control device shown in FIG. 29.

The display control unit 60 changes the control according to the post injection integration amount P (hereinafter, see FIG. 29 for constituent elements such as devices constituting the exhaust gas purification control device 401). As shown in FIG. 30, a set value P1 (maximum value display switch set value) is set in advance in the display control unit 60. The display control unit 60 changes the control of the display of the accumulation amount display unit 70 when the post injection integration amount P is not larger than the set value P1 (case where P≤P1) and when the post injection integration amount P1 is larger than P1 (case where P>P1).

(Case where P≤P1: U=T)

A case where P≤P1 is described with reference to a part of time t1 to time t6 of FIG. 30. When P≤P1, the displayed accumulation amount information U displayed on the accumulation amount display unit 70 by the display control unit 60 is the transmitted accumulation amount information T transmitted from the accumulation amount information transmission unit 51c. Specifically, when P≤P1, the display control unit 60 releases a maximum-value-or-larger display control described next.

(Case where P>P1: U=Tm, Maximum-Value-or-Larger Display Control)

A case where P>P1 is described with reference to a part of time t6 to time t8 of FIG. 30. When P>P1, the display control unit 60 executes the maximum-value-or-larger display control. In the maximum-value-or-larger display control, the maximum transmitted accumulation amount information Tm stored in the maximum value storage 61 is set as the displayed accumulation amount information U. Further, in the maximum-value-or-larger display control, accumulation amount information larger than the maximum transmitted accumulation amount information Tm may be set as the displayed accumulation amount information U (see modifications 1 and 2 to be described later). The maximum-value-or-larger display control is specifically as follows. The regenerating operation is performed for a period of time t6 to time t7 of FIG. 30. At this time, the transmitted accumulation amount information T is reduced from "8" to "6". On the other hand, the displayed accumulation amount information U remains to be "8" (no subtraction on the display of the accumulation amount display unit 70).

(Control of Start and Stop of Regenerating Operation)

The transmitted accumulation amount information T and the displayed accumulation amount information U are made different by the maximum-value-or-larger display control. At this time, the regeneration control unit 50 switches conditions on the start and stop of the regenerating operation not according to the transmitted accumulation amount information T, but according to the displayed accumulation amount information U. This is specifically as follows. At time t7 of FIG. 30, the displayed accumulation amount information U is "8" (corresponding to the accumulation amount level D) and the transmitted accumulation amount information T is "6" (corresponding to the accumulation amount level C). At this time, the regeneration control unit 50 executes the control at the accumulation amount level D corresponding to the displayed accumulation amount information U.

(Control when Regenerating Operation is Completed)

At time t8 of FIG. 30, the regenerating operation is completed and the transmitted accumulation amount information T is set to "0". At this time, the maximum-value-or-larger display control is released. As a result, the displayed accumulation amount information U is set to "0".

(Flow Chart)

Figure 31:
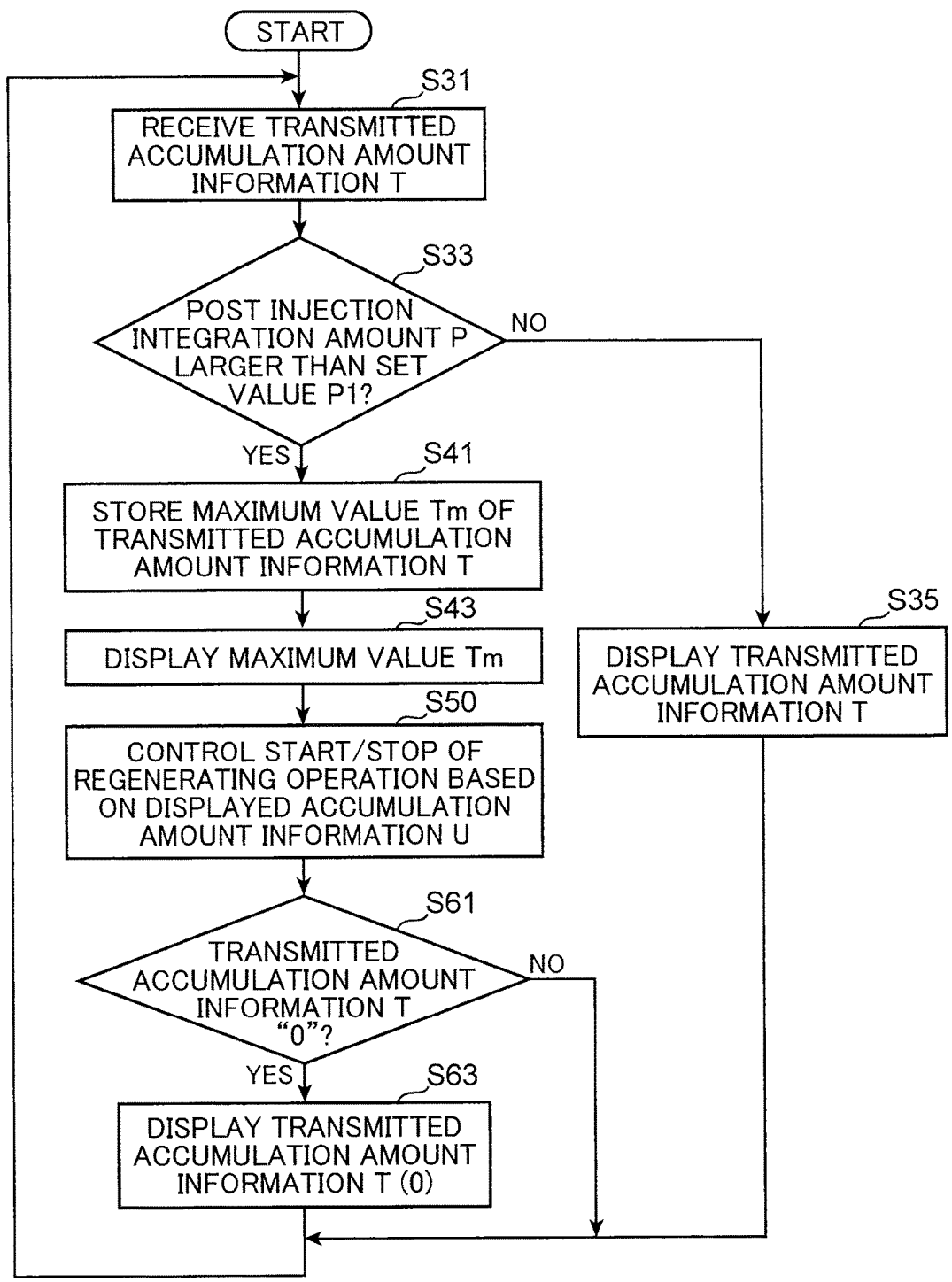
FIG. 31 is a flow chart of the operation of the exhaust gas purification control device shown in FIG. 29.

The operation (S31 to S63) of the display control unit 60 is more specifically described with reference to a flow chart of FIG. 31.

In Step S31, the transmitted accumulation amount information T is received.

In Step S33, it is determined whether or not the post injection integration amount P is larger than the set value P1 (P>P1). If P≤P1 (NO in Step S33), the transmitted accumulation amount information T is set as the displayed accumulation amount information U (Step S35) and a return is made to Step S31. If P>P1 (YES in Step S33), Step S41 follows.

In Step S41, the aforementioned maximum transmitted accumulation amount information Tm is stored in the maximum value storage 61.

In Step S43, the maximum transmitted accumulation amount information Tm is set as the displayed accumulation amount information U.

In Step S50, the start and stop of the regenerating operation are controlled based on the displayed accumulation amount information U. Then, Step S61 follows.

In Step S61, it is determined whether or not the regenerating operation has been completed, i.e. the transmitted accumulation amount information T is "0". If the transmitted accumulation amount information T is "0" (YES in Step S61), the transmitted accumulation amount information T (="0") is set as the displayed accumulation amount information U. Further, the maximum transmitted accumulation amount information Tm is reset to "0". Subsequently, a return is made to Step S31. If the transmitted accumulation amount information T is not "0" (NO in Step S61), a return is made to Step S31.

(Effect 26)

Next, effects by the exhaust gas purification control device 401 shown in FIG. 29 are described. The exhaust gas purification control device 401 includes the engine 11, the purification device 31 for capturing soot in the exhaust of the engine 11, the accumulation amount detection unit 33 for detecting the accumulation amount of the soot captured by the purification device 31, the post injection unit 37 for performing the post injection to inject fuel into the engine 11 in an exhaust stroke after an expansion stroke of the engine 11 so that the exhaust temperature of the engine 11 increases to a temperature at which the regenerating operation (operation of regenerating the purification device 31 by burning the soot captured by the purification device 31) is performed, the post injection amount integration unit 51$a$ for computing the post injection integration amount P, which is an integration amount of the post injection from the completion of the last regenerating operation of the purification device 31, and returning the post injection integration amount P to the value (0) at the completion of the last regenerating operation when the regenerating operation is completed, the error determination unit 51$b$ for determining a reduction in the purification function of the purification device 31 if the post injection integration amount P exceeds the upper limit value Pmax set in advance, the accumulation amount information transmission unit 51$c$ for transmitting the accumulation amount information (information on the accumulation amount of the soot captured by the purification device 31) based on the accumulation amount detected by the accumulation amount detection unit 33, the accumulation amount display unit 70 for displaying the accumulation amount information and the display control unit 60 for controlling the displayed accumulation amount information U (accumulation amount information to be displayed by the accumulation amount display unit 70) based on the transmitted accumulation amount information T (accumulation amount information transmitted from the accumulation amount information transmission unit 51$c$). The display control unit 60 includes the maximum value storage 61 for storing the maximum transmitted accumulation amount information Tm (maximum value of the transmitted accumulation amount information T from the completion of the last regenerating operation of the purification device 31).

[Configuration 26] The display control unit 60 executes the maximum-value-or-larger display control to set the accumulation amount information equal to or higher than the maximum transmitted accumulation amount information Tm stored in the maximum value storage 61 as the displayed accumulation amount information U.

By the maximum-value-or-larger display control of the above [Configuration 26], the information of the accumulation amount not smaller than the accumulation amount detected by the accumulation amount detection unit 33 is displayed on the accumulation amount display unit 70. Thus, the operator of the machine (construction machine) with the exhaust gas purification control device 401 tends to recognize that the accumulation amount of the soot is large. In other words, since the operator is urged to complete the regenerating operation, the operator can easily complete the regenerating operation. Thus, the post injection integration amount P easily becomes 0 by the completion of the regenerating operation. Since this makes it difficult for the post injection integration amount P to exceed the upper limit value Pmax, an "error" determination of the error determination unit 51$b$ is suppressed.

(Effect 27)

The set value P1 (maximum value display switch set value) shown in FIG. 30 is set in the display control unit 60. When the post injection integration amount P is not larger than the set value P1, the display control unit 60 releases the maximum-value-or-large display control and sets the transmitted accumulation amount information T as the displayed accumulation amount information U.

In this configuration, the maximum-value-or-large display control can be released if necessary. The details of this effect are as follows. The error determination unit 51$b$ determines an "error" (error determination) when the post injection integration amount P exceeds the upper limit value Pmax set in advance. Thus, as the post injection integration amount P decreases, a possibility of error determination becomes lower and, hence, there is less need to execute the maximum-value-or-large display control. Thus, the display control unit 60 releases the maximum-value-or-large display control when the post injection integration amount P is not larger than the set value P1. Therefore, the maximum-value-or-large display control is released if necessary.

(Effect 28)

The exhaust gas purification control device 401 includes the regeneration control unit 50 for controlling the regenerating operation. The regeneration control unit 50 switches the conditions on the start and stop of the regenerating operation according to the displayed accumulation amount information U.

In this configuration, the operator is less confused as compared with the case where the conditions (controls) on the start and stop of the regenerating operation are switched not according to the display of the accumulation amount display unit 70, but according to the transmitted accumulation amount information T.

(Other Effects)

If the operation of the operation unit 41 becomes impossible (or is limited) during the regenerating operation, the following effect is obtained by the maximum-value-or-large display control. By the maximum-value-or-large display control, the operator is urged to complete the regenerating operation (see the above Effect 26). Thus, the regenerating operation is easily completed in a stage where the accumulation amount of the soot is small. Accordingly, the regenerating operation is easily completed in a short time as compared with the case where the regenerating operation is completed in a stage where the accumulation amount of the soot is large. Thus, a time during which the operation of the operation unit 41 becomes impossible (or is limited) is shortened. Therefore, a reduction in operation efficiency caused by the prolonged regenerating operation is suppressed.

(Modification 1 of Fifth Embodiment)

Figure 32:
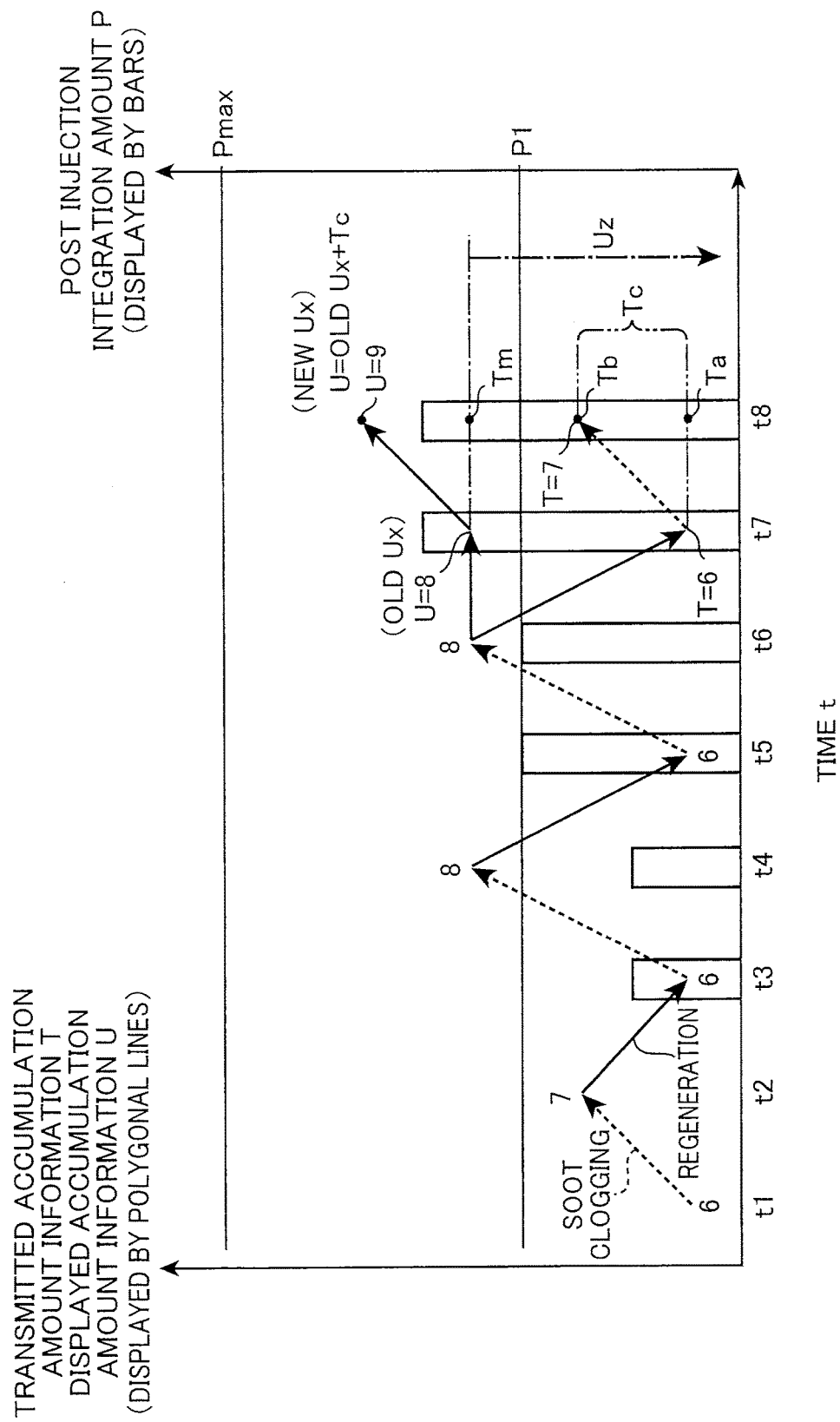
FIG. 32 is a time chart of the operation of an exhaust gas purification control device of a modification 1.
Figure 33:
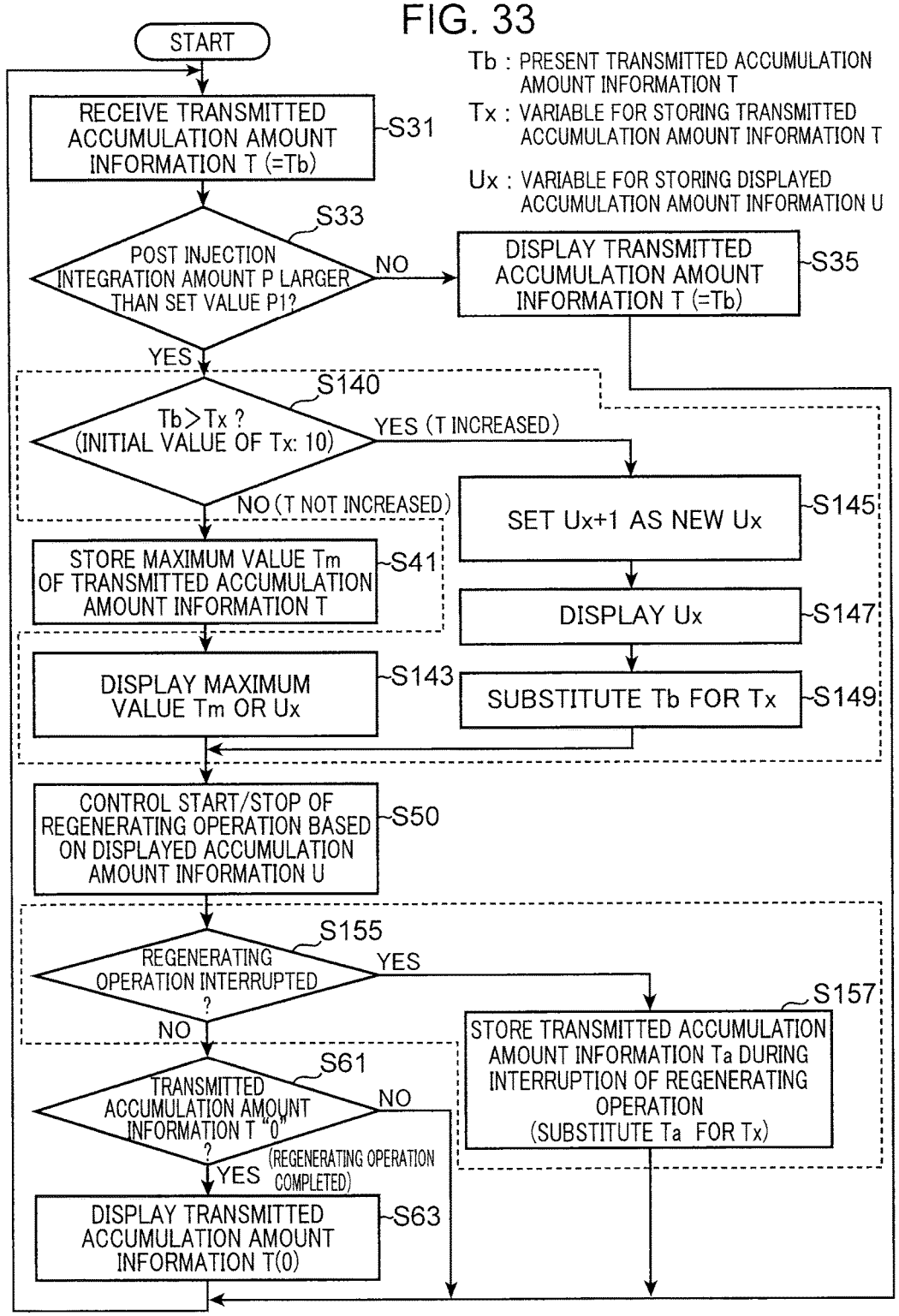
FIG. 33 is a flow chart of the operation of the exhaust gas purification control device of the modification 1.

Points of difference of a modification 1 of the operation of the display control unit 60 from the above embodiment are described with reference to FIGS. 32 and 33. As shown in FIG. 30, in the above embodiment, the maximum transmitted accumulation amount information Tm is set as the displayed accumulation amount information U when P>P1. On the other hand, as shown in FIG. 32 (see time t8), a value larger than the maximum transmitted accumulation amount information Tm is set as the displayed accumulation amount information U in the modification 1. Further, as shown in FIG. 29, the display control unit 60 of the modification 1 includes the interruption value storage 163 and the increase computation unit 165. The above points of difference are further described below.

(Problem Caused by Setting Maximum Transmitted Accumulation Amount Information Tm as Displayed Accumulation Amount Information U)

A problem caused by setting the maximum transmitted accumulation amount information Tm as the displayed accumulation amount information U is described with reference to a part of time t6 to time t8 of FIG. 30. A region of the accumulation amount not larger than the maximum transmitted accumulation amount information Tm is a "region Uz". When the regenerating operation is performed during a period of time t6 to time t7, the post injection integration amount P increases. During a period of time t7 to time t8, the accumulation amount of the soot increases ("soot clogging" occurs) as shown by a chain double-dashed line in FIG. 30. At this time, the display of the accumulation amount display unit 70 remains unchanged (remains to be "8") unless the transmitted accumulation amount information T exceeds the displayed accumulation amount information U (=maximum transmitted accumulation amount information Tm). If the regenerating operation and the "soot clogging" are repeated in this region Uz, the display of the accumulation amount display unit 70 remains unchanged, whereas there is a higher possibility that the post injection integration amount P exceeds the upper limit value Pmax.

(Details of Points of Difference)

The interruption value storage 163 stores interruption-time transmitted accumulation amount information Ta shown in FIG. 32 (see time t8). The interruption-time transmitted accumulation amount information is the transmitted accumulation amount information T when the post injection unit 37 interrupts the regenerating operation (at the time of interrupting the regenerating operation). Note that the transmitted accumulation amount information T at the present point of time is "present transmitted accumulation amount information Tb" as against the interruption-time transmitted accumulation amount information Ta (past transmitted accumulation amount information T).

The increase computation unit 165 computes an increase Tc of the accumulation amount information from the interruption of the regenerating operation (time t7 of FIG. 32) to the present point of time (time t8). More specifically, the increase Tc is an increase (difference) of the present transmitted accumulation amount information Tb from the interruption-time transmitted accumulation amount information Ta (Tc=Tb−Ta).

(Operation of Display Control Unit 60)

The display control unit 60 executes an increase addition display control in the maximum-value-or larger display control. When the maximum-value-or-large display control is released (when P≤P1), the display control unit 60 does not execute the increase addition display control. In the increase addition display control, the sum of the increase Tc computed by the increase computation unit 165 and the last displayed accumulation amount information U is set as new displayed accumulation amount information U. A specific example of this control is as follows. The regenerating operation is interrupted at time t7 of FIG. 32. At this time, the transmitted accumulation amount information T and the interruption-time transmitted accumulation amount information Ta are "6" and the displayed accumulation amount information U is "8". The accumulation amount of the soot increases and the transmitted accumulation amount information T increases from "6" to "7" during the period from time t7 to time t8. The increase Tc during this period from time t7 to time t8 is "1". Accordingly, the sum (="9") of the last displayed accumulation amount information U (="8") (at time t7) and the increase Tc (="1") is set as new displayed accumulation amount information U (at time t8).

(Flow Chart)

The increase addition display control of the display control unit 60 is further described with reference to a flow chart shown in FIG. 33. Main points of difference between the modification 1 and the above embodiment are broken line parts of FIG. 33, i.e. the presence of Steps S140 to S149, S155 and S157.

In Step S140, it is determined whether or not the transmitted accumulation amount information T has increased after the interruption of the regenerating operation. This determination is made if YES (P>P1) in Step S33. Specifically, in this determination, it is determined whether or not the present transmitted accumulation amount information Tb is larger than a variable Tx. The variable Tx is a variable for storing the transmitted accumulation amount information T. An initial value of the variable Tx is a maximum value (10) of values (e.g. 0 to 10) which can be taken by the displayed accumulation amount information U. If the transmitted accumulation amount information T has increased after the interruption of the regenerating operation (Tb>Tx), i.e. if YES in Step S140, Step S145 follows. If there is no increase of the transmitted accumulation amount information T after the interruption of the regenerating operation (Tb≤Tx), i.e. if NO in Step S140, Step S143 follows after Step S41. Note that NO in Step S140 also when the regenerating operation has not been interrupted at all from the completion of the last regenerating operation to the present point of time.

In Step S143, the maximum transmitted accumulation amount information Tm ("maximum value Tm" in FIG. 33) is set as the displayed accumulation amount information U as in Step S43 of FIG. 30. However, if a variable Ux is larger than the maximum transmitted accumulation amount information Tm, the variable Ux is set as the displayed accumulation amount information U (described later). Then, Step S50 follows.

In Step S145, the sum of the variable Ux and the increase Tc (specifically, 1) is set as a new variable Ux (new displayed accumulation amount information U). The variable Ux is a variable for storing a value relating to the displayed accumulation amount information U. The variable Ux is the last displayed accumulation amount information U. For example, if the present point of time is time t8 of FIG. 32, the sum of the last displayed accumulation amount information U (old Ux="8") at time t7 and the increase Tc (="1") is set as the new variable Ux (new Ux="9").

In Step S147, the new variable Ux calculated in Step S145 is set as the displayed accumulation amount information U. Specifically, the variable Ux that is a value larger than the maximum transmitted accumulation amount information Tm is displayed on the accumulation amount display unit 70. As just described, the variable Ux is set as the displayed accumulation amount information U in Step S143 described above if the variable Ux becomes larger than the maximum transmitted accumulation amount information Tm.

In Step S149, the present transmitted accumulation amount information Tb is substituted for the variable Tx (stored). Then, Step S50 follows.

In Step S155, it is determined whether or not the regenerating operation has been interrupted. Unless the regenerating operation has been interrupted (NO in Step S155), Step S61 follows. If the regenerating operation has been interrupted (YES in Step S155), Step S157 follows.

In Step S157, the interruption-time transmitted accumulation amount information Ta is substituted for the variable Tx and a return is made to Step S31.

(Effect 29)

Effects by the modification 1 are described. The display control unit 60 shown in FIG. 29 includes the interruption value storage 163 for storing the interruption-time transmitted accumulation amount information Ta (see FIG. 32) that is the transmitted accumulation amount information T when the post injection unit 37 interrupted the regenerating operation and the increase computation unit 165 for computing the increase Tc (see FIG. 32) of the present transmitted accumulation amount information Tb (see FIG. 32) from the interruption-time transmitted accumulation amount information Ta. The display control unit 60 executes the increase addition display control to set the sum of the increase Tc computed by the increase computation unit 165 and the last displayed accumulation amount information U ("old Ux" of FIG. 32) as the displayed accumulation amount information U (U=new Ux=old Ux+Tc).

In this increase addition display control, the displayed accumulation amount information U increases (see time t7 to time t8 of FIG. 32) if the transmitted accumulation amount information T increases in the region Uz (region of the accumulation amount not larger than the maximum transmitted accumulation amount information Tm) after the interruption of the regenerating operation. Thus, the operator is urged to complete the regenerating operation. Therefore, a possibility that the post injection integration amount P exceeds the upper limit value Pmax is reduced.

(Modification 2)

Points of difference of a modification 2 of the operation of the display control unit 60 from the above modification 1 are described with reference to FIG. 34.

(Problem Caused by Increase Addition Display Control)

As shown in FIG. 32, the increase addition display control is executed in the modification 1. Here, a region of the accumulation amount not larger than the displayed accumulation amount information U is a "region Uy". If the interruption of the regenerating operation and the soot clogging are repeated in the region Uy, the displayed accumulation amount information U may become excessively larger than the transmitted accumulation amount information T (display may become excessively larger than the actual accumulation amount of the soot). For example, although the accumulation amount information ("10") to the effect that the purification device 31 is broken is displayed on the accumulation amount display unit 70, the actual accumulation amount of the soot may be such an amount that the purification device 31 sufficiently functions.

(Points of Difference from Modification 1)

Figure 34:
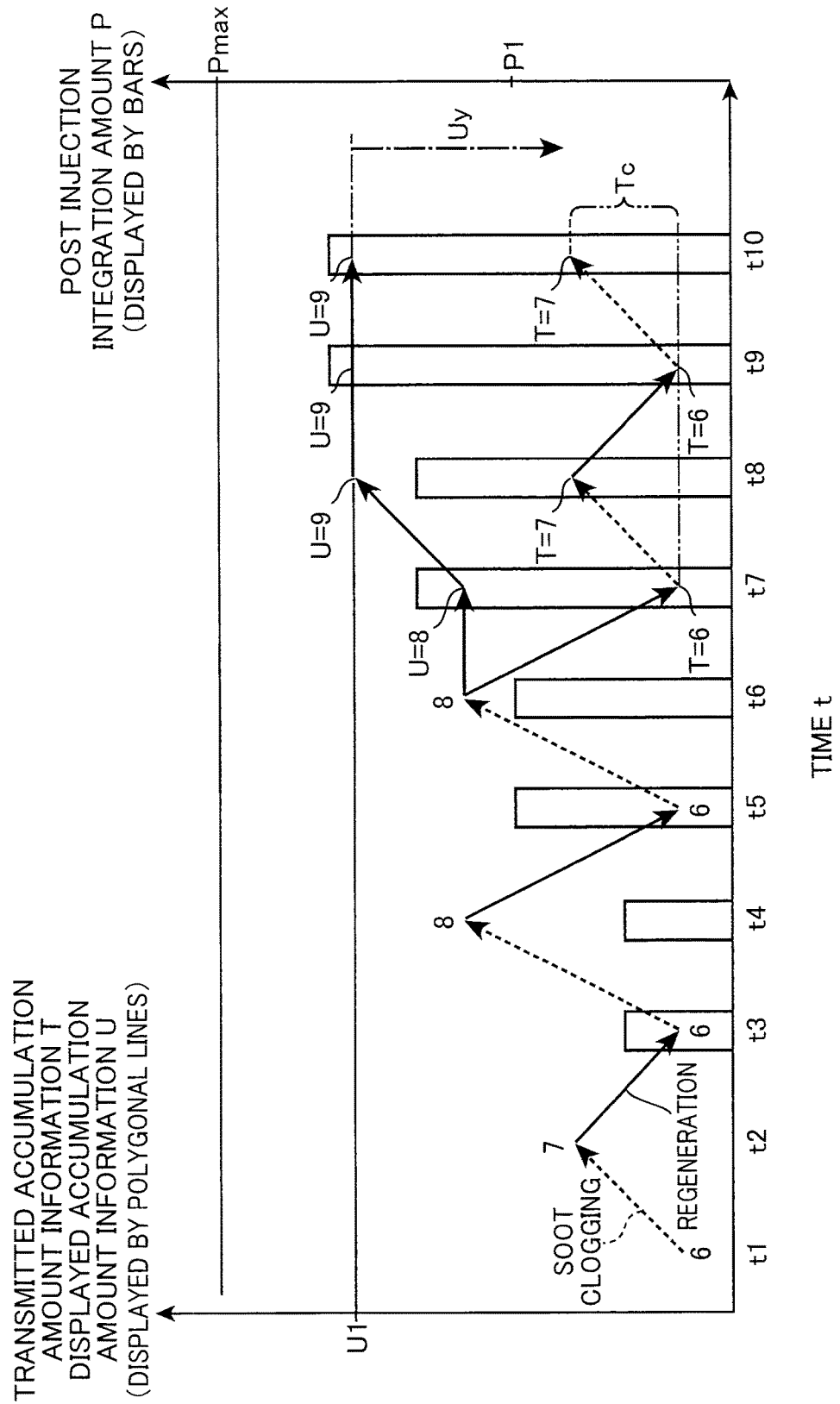
FIG. 34 is a time chart of the operation of an exhaust gas purification control device of a modification 2.

As shown in FIG. 34, in the modification 2, a set value U1 (difference addition display control release set value) is set in the display control unit 60. The display control unit 60 releases the increase addition display control when the displayed accumulation amount information U is not smaller than the set value U1. A specific example of this operation is as follows. The set value U1 is assumed to be set at "9". Since the displayed accumulation amount information U is "9" at time t8 of FIG. 34, the increase addition display control is released. Thereafter, the regenerating operation is interrupted at time t9 and the transmitted accumulation amount information T increases from "6" to "7" during a period from time t9 to time t10 (increase Tc is "1"). Since the increase addition display control is released, the displayed accumulation amount information U remains to be "9" without increasing during the period from time t9 to time t10.

(Effect 30)

Effects by the modification 2 are described. The set value U1 (difference addition display control release set value) is set in the display control unit 60. The display control unit 60 releases the increase addition display control when the displayed accumulation amount information U is not smaller than the set value U1.

By releasing the increase addition display control, the displayed accumulation amount information U does not increase when the transmitted accumulation amount information T increases in the region Uy not larger than the displayed accumulation amount information U. Thus, the problem that the displayed accumulation amount information U becomes excessively larger than the transmitted accumulation amount information T is suppressed.

Sixth Embodiment

Figure 35:
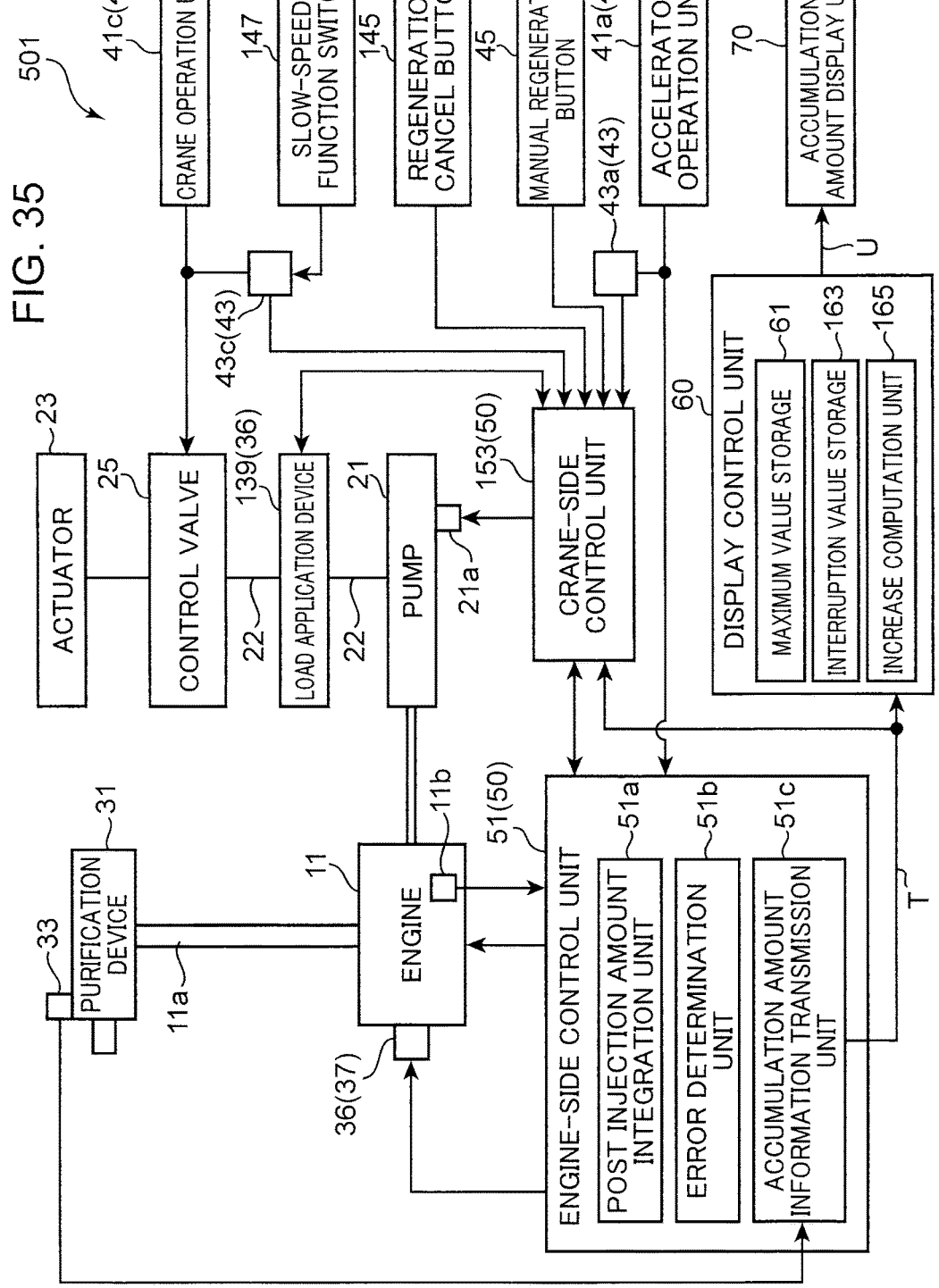
FIG. 35 is a block diagram, corresponding to FIG. 29, of a sixth embodiment.

Points of difference of an exhaust gas purification control device 501 of a sixth embodiment from the fifth embodiment are described with reference to FIG. 35. The points of difference are as follows. As shown in FIG. 35, the exhaust gas purification control device 501 includes a load application device 139 instead of the exhaust brake 39 (see FIG. 29) of the fifth embodiment. The exhaust gas purification control device 501 includes a regeneration cancel button 145 and a slow-speed function switch 147 which are not provided in the fifth embodiment. The operation of a crane-side control unit 153 of the sixth embodiment differs from that of the crane-side control unit 53 (see FIG. 29) of the fifth embodiment. The above points of difference are further described below. Note that constituent elements and Steps of the exhaust gas purification control device 501 common to the fifth embodiment are denoted by the same reference signs and not described.

The exhaust gas purification control device 501 is used for a crawler crane, a wheel crane or the like.

(Load Application Device 139)

A regeneration unit 36 includes the load application device 139 for applying a load to an engine 11 by generating a pressure in a pipe line 22 (described later). The load application device 139 applies a load to the engine 11 to increase an exhaust temperature of the engine 11. The load application device 139 applies a load necessary for a regenerating operation to the engine 11. Specifically, the load application device 139 applies a load for increasing the exhaust temperature of the engine 11 to a temperature at which the regenerating operation is performed to the engine 11. The load application device 139 is a device for increasing a discharge pressure of a pump 21. The load application device 139 is arranged between the pump 21 and a control valve 25 (on the pipe line 22 connecting the pump 21 and the control valve 25). The load application device 139 is a valve (load application value). The load application device 139 is switchable between "activation" and "deactivation". The load application device 139 in an "activated" state generates a pressure in the pipe line 22 (performs a load applying operation). The load application device 139 in a "deactivated" state generates no pressure in the pipe line 22 (does not perform the load applying operation). The regenerating operation by the regeneration unit 36 is performed by at least one of post injection in a post injection unit 37 and the activation of the load application device 139. In the regenerating operation using the load application device 139, a discharge flow rate of the pump 21 is set, for example, at a maximum value (may be a substantially maximum value). The discharge flow rate of the pump 21 is controlled by a discharge flow rate control device 21a. The discharge flow rate control device 21a is a device for controlling the discharge flow rate of the pump 21 and, for example, a valve. The discharge flow rate control device 21a is controlled by the crane-side control unit 153.

(Regeneration Cancel Button 145)

Operation-related devices 41 to 45, 145 and 147 include an operation unit 41, an operation detection unit 43, a manual regeneration button 45, the regeneration cancel button 145 and the slow-speed function switch 147. The regeneration cancel button 145 is a button used by an operator to perform a regeneration canceling operation. The regeneration canceling operation is an operation of stopping the regenerating operation by the regeneration cancel button 145. More specifically, the regeneration cancel button 145 is a means used by the operator to select whether to stop the regenerating operation (regenerating operation OFF (cancel ON)) or not to stop the regenerating operation (regenerating operation OFF (cancel OFF)). The regeneration cancel button 145 is provided in a driving room (not shown) of a construction machine. The slow-speed function switch 147 is also similar. Examples of the regeneration canceling operation 145 include a switch on a touch panel and a push-button switch. The slow-speed function switch 147 is also similar.

The slow-speed function switch 147 (automatic regeneration automatic stop selection switch, discharge flow rate setting switch) is a switch used by the operator to select whether or not to use a slow-speed function (slow-speed function is ON or OFF). The slow-speed function is a function for making a slow-speed operation of an actuator 23 easily performed. Specifically, if "slow-speed function ON" is selected by the slow-speed function switch 147, the discharge flow rate of the pump 21 is regulated and, for example, set at a minimum value (may be a substantially minimum value). As just described, the slow-speed function switch 147 is also a discharge flow rate setting switch. The discharge flow rate setting switch is a switch for selection on a function affecting the discharge flow rate of the pump 21. Further, the slow-speed function switch 147 is also an automatic regeneration automatic stop selection switch. The automatic regeneration automatic stop selection switch is a switch for switching whether or not to use an automatic regeneration automatic stop function (described later) (automatic regeneration automatic stop function is ON or not) according to a selection state of the switch.

The crane-side control unit 153 (machine-side control unit) controls the operation of the load application device 139. The crane-side control unit 153 instructs whether or not to perform the regenerating operation (load applying operation) to the load application device 139. The crane-side control unit 153 determines whether or not to permit the regenerating operation in response to a request of the regenerating operation from an engine-side control unit 51. Detection results and selection results are input to the crane-side control unit 153 from the load detection unit 11b, the operation detection unit 43, the manual regeneration button 45, the regeneration cancel button 145 and the slow-speed function switch 147.

(Control of Regenerating Operation According to Accumulation Amount Level by Regeneration Control Unit 50)

The regeneration control unit 50 (crane-side control unit 153) switches a control of the regenerating operation by the regeneration unit 36 according to an accumulation amount level or a request from the engine-side control unit 51. A total of five accumulation amount levels of below A, A, B, D and E are, for example, set in the regeneration control unit 50. As shown in Table 2, the regeneration control unit 50 changes conditions on the start and stop of the regenerating operation according to the accumulation amount levels of below A, A, B, D and E.

TABLE 2

| Accumulation Amount Level | Regulating Operation ○: Performed, X: Not Performed | Start of Regenerating Operation | Interruption of Regenerating Operation |
|---|---|---|---|
| E | ○ | Automatic (Forced) | X |
| D | ○ | Manual | X |
| B | ○ | Manual | ○ |
| A | ○ | Automatic | ○ |
| Below A | X | — | — |

(Accumulation Amount Level A or Higher)

In the fifth embodiment, the conditions on the start of the regenerating operation at the accumulation amount level A or higher include that the "operation unit 41 (see FIG. 29) is not being operated". In the sixth embodiment, that the "operation unit 41 is not being operated" includes that the "operation of the operation unit 41 is invalid" (described later). The reason why the conditions on the start of the regenerating operation include that the operation unit 41 is not being operated (or is invalid) is to prevent a sudden change in the operation of an actuator 23 due to the start of the regenerating operation during the operation of the operation unit 41. This sudden change occurs as follows. When the load application device 139 is activated, a load is applied to the pump 21. Thus, even if the rotational speed of the engine 11 and a crane operation are stable, the discharge flow rate of the pump 21 changes. As a result, the operation of the actuator 23 suddenly changes.

(Accumulation Amount Level A: Automatic Regeneration Control, Automatic Regeneration Manual Stop Control)

At the accumulation amount level A (automatic regeneration region), the regenerating operation is automatically started. At the accumulation amount level A, the operation of the operation unit 41 is prioritized over the regenerating operation. In the fifth embodiment, at the accumulation amount level A, the regenerating operation is temporarily stopped if the crane operation or the accelerator operation is performed during the regenerating operation. On the other hand, in the sixth embodiment, this control (control to temporarily stop the regenerating operation if the crane operation or the accelerator operation is performed during the regenerating operation) is not executed. In the sixth embodiment, the regenerating operation is temporarily stopped if the crane operation is performed when an "automatic regeneration automatic stop function is ON" (described later). When the "automatic regeneration automatic stop function is OFF", the regenerating operation is not temporarily stopped even if the crane operation is performed. More specifically, the regeneration control unit 50 executes the following automatic regeneration control (automatic regeneration control of the sixth embodiment) at the accumulation amount level A.

In the automatic regeneration control of the sixth embodiment, as in the fifth embodiment, the regeneration unit 36 is caused to start the regenerating operation when it is detected by the operation detection unit 43 that the operation unit 41 is not being operated. Further, in the automatic regeneration control of the sixth embodiment, the regenerating operation by the regeneration unit 36 is stopped when it is detected by the operation detection unit 43 that the operation unit 41 is being operated and when the use of the automatic regeneration automatic stop function (described later) (automatic regeneration automatic stop function ON) is selected by an automatic regeneration automatic stop switch (slow-speed function switch 147). The automatic regeneration automatic stop function is a function of stopping (temporarily stopping) the regenerating operation by the regeneration unit 36 in the automatic regeneration region and when it is detected by the operation detection unit 43 that the operation unit 41 is being operated.

ON and OFF of the automatic regeneration automatic stop function are linked with ON and OFF of the slow-speed function (function affecting the discharge flow rate of the pump 21). These are linked for the following reason. As described above, in the case of using the slow-speed function, the discharge flow rate of the pump 21 is regulated. On the other hand, in the case of performing the regenerating operation using the load application device 139, the discharge flow rate of the pump 21 needs to be set high (equal to or higher than a flow rate necessary for the regenerating operation). Accordingly, one of the slow-speed function (low discharge flow rate) and the regenerating operation (high discharge flow rate) is prioritized. Specifically, the regeneration control unit 50 turns on the automatic regeneration automatic stop function (uses the automatic regeneration automatic stop function) when the slow-speed function ON is selected by the slow-speed function switch 147. The regeneration control unit 50 turns off the automatic regeneration automatic stop function (does not use the automatic regeneration automatic stop function) when the slow-speed function OFF is selected by the slow-speed function switch 147. If the regenerating operation is stopped (temporarily stopped) by this control, the slow-speed function operates. Specifically, the operation of the operation unit 41 is enabled with the discharge flow rate of the pump 21 regulated (set, for example, at the minimum value). Further, if it is detected by the operation detection unit 43 that the operation unit 41 is not being operated after the regenerating operation is stopped by this control, the regeneration control unit 50 causes the regeneration unit 36 to restart the regenerating operation. Specifically, the discharge flow rate of the pump 21 is set, for example, to the maximum value and the regeneration unit 36 (load application device 139) is set in the activated state.

At the accumulation amount level A, the regeneration canceling operation by the regeneration cancel button 145 is possible. More specifically, at the accumulation amount level A, the regeneration control unit 50 executes an automatic regeneration manual stop control. In the automatic regeneration manual stop control, the regenerating operation of the regeneration unit 36 is stopped (temporarily stopped) when it is selected by the regeneration cancel button 145 that the regenerating operation is stopped (regenerating operation is not performed (regenerating operation OFF)).

(Accumulation Amount Levels B and D: Manual Regeneration Control, Manual-Regeneration-Time Operation Invalidation Control)

At the accumulation amount levels B and D (manual regeneration region), the regeneration control unit 50 executes a manual regeneration control (same as in the fifth embodiment) and a manual-regeneration-time operation invalidation control. In the manual-regeneration-time operation invalidation control, the operation by the operation unit 41 is invalidated in the manual regeneration region and when the regenerating operation is being performed. In the manual-regeneration-time operation invalidation control, the regeneration control unit 50 (crane-side control unit 153) does not receive a command of the operation unit 41 (sets a state where the construction machine cannot be operated). In other words, in the manual-regeneration-time operation invalidation control, the regeneration control unit 50 prevents the actuator 23 from being activated even if the operation unit 41 is operated (regenerating operation is prioritized). On the other hand, the regeneration control unit 50 validates the operation by the operation unit 41 in the manual regeneration region and when the regenerating operation is not being performed.

(Accumulation Amount Level B: Manual Regeneration Manual Stop Control)

At the accumulation amount level B, the regenerating operation (manual regeneration) can be interrupted and restarted. At the accumulation amount level B, the regeneration control unit 50 executes a manual regeneration manual stop control different from that of the fifth embodiment without executing the manual regeneration interruption control and the manual regeneration restart control executed in the fifth embodiment.

In the fifth embodiment, the regenerating operation is interrupted when the manual regeneration button 45 (see FIG. 29) is turned "OFF" in the manual regeneration manual stop control. On the other hand, in the sixth embodiment, the regenerating operation is interrupted when the regeneration cancel button 145 is set to "regenerating operation OFF" (cancel ON) in the manual regeneration manual stop control. More specifically, in the manual regeneration manual stop control of the sixth embodiment, the regenerating operation of the regeneration unit 36 is stopped when the it is selected by the regeneration cancel button 145 not to perform the regenerating operation ("regenerating operation OFF"), i.e. when the regeneration canceling operation is performed.

Note that the accelerator invalidation control executed at the accumulation amount level C in the fifth embodiment is not executed in the sixth embodiment.

(Accumulation Amount Level D: Manual Regeneration Manual Stop Invalidation Control)

At the accumulation amount level D, the interruption of the regenerating operation is prohibited. At the accumulation amount level D, the operation invalidation control and the manual regeneration switch invalidation control executed in the fifth embodiment are not executed and a manual regeneration manual stop invalidation control not executed in the fifth embodiment is executed. In the manual regeneration manual stop invalidation control, the regeneration canceling operation by the regeneration cancel button 145 is invalidated and the regeneration unit 36 is caused to perform the regenerating operation. In the manual regeneration manual stop invalidation control, the regeneration unit 36 is caused to perform the regenerating operation regardless of a selection state of the regeneration cancel button 145 (regardless of "regenerating operation ON" or "regenerating operation OFF") when the regeneration unit 36 performs the regenerating operation by the manual regeneration control. In the manual regeneration manual stop invalidation control, the crane-side control unit 153 does not receive an instruction of the regeneration cancel button 145.

(Accumulation Amount Level E: Forced Regeneration Control)

At the accumulation amount level E (forced regeneration region), the regeneration control unit 50 executes a forced regeneration control different from that of the fifth embodiment. In the forced regeneration control of the sixth embodiment, the regeneration unit 36 is caused to automatically perform the regenerating operation regardless of the selection state of the regeneration cancel button 145 (and regardless of a detection state of the operation detection unit 43 and a selection state of the manual regeneration button 45).

(Operation of Display Control Unit 60)

As in the fifth embodiment, the display control unit 60 controls the display of the accumulation amount display unit 70 according to the accumulation amount information. Unlike in the fifth embodiment, a relationship between the aforementioned accumulation amount levels of below A, A, B, D and E and the accumulation amount information of "0" to "10" is set, for example, as follows (this relationship may be changed) in the sixth embodiment.

Accumulation amount information "0", "1", "2": accumulation amount level below A Accumulation amount information "3", "4": accumulation amount level A Accumulation amount information "5", "6", "7": accumulation amount level B Accumulation amount information "8": accumulation amount level D Accumulation amount information "9": accumulation amount level E Accumulation amount information "10": breakdown (Other Modifications)

In the above sixth embodiment, the slow-speed function switch 147 is the automatic regeneration automatic stop selection switch and the discharge flow rate setting switch. However, other switches may be provided as the automatic regeneration automatic stop selection switch and the discharge flow rate setting switch in addition to (or instead of) the slow-speed function switch 147. The "other switches" may include an operation mode changeover switch, a drum brake changeover switch and the like. Further, the above "other switches" include an excessive load preventing device release switch, an excessive load preventing device redundant switch and the like. For example, if an excessive load preventing device is released by the excessive load preventing device release switch (when an excessive load preventing device releasing function is ON), the above automatic regeneration automatic stop function is turned ON (regenerating operation is temporarily stopped if the operating unit 41 is operated in the automatic regeneration region). If the excessive load preventing device release switch function is OFF, the automatic regeneration automatic stop function is turned OFF. Further, if it is selected, for example, to use an excessive load preventing device redundant function (described later) by the excessive load preventing device redundant switch (excessive load preventing device redundant function is ON), the above automatic regeneration automatic stop function is turned ON. If the excessive load preventing device redundant function is OFF, the above automatic regeneration automatic stop function is turned OFF. Note that the excessive load preventing device redundant function is a function of enabling a minimum work of the construction machine (crane operation, etc.) by causing only minimum functions of the excessive load preventing device to work when the excessive load preventing device is broken.

Connections among the respective devices in the block diagrams shown in FIGS. 29 and 35 may be appropriately changed. Further, the sequences of Steps of the flow charts shown in FIGS. 31 and 33 may be appropriately changed. Further, all or parts of the configurations and controls of the fifth embodiment and all or parts of the configurations and controls of the sixth embodiment may be combined.

The invention claimed is:

1. An exhaust gas purification control device for construction machine, comprising:
   an engine;
   an actuator using the engine as a driving source;
   an operation unit used by an operator to operate the actuator or the engine;
   an operation detection unit for detecting whether or not the operation unit is being operated;
   a purification device for capturing soot in exhaust gas of the engine;
   an accumulation amount detection unit for detecting an accumulation amount of the soot captured by the purification device;
   a regeneration unit for performing an regenerating operation, which is an operation of regenerating the purification device, by burning the soot captured by the purification device;
   a regeneration control unit for executing a plurality of types of controls for the regenerating operation and
   a manual regeneration switching unit used by the operator to select whether or not to perform the regenerating operation, wherein:
   the regeneration control unit selectively performs one of an automatic regeneration control, a manual regeneration control and a forced regeneration control based on the accumulation amount of the soot detected by the accumulation amount detection unit,
   an accumulation amount of the soot for causing the manual regeneration control is greater than an accumulation amount of the soot for causing the automatic regeneration control,
   an accumulation amount of the soot for causing the forced regeneration control is greater than the accumulation amount of the soot for causing the manual regeneration control,
   in the automatic regeneration control, the regeneration unit is caused to perform the regenerating operation when it is detected by the operation detection unit that the operation unit is not being operated and the regenerating operation of the regeneration unit is stopped when it is detected by the operation detection unit that the operation unit is being operated,
   in the manual regeneration control, the regeneration unit is caused to perform the regenerating operation when it is detected by the operation detection unit that the operation unit is not being operated and the regenerating operation is selected by the manual regeneration switching unit, and
   in the forced regeneration control the regeneration unit is caused to perform the regenerating operation regardless of a detection state of the operation detection unit and regardless of a selection state of the manual regeneration switching unit.

2. An exhaust gas purification control device for construction machine according to claim 1, wherein:
   in the forced regeneration control, the regeneration unit is started to perform the regenerating operation when it is detected by the operation detection unit that the operation unit is not being operated and, after the start of the regeneration operation, the regeneration unit is kept performing the regenerating operation regardless of a detection state of the operation detection unit and regardless of a selection state of the manual regeneration switching unit.

3. An exhaust gas purification control device for construction machine according to claim 1, further comprising an automatic regeneration automatic stop selection switch for switching whether or not to use an automatic regeneration automatic stop function, wherein:
   in the automatic regeneration control, the regeneration unit is caused to perform the regenerating operation when the non-use of the automatic regeneration automatic stop function is selected by the automatic regeneration automatic stop selection switch;

in the automatic regeneration control, the regeneration unit is caused to perform the regenerating operation when it is detected by the operation detection unit that the operation unit is not being operated and when the use of the automatic regeneration automatic stop function is selected by the automatic regeneration automatic stop selection switch; and in the automatic regeneration control, the regenerating operation of the regeneration unit is stopped when it is detected by the operation detection unit that the operation unit is being operated and when the use of the automatic regeneration automatic stop function is selected by the automatic regeneration automatic stop selection switch.

4. An exhaust gas purification control device for construction machine according to claim 3, further comprising:

a pump to be driven by the engine; and a discharge flow rate setting switch for selection on a function affecting a discharge flow rate of the pump, wherein:

the regeneration unit includes a load application device for applying a load to the pump so that a load for increasing an exhaust temperature of the engine to a temperature at which the regenerating operation is performed is applied to the engine;

the discharge flow rate setting switch is the automatic regeneration automatic stop selection switch.

5. An exhaust gas purification control device for construction machine according to claim 1, wherein:

the plurality of types of controls executed by the regeneration control unit include a manual regeneration interruption control; and in the manual regeneration interruption control, the regenerating operation of the regeneration unit is stopped if it is detected by the operation detection unit that the operation unit is being operated when the regeneration unit is performing the regenerating operation by the manual regeneration control.

6. An exhaust gas purification control device for construction machine according to claim 5, wherein:

the operation unit includes an accelerator operation unit used by the operator to operate a rotational speed of the engine;

the plurality of types of controls executed by the regeneration control unit include an accelerator invalidation control; and in the accelerator invalidation control, an operation by the accelerator operation unit is invalidated and the rotational speed of the engine is regulated when the regenerating operation of the regeneration unit is stopped by the manual regeneration interruption control.

7. An exhaust gas purification control device for construction machine according to claim 5, wherein:

the plurality of types of controls executed by the regeneration control unit include a manual regeneration restart control; and in the manual regeneration restart control, the regeneration unit is caused to restart the regenerating operation if it is detected by the operation detection unit that the operation unit is not being operated and the regenerating operation is selected by the manual regeneration switching unit, when the regenerating operation is stopped by the manual regeneration interruption control.

8. An exhaust gas purification control device for construction machine according to claim 1, wherein:

the plurality of types of controls executed by the regeneration control unit include a manual regeneration manual stop control; and in the manual regeneration manual stop control, the regenerating operation of the regeneration unit is stopped when it is selected by the manual regeneration switching unit not to perform the regenerating operation.

9. An exhaust gas purification control device for construction machine according to claim 1, wherein:

the plurality of types of controls executed by the regeneration control unit include an operation invalidation control; and in the operation invalidation control, the operation by the operation unit is invalidated and the regeneration unit is caused to perform the regenerating operation regardless of whether or not the operation unit is being operated when the regeneration unit performs the regenerating operation by the manual regeneration control.

10. An exhaust gas purification control device for construction machine according to claim 1, wherein:

the plurality of types of controls executed by the regeneration control unit include a manual regeneration switch invalidation control; and in the manual regeneration switch invalidation control, the regeneration unit is caused to perform the regenerating operation regardless of a selection state of the manual regeneration switching unit when the regeneration unit performs the regenerating operation by the manual regeneration control.

11. An exhaust gas purification control device for construction machine according to claim 1, wherein:

the engine includes a load detection unit for detecting a load of the engine;

a load set value is set in the regeneration control unit;

the plurality of types of controls executed by the regeneration control unit include a regenerating operation partial stop control; and in the regenerating operation partial stop control, at least a part of the operation of the regeneration unit is stopped when a load detected by the load detection unit exceeds the load set value during the regenerating operation.

12. An exhaust gas purification control device for construction machine according to claim 1, wherein:

the regeneration unit includes a post injection unit for performing post injection to inject fuel into the engine in an exhaust stroke after an expansion stroke of the engine so that an exhaust temperature of the engine increases to a temperature at which the regenerating operation is performed;

the exhaust gas purification control device further comprises:

a manual regeneration switching unit used by the operator to select whether or not to perform the regenerating operation;

a post injection amount integration unit for computing a post injection integration amount, which is an accumulation amount of the post injection from the completion of the last regenerating operation of the purification device, and returning the post injection integration amount to a value at the completion of the last regenerating operation when the regenerating operation is completed; and an error determination unit for determining a reduction in a purification function of the purification device when the post injection integration amount exceeds an upper limit value set in advance, the plurality of types of controls executed by the regeneration control unit include the automatic regeneration control and the manual regeneration control;

in the automatic regeneration region, the post injection unit is caused to start the regenerating operation when it is detected by the operation detection unit that the operation unit is not being operated;

in the manual regeneration region, the regenerating operation by the post injection unit is permitted when it is detected by the operation detection unit that the operation unit is not being operated and it is selected to perform the regenerating operation by the manual regeneration switching unit;

a plurality of regions corresponding to the accumulation amount of the soot detected by the accumulation amount detection unit are set in the regeneration control unit;

the plurality of regions include an automatic regeneration region where the regeneration control unit executes the automatic regeneration control and a manual regeneration region where the accumulation amount of the soot is larger than in the automatic regeneration region and the regeneration control unit executes the manual regeneration control; and the regenerating operation of the post injection unit is limited according to the post injection integration amount in the automatic regeneration region.

13. An exhaust gas purification control device for construction machine according to claim 12, wherein, in the automatic regeneration control, the regenerating operation of the post injection unit is stopped when it is detected by the operation detection unit that the operation unit is being operated.

14. An exhaust gas purification control device for construction machine according to claim 12, further comprising an automatic regeneration automatic stop selection switch for switching whether or not to use an automatic regeneration automatic stop function, wherein:

in the automatic regeneration control, the regeneration unit of the post injection unit is stopped when it is detected by the operation detection unit that the operation unit is being operated and when the use of the automatic regeneration automatic stop function is selected by the automatic regeneration automatic stop selection switch.

15. An exhaust gas purification control device for construction machine according to claim 14, further comprising:

a pump to be driven by the engine;

a load application device for applying a load to the pump so that a load for increasing an exhaust temperature of the engine to a temperature at which the regenerating operation is performed is applied to the engine; and a discharge flow rate setting switch for selection on a function affecting a discharge flow rate of the pump, wherein the discharge flow rate setting switch is the automatic regeneration automatic stop selection switch.

16. An exhaust gas purification control device for construction machine according to claim 12, wherein:

a post injection prohibition set value is set in the regeneration control unit; and the regeneration control unit prohibits the regenerating operation of the post injection unit if the post injection integration amount is larger than the post injection prohibition set value in the automatic regeneration region.

17. An exhaust gas purification control device for construction machine according to claim 16, wherein the regeneration control unit prohibits the regenerating operation of the post injection unit until the accumulation amount of the soot detected by the accumulation amount detection unit reaches the manual regeneration region after the post injection integration amount exceeds the post injection prohibition set value.

18. An exhaust gas purification control device for construction machine according to claim 12, wherein the regeneration control unit permits the regenerating operation by the post injection unit when a transition is made from the automatic regeneration region to the manual regeneration region.

19. An exhaust gas purification control device for construction machine according to claim 12, wherein:

an operation prohibition set value is set in the regeneration control unit; and the regeneration control unit invalidates the operation by the operation unit and causes the post injection unit to perform the regenerating operation if the post injection integration amount is larger than the operation prohibition set value in the manual regeneration region.

20. An exhaust gas purification control device for construction machine according to claim 19, wherein the regeneration control unit validates the operation by the operation unit when the post injection integration amount is not larger than the operation prohibition set value.

21. An exhaust gas purification control device for construction machine according to claim 12, wherein the regeneration control unit invalidates the operation by the operation unit when the regenerating operation is being performed in the manual regeneration region.

22. An exhaust gas purification control device for construction machine according to claim 21, further comprising a regeneration cancel button used by the operator to perform a regeneration canceling operation of stopping the regenerating operation, wherein:

a regeneration canceling operation prohibition set value is set in the regeneration control unit; and the regeneration control unit invalidates the regeneration canceling operation by the regeneration cancel button and causes the post injection unit to perform the regenerating operation if the post injection integration amount is larger than the regeneration canceling operation prohibition set value in the manual regeneration region.

23. An exhaust gas purification control device for construction machine according to claim 22, wherein:

the regeneration control unit validates the regeneration canceling operation by the regeneration cancel button when the post injection integration amount is not larger than the regeneration canceling operation prohibition set value; and the regeneration control unit validates the operation by the operation unit when the regenerating operation is not being performed in the manual regeneration region.

24. An exhaust gas purification control device for construction machine according to claim 1, wherein:

the regeneration unit includes a post injection unit for performing post injection to inject fuel into the engine in an exhaust stroke after an expansion stroke of the engine so that an exhaust temperature of the engine increases to a temperature at which the regenerating operation is performed;

the exhaust gas purification control device further comprises:
- a post injection amount integration unit for computing a post injection integration amount, which is an accumulation amount of the post injection from the completion of the last regenerating operation of the purification device, and returning the post injection integration amount to a value at the completion of the last regenerating operation when the regenerating operation is completed;
- an error determination unit for determining a reduction in a purification function of the purification device when the post injection integration amount exceeds an upper limit value set in advance;
- an accumulation amount information transmission unit for transmitting accumulation amount information, which is information on the accumulation amount of the soot captured by the purification device, based on the accumulation amount detected by the accumulation amount detection unit;
- an accumulation amount display unit for displaying the accumulation amount information; and
- a display control unit for controlling displayed accumulation amount information, which is the accumulation amount information to be displayed on the accumulation amount display unit, based on transmitted accumulation amount information which is the accumulation amount information transmitted from the accumulation amount information transmission unit; and the display control unit includes a maximum value storage for storing maximum transmitted accumulation amount information, which is a maximum value of the transmitted accumulation amount information from the completion of the last regenerating operation of the purification device; and the display control unit executes a maximum-value-or-larger display control to set the accumulation amount information not smaller than the maximum transmitted accumulation amount information stored in the maximum value storage as the displayed accumulation amount information.

25. An exhaust gas purification control device for construction machine according to claim 24, wherein:
a maximum value display switch set value is set in the display control unit; and
the display control unit releases the maximum-value-or-larger display control and sets the transmitted accumulation amount information as the displayed accumulation amount information if the post injection integration amount is not larger than the maximum value display switch set value.

26. An exhaust gas purification control device for a construction machine, comprising:
an engine;
an actuator using the engine as a driving source;
an operation unit used by an operator to operate the actuator or the engine;
an operation detection unit for detecting whether or not the operation unit is being operated;
a purification device for capturing soot in exhaust gas of the engine;
an accumulation amount detection unit for detecting an accumulation amount of the soot captured by the purification device;
a regeneration unit for performing an regenerating operation, which is an operation of regenerating the purification device, by burning the soot captured by the purification device; and
a regeneration control unit for executing a plurality of types of controls for the regenerating operation,
the regeneration control unit switching a control from a control of prioritizing an operation by the operation unit to a control of prioritizing the regenerating operation in a stepwise manner as the accumulation amount of the soot detected by the accumulation amount detection unit increases,
wherein:
the engine includes a load detection unit for detecting a load of the engine,
a load set value is set in the regeneration control unit,
the plurality of types of controls executed by the regeneration control unit includes a regenerating operation partial stop control, and
in the regenerating operation partial stop control, at least a part of the operation of the regeneration unit is stopped when a load detected by the load detection unit exceeds the load set value during the regenerating operation.

27. An exhaust gas purification control device for a construction machine according to claim 26, wherein:
the regeneration unit includes
an exhaust brake for applying a load to the engine so that an exhaust temperature of the engine increases to a temperature at which the regenerating operation is performed, and
a post injection unit for performing post injection to inject fuel into the engine in an exhaust stroke after an expansion stroke of the engine so that an exhaust temperature of the engine increases to a temperature at which the regenerating operation is performed; and
in the regenerating operation partial stop control, the load application to the engine by the exhaust brake is stopped and the post injection by the post injection unit is performed when a load detected by the load detection unit exceeds the load set value during the regenerating operation.

28. An exhaust gas purification control device for a construction machine, comprising:
an engine;
an actuator using the engine as a driving source;
an operation unit used by an operator to operate the actuator or the engine;
an operation detection unit for detecting whether or not the operation unit is being operated;
a purification device for capturing soot in exhaust gas of the engine;
an accumulation amount detection unit for detecting an accumulation amount of the soot captured by the purification device;
a regeneration unit for performing an regenerating operation, which is an operation of regenerating the purification device, by burning the soot captured by the purification device; and
a regeneration control unit for executing a plurality of types of controls for the regenerating operation,
the regeneration control unit switching a control from a control of prioritizing an operation by the operation unit to a control of prioritizing the regenerating operation in a stepwise manner as the accumulation amount of the soot detected by the accumulation amount detection unit increases, wherein:

the engine includes a post injection unit for performing post injection to inject fuel into the engine in an exhaust stroke after an expansion stroke of the engine so that the exhaust temperature of the engine increases to a temperature at which the regenerating operation is performed;

the exhaust gas purification control device further comprises:

a post injection amount integration unit for computing a post injection integration amount, which is an accumulation amount of the post injection from the completion of the last regenerating operation of the purification device, and returning the post injection integration amount to a value at the completion of the last regenerating operation when the regenerating operation is completed;

an error determination unit for determining a reduction in a purification function of the purification device when the post injection integration amount exceeds an upper limit value set in advance;

an accumulation amount information transmission unit for transmitting accumulation amount information, which is information on the accumulation amount of the soot captured by the purification device, based on the accumulation amount detected by the accumulation amount detection unit;

an accumulation amount display unit for displaying the accumulation amount information; and a display control unit for controlling displayed accumulation amount information, which is the accumulation amount information to be displayed on the accumulation amount display unit based on transmitted accumulation amount information which is the accumulation amount information transmitted from the accumulation amount information transmission unit:

the display control unit includes a maximum value storage for storing maximum transmitted accumulation amount information, which is a maximum value of the transmitted accumulation amount information from the completion of the last regenerating operation of the purification device;

the display control unit executes a maximum-value-or-larger display control to set the accumulation amount information not smaller than the maximum transmitted accumulation amount information stored in the maximum value storage as the displayed accumulation amount information, the display control unit includes;

an interruption value storage for storing interruption-time transmitted accumulation amount information which is the transmitted accumulation amount information when the post injection unit interrupted the regenerating operation; and an increase computation unit for computing an increase of the present transmitted accumulation amount information from the interruption-time transmitted accumulation amount information; and the display control unit executes an increase addition display control to set the sum of the increase computed by the increase computation unit and the last displayed accumulation amount information as new displayed accumulation amount information in the maximum-value-or-larger display control.

29. The exhaust gas purification control device for a construction machine according to claim 28, wherein:

a difference addition display control release set value is set in the control unit; and the display control unit releases the increase addition display control when the displayed accumulation amount information is not smaller than the difference addition display control release set value.

30. An exhaust gas purification control device for a construction machine, comprising:

an engine;

an actuator using the engine as a driving source;

an operation unit used by an operator to operate the actuator or the engine;

an operation detection unit for detecting whether or not the operation unit is being operated;

a purification device for capturing soot in exhaust gas of the engine;

an accumulation amount detection unit for detecting an accumulation amount of the soot captured by the purification device;

a regeneration unit for performing an regenerating operation, which is an operation of regenerating the purification device, by burning the soot captured by the purification device; and a regeneration control unit for executing a plurality of types of controls for the regenerating operation, the regeneration control unit switching a control from a control of prioritizing an operation by the operation unit to a control of prioritizing the regenerating operation in a stepwise manner as the accumulation amount of the soot detected by the accumulation amount detection unit increases, wherein:

the regeneration unit includes a post injection unit for performing post injection to inject fuel into the engine in an exhaust stroke after an expansion stroke of the engine so that an exhaust temperature of the engine increases to a temperature at which the regenerating operation is performed;

the exhaust gas purification control device further comprises:

a post injection amount integration unit for computing a post injection integration amount, which is an accumulation amount of the post injection from the completion of the last regenerating operation of the purification device, and returning the post injection integration amount to a value at the completion of the last regenerating operation when the regenerating operation is completed;

an error determination unit for determining a reduction in a purification function of the purification device when the post injection integration amount exceeds an upper limit value set in advance;

an accumulation amount information transmission unit for transmitting accumulation amount information, which is information on the accumulation amount of the soot captured by the purification device, based on the accumulation amount detected by the accumulation amount detection unit;

an accumulation amount display unit for displaying the accumulation amount information; and a display control unit for controlling displayed accumulation amount information, which is the accumulation amount information to be displayed on the accumulation amount display unit, based on transmitted accumulation amount information which is the accumulation amount information transmitted from the accumulation amount information transmission unit;

the display control unit includes a maximum value storage for storing maximum transmitted accumulation amount information, which is a maximum value of the transmitted accumulation amount information from the completion of the last regenerating operation of the purification device;

the display control unit executes a maximum-value-or-larger display control to set the accumulation amount information not smaller than the maximum transmitted accumulation amount information stored in the maximum value storage as the displayed accumulation amount information; and the regeneration control unit switches conditions on the start and stop of the regenerating operation according to the displayed accumulation amount information.

* * * * *